US012259343B2

(12) United States Patent
Nelson et al.

(10) Patent No.: US 12,259,343 B2
(45) Date of Patent: Mar. 25, 2025

(54) SYSTEMS AND METHODS FOR STRUCTURALLY CHARACTERIZING COMPOUNDS

(71) Applicants: The Regents of the University of California, Oakland, CA (US); California Institute of Technology, Pasadena, CA (US)

(72) Inventors: Hosea M. Nelson, Los Angeles, CA (US); Jose A. Rodriguez, Los Angeles, CA (US); Brian M. Stoltz, San Marino, CA (US); Tamir Gonen, Los Angeles, CA (US); Michael Martynowycz, Los Angeles, CA (US)

(73) Assignees: The Regents of the University of California, Oakland, CA (US); California Institute of Technology, Pasadena, CA (US)

( * ) Notice: Subject to any disclaimer, the term of this patent is extended or adjusted under 35 U.S.C. 154(b) by 238 days.

(21) Appl. No.: 17/762,232

(22) PCT Filed: Sep. 10, 2020

(86) PCT No.: PCT/US2020/050088
§ 371 (c)(1),
(2) Date: Mar. 21, 2022

(87) PCT Pub. No.: WO2021/055219
PCT Pub. Date: Mar. 25, 2021

(65) Prior Publication Data
US 2023/0057900 A1      Feb. 23, 2023

Related U.S. Application Data

(60) Provisional application No. 62/903,276, filed on Sep. 20, 2019, provisional application No. 62/903,269, filed on Sep. 20, 2019.

(51) Int. Cl.
*G01N 1/42* (2006.01)
*G01N 23/2055* (2018.01)

(52) U.S. Cl.
CPC .......... *G01N 23/2055* (2013.01); *G01N 1/42* (2013.01); *G01N 2223/0565* (2013.01); *G01N 2223/418* (2013.01)

(58) Field of Classification Search
CPC .. H01J 37/00; H01J 37/02; H01J 37/26; H01J 37/28; H01J 37/22; H01J 37/222;
(Continued)

(56) References Cited

U.S. PATENT DOCUMENTS 8,440,892 B2 *   5/2013   Moldenhauer ........... A01H 5/10
                                                                800/320.2
2008/0073521 A1 *  3/2008  Yaguchi ................. G01N 23/04
                                                                250/306
(Continued)

FOREIGN PATENT DOCUMENTS

WO    WO-2016/196386 A1    12/2016
WO    WO-2016/209907 A1    12/2016
(Continued)

OTHER PUBLICATIONS

Cruz et al. Atomic-resolution structures from fragmented protein crystals with the cryoEM method MicroED. *Nat Methods* 14, 399-402 (2017).
(Continued)

*Primary Examiner* — Jason L McCormack
(74) *Attorney, Agent, or Firm* — Foley Hoag LLP; David P. Halstead; Hilary Dorr Lang

(57) ABSTRACT

The present disclosure provides methods of collecting electron diffraction patterns from nanocrystals to obtain a three-dimensional structural model of a compound, as well as methods of identifying compounds and methods of deter-
(Continued)

mining polymorphic forms. In addition, the present disclosure provides methods of characterizing a first compound from a sample, as well as methods of screening compounds from a sample. The present disclosure also provides systems for characterizing a compound from a sample, which systems include modules for high-performance liquid chromatography, dispensing, and electron microscopy.

21 Claims, 50 Drawing Sheets

(58) Field of Classification Search
CPC .... H01J 37/244; H01J 37/295; H01J 37/2955; G01N 23/2055; G01N 1/42; G01N 2223/0565; G01N 2223/418
USPC .......................................... 250/306, 307, 311
See application file for complete search history.

(56) References Cited

U.S. PATENT DOCUMENTS

| | | | | |
|---|---|---|---|---|
| 2014/0007307 | A1* | 1/2014 | Routh, Jr. | H01J 37/26 850/3 |
| 2014/0306108 | A1* | 10/2014 | Billinge | H01J 37/261 250/307 |
| 2015/0129763 | A1* | 5/2015 | Ominami | H01J 37/147 250/310 |
| 2016/0020066 | A1* | 1/2016 | Morishita | H01J 37/222 702/151 |
| 2016/0079031 | A1* | 3/2016 | Aoyama | G01N 23/2252 348/80 |
| 2017/0207062 | A1* | 7/2017 | Dufresne | H01J 37/26 |
| 2020/0158665 | A1 | 5/2020 | Gonen et al. | |
| 2021/0043411 | A1* | 2/2021 | Kuwahara | H04W 56/0035 |
| 2021/0305010 | A1* | 9/2021 | Buijsse | H01J 37/222 |
| 2023/0145297 | A1 | 5/2023 | Gonen et al. | |
| 2023/0228695 | A1 | 7/2023 | Gonen et al. | |

FOREIGN PATENT DOCUMENTS

| | | |
|---|---|---|
| WO | WO-2020/112872 A1 | 6/2020 |
| WO | WO-2021/055219 A1 | 3/2021 |
| WO | WO-2021/216799 A1 | 10/2021 |
| WO | WO-2021/237116 A1 | 11/2021 |

OTHER PUBLICATIONS

Cruz et al., "MicroED data collection with SerialEM". *Ultramicroscopy* 201, 77-80 (2019).
Dick, M., Sarai, N. S., Martynowycz, M. W., Gonen, T. & Arnold, F. H. Tailoring tryptophan synthase TrpB for selective quaternary carbon bond formation. *Journal of the American Chemical Society* 141, 19817-19822 (2019).
Gallagher-Jones, M. et al. Sub-ångström cryo-EM structure of a prion protofibril reveals a polar clasp. *Nat Struct Mol Biol* 25, 131-134 (2018).
Gonen, T. et al. Lipid-protein interactions in double-layered two-dimensional AQP0 crystals. *Nature* 438, 633-638 (2005).
Gonen, T., Sliz, P., Kistler, J., Cheng, Y. & Walz, T. Aquaporin-0 membrane junctions reveal the structure of a closed water pore. *Nature* 429, 193-197 (2004).
Halaby, S. et al. Microcrystal Electron Diffraction for Molecular Design of Functional Non-Fullerene Acceptor Structures. *Chem. Mater.* 33, 966-977 (2021).
Hattne et al., "MicroED with the Falcon III direct electron detector," IUCrJ: 921-926 (2019).
Hattne, J. et al. Analysis of Global and Site-Specific Radiation Damage in Cryo-EM. *Structure* 26, 759-766.e4 (2018).
Hattne, J. et al. MicroED data collection and processing. Acta Crystallogr A Found Adv 71, 353-360 (2015).
International Search Report and Written Opinion for International Application No. PCT/US2021/028534 dated Jul. 22, 2021.
Jones, C. G. et al. The CryoEM Method MicroED as a Powerful Tool for Small Molecule Structure Determination. *ACS Cent. Sci.* 4, 1587-1592 (2018).
Liu, S. & Gonen, T. MicroED structure of the NaK ion channel reveals a Na+ partition process into the selectivity filter. *Communications biology* 1, 1-6 (2018).
Liu, S. et al. Atomic resolution structure determination by the cryo-EM method MicroED. *Protein Science* 26, 8-15 (2017).
Martynowycz, M. W. & Gonen, T. From electron crystallography of 2D crystals to MicroED of 3D crystals. *Current Opinion in Colloid & Interface Science* 34, 9-16 (2018).
Martynowycz, M. W. & Gonen, T. Ligand Incorporation into Protein Microcrystals for MicroED by On-Grid Soaking. Structure 29, 88-95.e2 (2021).
Martynowycz, M. W. & Gonen, T. Microcrystal Electron Diffraction of Small Molecules. *J Vis Exp* (2021) doi:10.3791/62313.
Martynowycz, M. W. et al. MicroED structure of the human adenosine receptor determined from a single nanocrystal in LCP. *Proc Natl Acad Sci USA* 118, e2106041118 (2021).
Martynowycz, M. W., Clabbers, M. T. B., Unge, J., Hattne, J. & Gonen, T. Benchmarking the ideal sample thickness in cryo-EM. *Proc Natl Acad Sci USA* 118, e2108884118 (2021).
Martynowycz, M. W., Khan, F., Hattne, J., Abramson, J. & Gonen, T. MicroED structure of lipid-embedded mammalian mitochondrial voltage-dependent anion channel. *Proc Natl Acad Sci USA* 117, 32380-32385 (2020).
Martynowycz, M. W., Zhao, W., Hattne, J., Jensen, G. J. & Gonen, T. Collection of Continuous Rotation MicroED Data from Ion Beam-Milled Crystals of Any Size. *Structure* 27, 545-548.e2 (2019).
Martynowycz, M. W., Zhao, W., Hattne, J., Jensen, G. J. & Gonen, T. Qualitative Analyses of Polishing and Precoating FIB Milled Crystals for MicroED. *Structure* 27, 1594-1600.e2 (2019).
Nannenga, B. L. & Gonen, T. MicroED opens a new era for biological structure determination. *Current opinion in structural biology* 40, 128-135 (2016).
Nannenga, B. L. & Gonen, T. MicroED: a versatile cryoEM method for structure determination. *Emerging topics in life sciences* 2, 1-8 (2018).
Nannenga, B. L., Shi, D., Hattne, J., Reyes, F. E. & Gonen, T. Structure of catalase determined by MicroED. eLife 3, e03600 (2014).
Nannenga, B. L., Shi, D., Leslie, A. G. W. & Gonen, T. High-resolution structure determination by continuous-rotation data collection in MicroED. *Nat Methods* 11, 927-930 (2014).
Purdy, M. D. et al. MicroED structures of HIV-1 Gag CTD-SP1 reveal binding interactions with the maturation inhibitor bevirimat. *Proc Natl Acad Sci USA* 115, 13258-13263 (2018).
Sawaya, M. R. et al. Ab initio structure determination from prion nanocrystals at atomic resolution by MicroED. *Proc Natl Acad Sci USA* 113, 11232-11236 (2016).
Shi, D. et al. The collection of MicroED data for macromolecular crystallography. *Nature Protocols* 11, 895-904 (2016).
Shi, D., Nannenga, B. L., ladanza, M. G. & Gonen, T. Three-dimensional electron crystallography of protein microcrystals. *Elife* 2, e01345 (2013).
Ting, C. P. et al. Use of a scaffold peptide in the biosynthesis of amino acid-derived natural products. *Science* 365, 280-284 (2019).
Utsunomiya et al., "Direct Identification of Trace Metals in Fine and Ultrafine Particles in the Detroit Urban Atmosphere," *Environmental Science & Technology*, 38(8): 2289-2297 (2004).
Vergara, S. et al. MicroED Structure of Au 146 (p-MBA) 57 at Subatomic Resolution Reveals a Twinned FCC Cluster. *J. Phys. Chem. Lett.* 8, 5523-5530 (2017).
Wisedchaisri, G. & Gonen, T. Fragment-based phase extension for three-dimensional structure determination of membrane proteins by electron crystallography. *Structure* 19, 976-987 (2011).
Wolff, A. M. et al. Comparing serial X-ray crystallography and microcrystal electron diffraction (MicroED) as methods for routine structure determination from small macromolecular crystals. IUCrJ 7, 306-323 (2020).

(56) References Cited

OTHER PUBLICATIONS

Zhu, L. et al. Structure Determination from Lipidic Cubic Phase Embedded Microcrystals by MicroED. *Structure* S0969212620302392 (2020) doi:10.1016/j.str.2020.07.006.

Cruz et al., "Atomic resolution structures from fragmented protein crystals by the cryoEM method MicroED.," Nature Methods, 14: 399-402 w/ Supplementary Information (2017).

Eddleston et al., "Transmission electron microscopy of pharmaceutical materials," Journal of Pharmaceutical Sciences, 99(9): 4072-4082 (2010).

Gallagher-Jones et al., "Sub-angstrom cryo-EM structure of a prion protofibril reveals a polar clasp," Nature Structural & Molecular Biology, 25: 131-134 (2018).

Gruene et al., "Rapid Structure Determination of Microcrystalline Molecular Compounds Using Electron Diffraction," Angewandte Chemie International Edition, 57(50): 16313-16317 (2018).

Hattne et al., "Analysis of Global and Site-Specific Radiation Damage in Cryo-EM," Structure, 26(5): 759-766.e1-4 (2018).

Hattne et al., "MicroED data collection and processing," Acta Crystallographica Section A: Foundation and Advances, 71: 353-360 (2015).

Henderson., "The potential and limitations of neutrons, electrons and X-rays for atomic resolution microscopy of unstained biological molecules," Quarterly Reviews of Biophysics, 28(2): 171-193 (1995).

Huacuja., "Synthesis and reactivity of unusual palladium (II) complexes supported by a diarylamido/bis(phosphine) PNP pincer ligand," Doctoral Dissertation submitted to the Office of Graduate and Professional Studies of Texas A&M University: 306 pages (2014).

International Search Report and Written Opinion for International Application No. PCT/US2020/050088 mailed Dec. 9, 2020.

Jones et al., "Characterization of Reactive Organometallic Species via MicroED," ACS Central Science, 5(9): 1507-1513 (2019).

Jones et al., "The CryoEM method MicroED as a powerful tool for small molecule structure determination," ACS Central Science, 4: 1587-1592 (2018).

Kolb et al., "Automated electron diffraction tomography—a new tool for nano crystal structure analysis," Crystal Research & Technology, 46(6): 542-554 (2011).

Martynowycz et al., "From electron crystallography of 2D crystals to MicroED of 3D crystals," Current Opinion in Colloid & Interface Science, 34: 9-16 (19 pages)(2018).

McMullan et al., "Chapter One—Direct Electron Detectors," Methods in Enzymology, 579: 1-17 (2016).

Nannenga et al., "High-resolution structure determination by continuous-rotation data collection in MicroED," Nature Methods, 11: 927-930 (2014).

Nannenga et al., "Structure of catalase determined by MicroED," eLfe, 3: e03600 pp. 1-11 (2014).

Palatinus et al., "Hydrogen positions in single nanocrystals revealed by electron diffraction," Science, 355(6321): 166-169 (2017).

Rodriguez et al., "Structure of the toxic core of alpha-synuclein from invisible crystals," Nature, 525: 486-490 (2015).

Van Genderen et al., "Ab initio structure determination of nanocrystals of organic pharmaceutical compounds by electron diffraction at room temperature using a Timepix quantum area direct electron detector," Acta Crystallographica Section A: Foundations and Advances, A72: 236-242 (2016).

Vergara et al., "MicroED Structure of Au146(p-MBA)57 at Sub-atomic Resolution Reveals a Twinned FCC Cluster," The Journal of Physical Chemistry Letters, 8(22): 5523-5530 (2017).

Arnold et al., "Blotting-free and lossless cryo-electron microscopy grid preparation from nanoliter-sized protein samples and single-cell extracts," J Struct Biol, 197: 220-226 (2017).

De La Cruz, M. J. et al. "Atomic-resolution structures from fragmented protein crystals with the cryoEM method MicroED." *Nat Methods* 14, 399-402 (2017).

De La Cruz, M. J., Martynowycz, M. W., Hattne, J. & Gonen, T. "MicroED data collection with SerialEM." *Ultramicroscopy* 201, 77-80 (2019).

Hattne et al., "Modeling truncated pixel values of faint reflections in MicroED images," J Appl Crystallogr 49: pp. 1029-1034 (2016).

International Search Report and Written Opinion for International Application No. PCT/US2021/033701 mailed Sep. 9, 2021.

Martynowycz et al., "Ab initio phasing macromolecular structures using electron-counted MicroED data," Nat Methods 19: pp. 724-729 (2022).

Martynowycz et al., "Collection of Continuous Rotation MicroED Data from Ion Beam-Milled Crystals of Any Size," Structure, 27(3): 545-548 (2019).

Martynowycz et al., "Qualitative analyses of polishing and pre-coating FIB milled crystals for MicroED," Structure, 27: 1594-1600 (2019).

Shi, D., Nannenga, B. L., Iadanza, M. G. & Gonen, T. "Three-dimensional electron crystallography of protein microcrystals." *Elife* 2, e01345 (2013).

Zhou et al., "Using focus ion beam to prepare crystal lamella for electron diffraction" Journal of Structural Biology, 205(3): 59-64 (2019).

* cited by examiner

Schwartz's reagent, 1

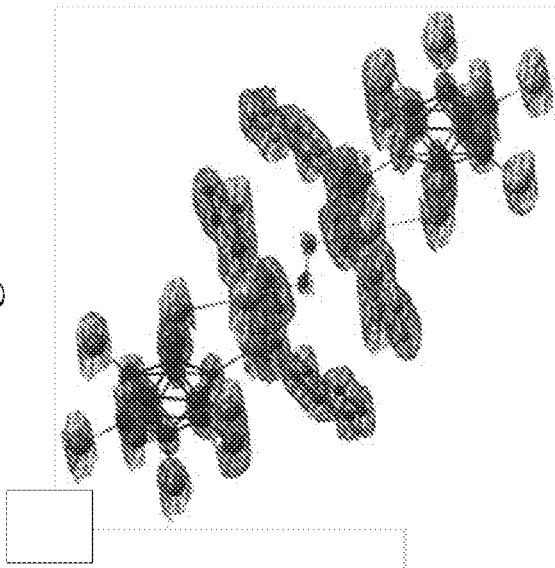
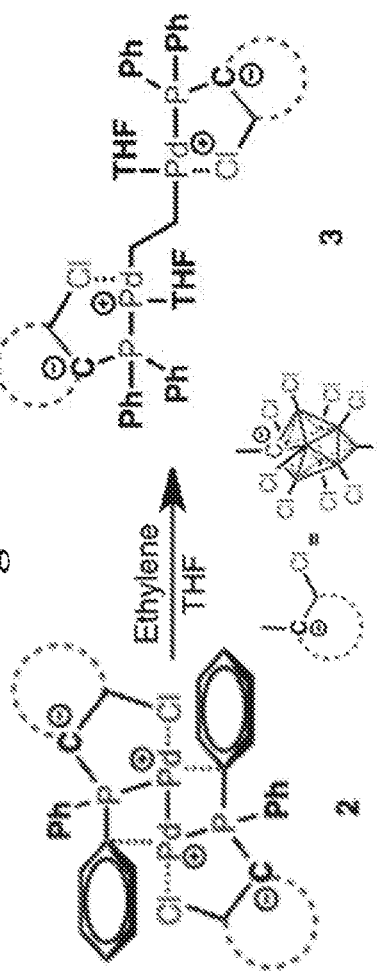
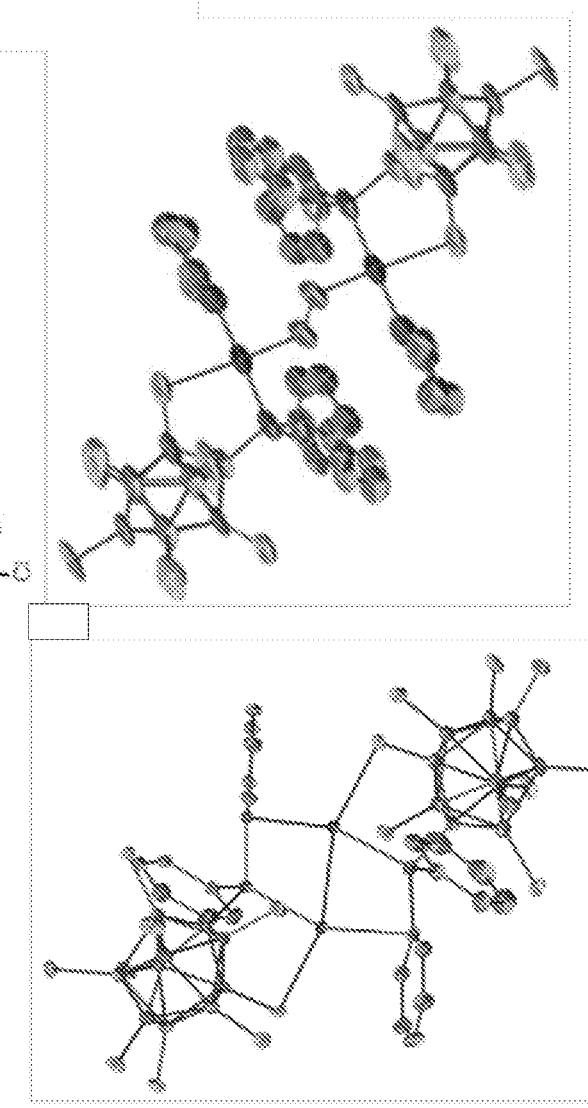
Fig. 16A
Fig. 16B
Fig. 16C
Fig. 16D
R1 = 17.4%
GooF = 2.263
Completeness = 80.5
Resolution = 0.9 Å

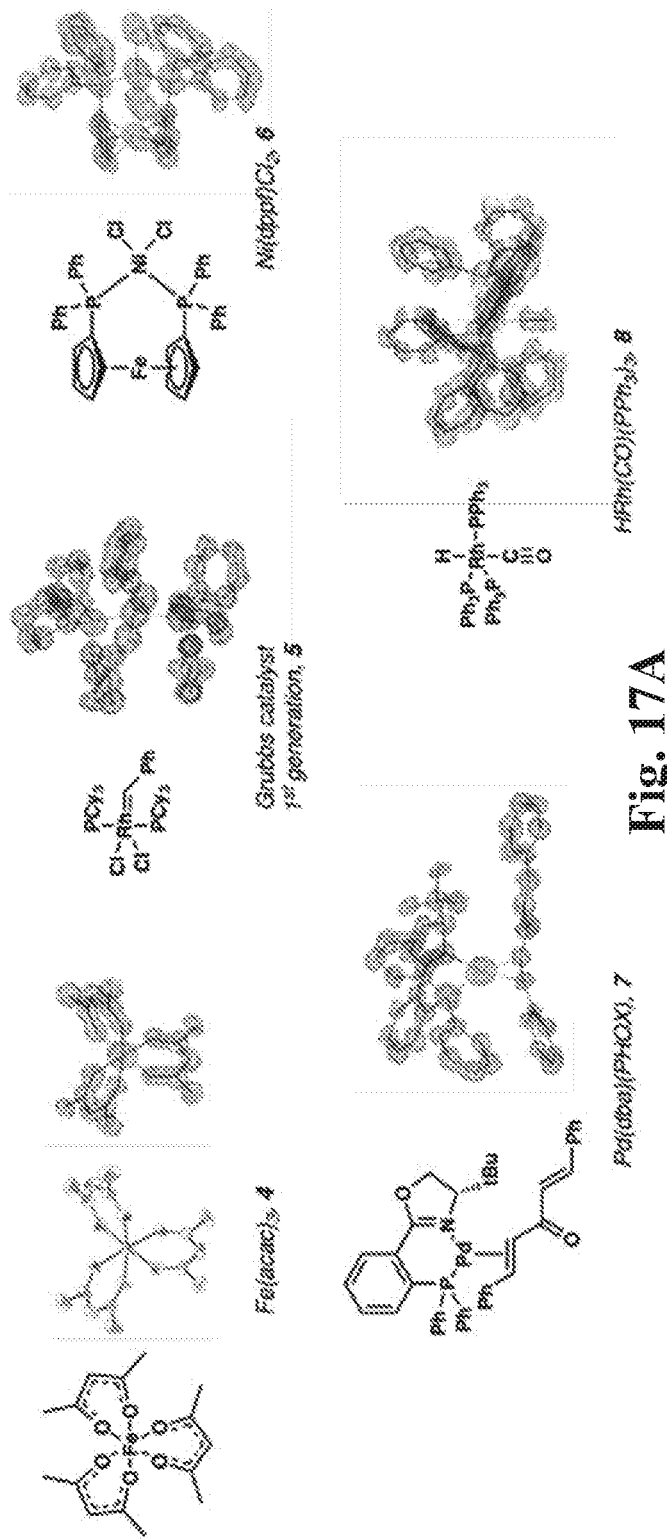
Fig. 17A
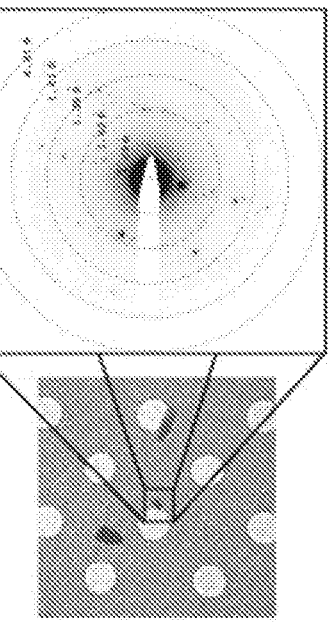
Fig. 17B
| Entry | R₁ (%) | GooF | Completeness (%) | Resolution (Å) |
|---|---|---|---|---|
| 4 | 16.1 | 1.826 | 92.1 | 0.80 |
| 5 | 16.0 | 1.802 | 99.3 | 0.85 |
| 6 | 14.9 | 1.214 | 86.7 | 0.80 |
| 7 | 16.6 | 1.151 | 99.5 | 0.80 |
| 8 | 13.2 | 1.665 | 76.7 | 1.00 |
Fig. 17C

| Number | Label | Charge | SybylType | Xfrac + ESD | Yfrac + ESD | Zfrac + ESD | Symm. op. | Xorth | Yorth | Zorth |
|---|---|---|---|---|---|---|---|---|---|---|
| 1 | ZR01 | 0 | Zr | 0.601853 | 0.331931 | | 0.5 x,y,z | 4.340 | 3.054 | 6.920 |
| 2 | | | | | | | | | | |
| 3 | CL02 | 0 | Cl | 0.299978 | 0.186119 | | 0.5 x,y,z | 2.163 | 1.712 | 6.920 |
| 4 | C003 | 0 | C.3 | 0.566721 | 0.332806 | 0.317518 | x,y,z | 4.230 | 3.062 | 4.394 |
| 5 | H003 | 0 | H | 0.486643 | 0.377957 | 0.287578 | x,y,z | 3.509 | 3.477 | 3.980 |
| 6 | C004 | 0 | C.3 | 0.753961 | 0.398773 | 0.340803 | x,y,z | 5.444 | 3.669 | 4.717 |
| 7 | H004 | 0 | H | 0.796638 | 0.494611 | 0.327099 | x,y,z | 5.671 | 4.550 | 4.527 |
| 8 | C005 | 0 | C.3 | 0.798601 | 0.181388 | 0.364917 | x,y,z | 5.435 | 1.669 | 5.327 |
| 9 | H005 | 0 | H | 0.793498 | 0.092424 | 0.416421 | x,y,z | 5.720 | 0.850 | 5.680 |
| 10 | C006 | 0 | C.3 | 0.865728 | 0.3014 | 0.366548 | x,y,z | 6.242 | 2.773 | 5.350 |
| 11 | H006 | 0 | H | 0.984048 | 0.313608 | 0.412046 | x,y,z | 7.095 | 2.885 | 5.703 |
| 12 | C007 | 0 | C.3 | 0.592935 | 0.202187 | 0.343764 | x,y,z | 4.275 | 1.860 | 4.758 |
| 13 | H007 | 0 | H | 0.500848 | 0.133092 | 0.335579 | x,y,z | 3.605 | 1.224 | 4.647 |
| 14 | ZR01 | 0 | Zr | 0.398545 | 0.668049 | | 0.5 1-x,1-y,z | 2.870 | 6.146 | 6.920 |
| 15 | | | | | | | | | | |
| 16 | CL02 | 0 | Cl | 0.700022 | 0.813881 | | 0.5 1-x,1-y,z | 5.047 | 7.488 | 6.920 |
| 17 | C003 | 0 | C.3 | 0.433279 | 0.667134 | 0.317518 | 1-x,1-y,z | 2.980 | 6.138 | 4.394 |

Fig. 26

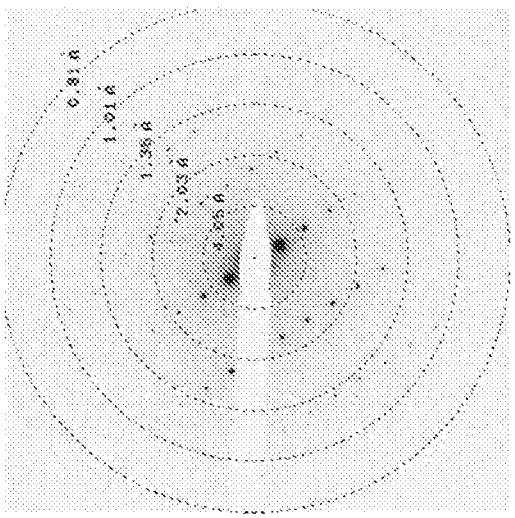
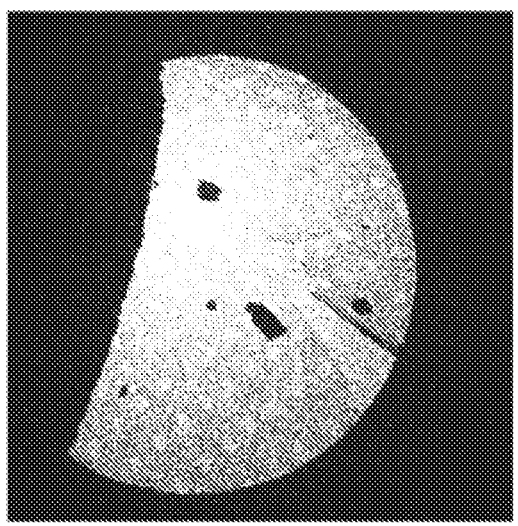
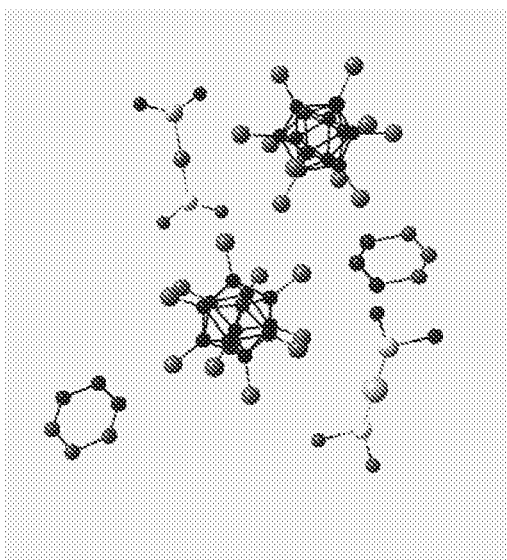
Fig. 35

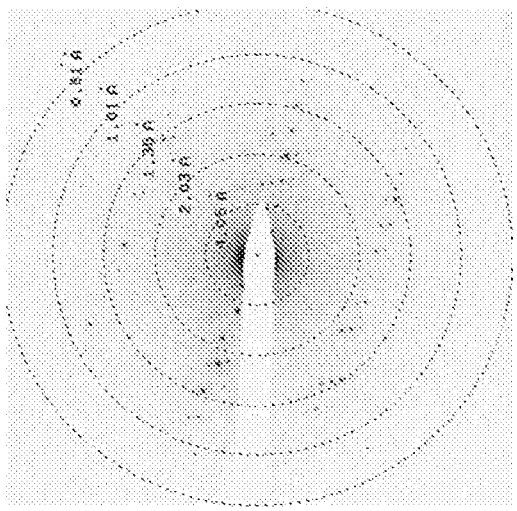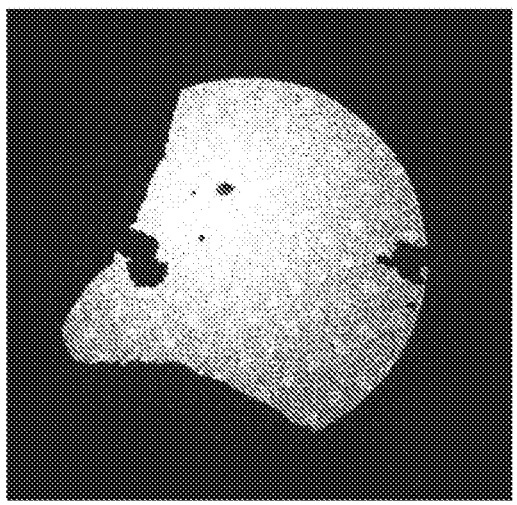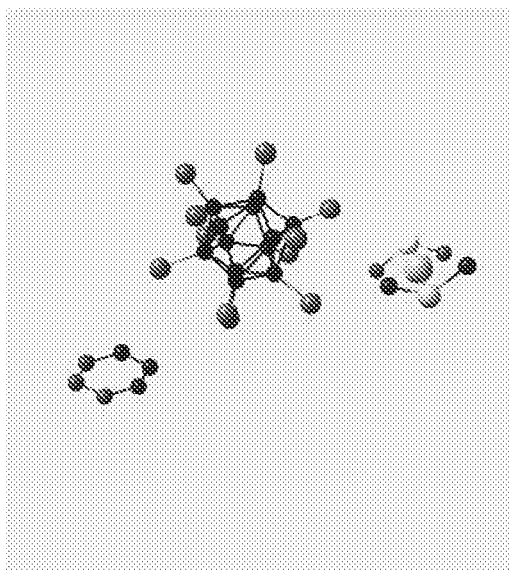
Fig. 36

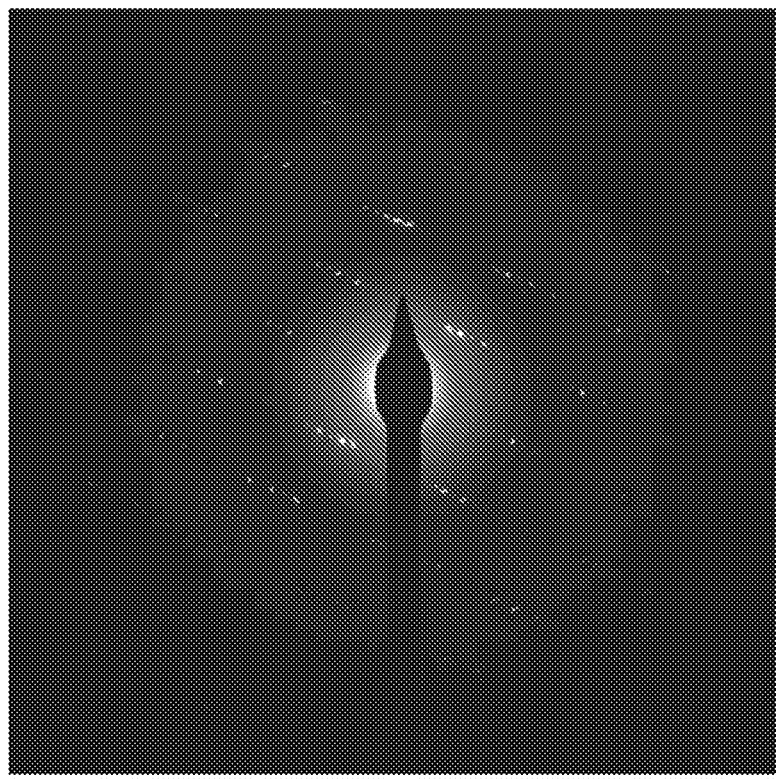
Fig. 40

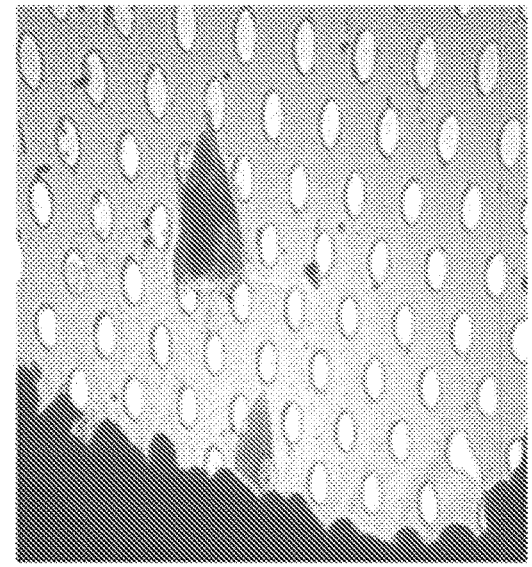
Fig. 49A
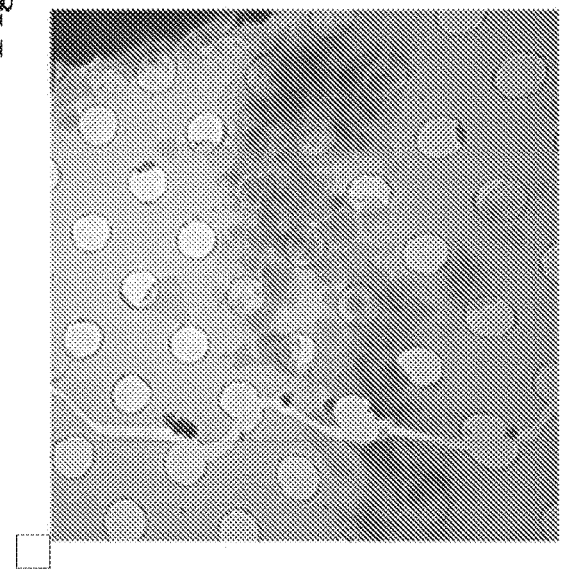
Fig. 49B
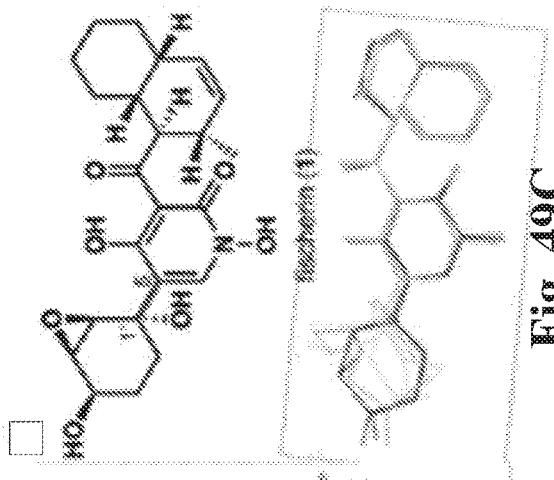
Fig. 49C
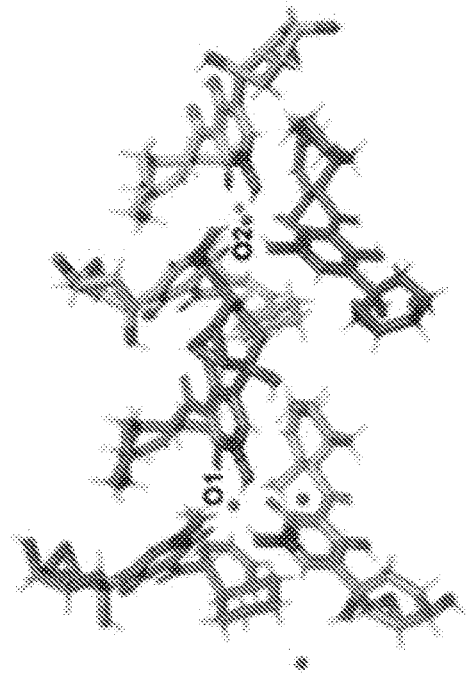

SYSTEMS AND METHODS FOR STRUCTURALLY CHARACTERIZING COMPOUNDS

RELATED APPLICATIONS

This application is a 371 National Stage of Application No. PCT/US20/50088, which claims a right of priority to and the benefit of the filing date of U.S. Provisional Application No. 62/903,269, filed on Sep. 20, 2019, and U.S. Provisional Application No. 62/903,276, filed on Sep. 20, 2019, each of which is hereby incorporated by reference in its entirety.

STATEMENT OF GOVERNMENT SUPPORT

This invention was made with government support under GM128936 awarded by the National Institutes of Health. The government has certain rights in the invention.

BACKGROUND

Several methods have been in common use to determine structural models of molecules such as proteins and smaller chemical compounds. For example, nuclear magnetic resonance spectroscopy can be used to infer an ensemble of structural models for small or medium-size molecules in solution, and electron microscopy can be used to obtain structural models for large biomolecules by imaging them directly. Out of all such methods, X-ray crystallography has been the gold standard for structural model determination, and remains the method used most often for structures deposited into the Protein Data Bank as well as for structures deposited into the Cambridge Structural Database.

Although a powerful method, X-ray crystallography requires one to obtain an adequate crystal that is at least 50 micrometers on each of its sides and is regular in structure when using common diffractometers. That typically is the most difficult part of this method, since many molecules fail to form such crystals, and since even for those that do form adequate crystals, finding the right conditions often entails a trial-and-error approach of screening a large set of conditions. Therefore, obtaining an adequate crystal is the main problem of X-ray crystallography. If such a crystal is not obtained, X-ray crystallography is unable to elucidate the structure.

In addition, characterization of individual compounds within complex mixtures is a significant challenge in chemical and biological sciences. Extracts obtained from biological samples such as cell lysates, bodily fluids, plants, and microbes often contain a multitude of components that cannot easily be identified due to their heterogeneity and low abundance. In chemical synthesis, chemists often to devote a significant portion of their time to separation and purification strategies in order to successfully determine if a desired product has been formed within a reaction, which can contain solvent, starting materials, and byproducts. While LCMS, GCMS, and tandem MS are among the most powerful tools for characterization of such mixtures for providing valuable information about molecular mass and fragmentation patterns, unambiguous identification of analytes remains challenging when compounds under examination are unknown or chemical transformations are subtle. These problems are especially acute for -omics fields, such as metabolomics, in which most studied compounds remain unidentified.

SUMMARY OF THE INVENTION

The main methods disclosed herein differ from traditional X-ray crystallography by the combination of at least three fundamental features into an integrated method: (1) using nanocrystals that are unsuitable for state-of-the-art X-ray crystallography; (2) using nanocrystals composed of chemical compounds whose molecular weight is smaller than typical proteins; and (3) using electron beams to obtain diffraction from said nanocrystals. The integration of these features into the disclosed methods allows determination of structural models of various types of molecules in minutes, significantly faster than typical X-ray crystallography, and with much less complex and arduous sample preparation. Because nanocrystals can often be readily formed in samples, without needing to be laboriously grown by a researcher, the main barrier of X-ray crystallography—obtaining an adequate crystal—is eliminated. In addition, since nanocrystals are likely formed by a greater variety of molecules than are larger crystals, the methods disclosed herein are applicable to a greater scope and number of molecules.

In addition, the disclosed systems and methods address some of the challenges by using MicroED (e.g., as exemplified in Examples 1 through 4) to unambiguously identify specific components present within heterogenous mixtures. Since MicroED allows the isolation and characterization of individual nanocrystals, it can be used to characterize single crystals and therefore eliminate interference from other constituents within a mixture. The disclosed methods provide a strategy involving MicroED that can be used to easily identify and characterize crystallized compounds within a mixture by using standard crystallography software and analysis to verify known unit cell parameters. If unit cell parameters or analytes are unknown, subsequent processing of the data can provide unambiguous structural characterization through either direct methods or molecular replacement. This approach therefore allows individual components of complex mixtures to be characterized with little to no additional effort in sample purification or separation.

Some of the embodiments disclosed herein include the following: (1) using the MicroED method as a verification tool to analyze individual components of a mixture and identify them through known unit cell parameters; (2) using MicroED for characterization and unambiguous structural determination of compounds isolated from crude reaction mixtures; and (3) using MicroED to characterize and identify metabolites from extracts of biological samples (e.g., derived from animal and plant components).

In one aspect, a method of collecting electron diffraction patterns for obtaining a three-dimensional structural model of a compound includes applying a sample that has a compound to an electron microscopy grid; positioning the grid in an electron microscope to place a nanocrystal of the compound in a path of accelerated electrons, in which the nanocrystal has a three-dimensional ordered array of copies of the compound; and recording electron diffraction patterns from the nanocrystal by tilting the grid in the electron microscope to place the nanocrystal in varied orientations with respect to the path of the accelerated electrons.

In certain embodiments, the method also includes immersing the grid in a cryogenic environment—created by a fluid—to maintain the nanocrystal within a cryogenic temperature range while recording the electron diffraction patterns. The nanocrystal can include, in its thinnest dimension, a length greater than 20 nanometers and less than 1000 nanometers, and the molecule can have a molecular mass greater than 50 Daltons and less than 2000 Daltons. The electron microscope can be operated at an accelerating voltage greater than 50 kV and less than 400 kV, and can be operated in diffraction mode to screen the grid for the nanocrystal when positioning the grid in the electron microscope to facilitate placing the nanocrystal in the path of accelerated electrons. In some embodiments, the recording of the plurality of diffraction patterns includes using a film, an image plate, an indirect charge-coupled device detector, an indirect complementary metal-oxide-semiconductor detector, or a direct monolithic active pixel sensor. As an example, in some embodiments, the recording of the plurality of diffraction patterns includes using a monolithic complementary metal-oxide-semiconductor detector. The method can also include positioning additional grids in the electron microscope to screen the additional grids for another nanocrystal. The electron microscope can be set to transmit a total accumulated exposure greater than 0.1 accelerated electrons per square angstrom and less than 10.0 accelerated electrons per square angstrom to the nanocrystal when recording the electron diffraction patterns. Orienting the grid in the electron microscope can include tilting the grid sequentially, in a continuous or stepwise manner, along a series of tilt angles having a range of at least 15 degrees.

In some embodiments, the method also includes determining reflection parameters including Miller indices and reflection intensities for a set of spots on the electron diffraction patterns; and determining unit-cell parameters and a space group for the nanocrystal based on the reflection parameters. The method can also include merging the reflection parameters from the nanocrystal with additional reflection parameters obtained from another nanocrystal of the molecule in the sample. The method can further include determining estimated phases for at least two spots among the set of spots using a method, which can be one or more of the Patterson methods, direct methods relying on three-phase invariance relationship, direct methods relying on random trials, dual-space recycling methods, and molecular replacement methods; and determining an estimated three-dimensional electrostatic potential map based on the reflection parameters and estimated phases. The method can also include determining an estimated three-dimensional structural model for the molecule based on the estimated three-dimensional electrostatic potential map. In some embodiments, the method also includes determining a refined three-dimensional structural model for the molecule by using an iterative procedure that determines improved phases by relying on the estimated three-dimensional structural model. In some embodiments, the refined three-dimensional structural model for the molecule can be determined in less than an hour after applying the sample comprising the molecule to the electron microscopy grid. In some embodiments, the refined three-dimensional structural model for the molecule is determined using electron diffraction patterns from only a single nanocrystal without relying on any electron diffraction patterns from a second nanocrystal. The sample can include a powder. The sample can be obtained from a material by evaporating a liquid from the material or by precipitating the sample from the material. In addition, the molecule can be a natural product, a metal-containing (organometallic) compound, a reactive intermediate of an organometallic compound, or a transition metal coordination complex.

In some aspects, a method of determining a polymorphic form of a crystal of a compound includes applying a sample that has a compound to an electron microscopy grid; positioning the grid in an electron microscope to place a nanocrystal of the compound in a path of accelerated electrons, in which the nanocrystal has a three-dimensional ordered array of molecules of the compound; recording electron diffraction patterns from the nanocrystal by orienting the grid in the electron microscope to place the nanocrystal in varied orientations with respect to the path of the accelerated electrons; and determining the polymorphic form of the compound based on the electron diffraction patterns.

In an additional aspect, a method of identifying a compound in a mixture includes applying a sample that comprises a mixture of known or unknown compounds to an electron microscopy grid; positioning the grid in an electron microscope to place a nanocrystal of the compound in a path of accelerated electrons, in which the nanocrystal has a three-dimensional ordered array of molecules of the compound; recording electron diffraction patterns from the nanocrystal by orienting the grid in the electron microscope to place the nanocrystal in varied orientations with respect to the path of the accelerated electrons; and identifying the compound based on the electron diffraction patterns or on distinctive features of the crystal such as morphology.

In one aspect, a method of characterizing a first compound from a sample having a first nanocrystal of the first compound includes recording, using an electron microscope and a detector, a first electron-diffraction-pattern set from the first nanocrystal. In some such embodiments, the sample further includes a second nanocrystal, which second nanocrystal is of a different polymorphic form of the first compound or which second nanocrystal is of a second compound having a chemical structure different from that of the first compound. Two chemical structures are different, for example, when their standard InChI representations are different.

In various embodiments, the method further includes recording, using the electron microscope and the detector, a second electron-diffraction-pattern set from the second nanocrystal; and characterizing, using the second electron-diffraction-pattern set, the first compound having the different polymorphic form or the second compound.

In some embodiments, the method further includes, prior to recording, applying a part of the sample to an electron microscopy grid in a powder form. Alternatively or additionally, the method may include, prior to recording, applying a part of the sample to an electron microscopy grid in a suspension form or in a colloid form. In some embodiments, the method includes, prior to applying the part of the sample to the electron microscopy grid, passing the sample through a chromatography column to obtain a first fraction comprising the first compound. The first fraction can include the first compound at a concentration higher than 0.1 µM and lower than 20 mM. In some embodiments, applying the part of the sample to the electron microscopy grid includes dispensing a first portion of the first fraction via a nebulizer, a micropipette, or a syringe onto the electron microscopy grid. The dispensing via the nebulizer, the micropipette, or the syringe can include using a robot arm.

In some embodiments, the method further includes subjecting a second portion of the first fraction to analysis by mass spectrometry or by tandem mass spectrometry. The first fraction can be selected based on ultraviolet-visible spectroscopy measurements obtained for output from the chromatography column. The method may further include obtaining from the chromatography column a second fraction of the sample having a second compound.

In any of these methods, characterizing the first compound can be based on unit cell parameters and space group determined from the first electron-diffraction-pattern set.

The characterizing can also be based on a three-dimensional structural model determined from the first electron-diffraction-pattern set. In addition, characterizing the first compound can include classifying polymorphic forms of the first compound. In some embodiments, characterizing the first compound comprises identifying a polymorphic form for the first compound. The first compound may be, for example, a reactive compound or an unstable compound. In certain embodiments, the method includes characterizing the second compound based on unit cell parameters and space group determined from the second electron-diffraction-pattern set. Alternatively or additionally, the method may include characterizing the second compound based on a three-dimensional structural model determined from the second electron-diffraction-pattern set.

In certain aspects, a method of screening compounds from a sample includes passing the sample through a chromatography column to obtain fractions; dispensing a portion of each fraction onto an electron microscopy grid different from any other electron microscopy grid onto which another portion of a fraction is dispensed; and recording, using an electron microscope and a detector, an electron-diffraction-pattern set from at least one nanocrystal of a compound present on one of the electron microscopy grids.

In various embodiments, dispensing may be performed using a nebulizer, a micropipette, or a syringe controlled by a robot arm. In some embodiments, the electron microscopy grids are disposed in multi-well plates.

In another aspect, a system for characterizing a compound from a sample includes a high-performance liquid chromatography module having a chromatography column and an ultraviolet-visible spectrometer; a dispensing module having a robot arm and a dispenser; and an electron microscopy module having an electron microscope and a detector. The dispenser may be, for example, a nebulizer, a micropipette, or a syringe. In certain embodiments, the dispenser is controlled by the robot arm.

BRIEF DESCRIPTION OF THE FIGURES

FIGS. 16A to 16D: Illustrations related to Pd(I) dimer 2 and the ethylene insertion product 3. (16A) Reaction of Pd(I) dimer 2 to form ethylene insertion product 3. (16B) X-ray crystal structure of complex 2. (16C) Ambient temperature electron diffraction structure of the ethylene insertion product 3. (16D) Coulomb potential map overlaid on the structure of 3. (The hydrogen atoms and solvents of crystallization (for 2) omitted for clarity).

FIGS. 17A to 17C: Illustrations of the structures obtained by ambient temperature MicroED method, as well as a sample electron diffraction pattern and a relevant data table. (17A) Chemical structures and Coulomb potential maps of common-use transition metal complexes. ORTEP diagram of Fe(acac)3 is provided. For ORTEP diagrams of other organometallic compounds, see FIGS. 18-24. (17B) Example of an electron diffraction pattern obtained from sub-micron scale crystals. Grid holes are 1 μm in diameter. (17C) A table showing data and statistics obtained by ambient temperature MicroED.

FIG. 26: A table showing the fractional coordinates of the two hydrides as predicted by the refined solution generated by SHELXLE.

FIG. 35: An illustration depicting a sample grid (middle panel), a sample electron diffraction pattern (right grid), and a sample three-dimensional model for gold-carborane complex solved in space group P1 (left panel).

FIG. 36: An illustration depicting a sample grid (middle panel), a sample electron diffraction pattern (right grid), and a sample three-dimensional model for gold-carborane complex solved in space group P2(1)/n (left panel).

FIG. 40: An illustration depicting the crystals formed and their observed diffraction form evaporation of carbamazepine from 10 μL injection.

As shown in FIG. 1d, the biosynthetic gene cluster, which contains FinD, is indeed responsible for formation of 1.

FIG. 49A to FIG. 49C. Structure of fischerin (1). 49A, Electron micrograph of fischerin (1) microcrystalline aggregates (left) and at maximum stage tilt (ca. 60°, right); holes are 1 μm wide in diameter. 49B, Asymmetric unit showing two trimers. 49C, Proposed relative stereochemistry and overlay of six fischerin (1) molecules showing various degrees of epoxydiol ring rotation (hydrogens omitted for clarity).

DETAILED DESCRIPTION OF THE INVENTION

Figure 1:
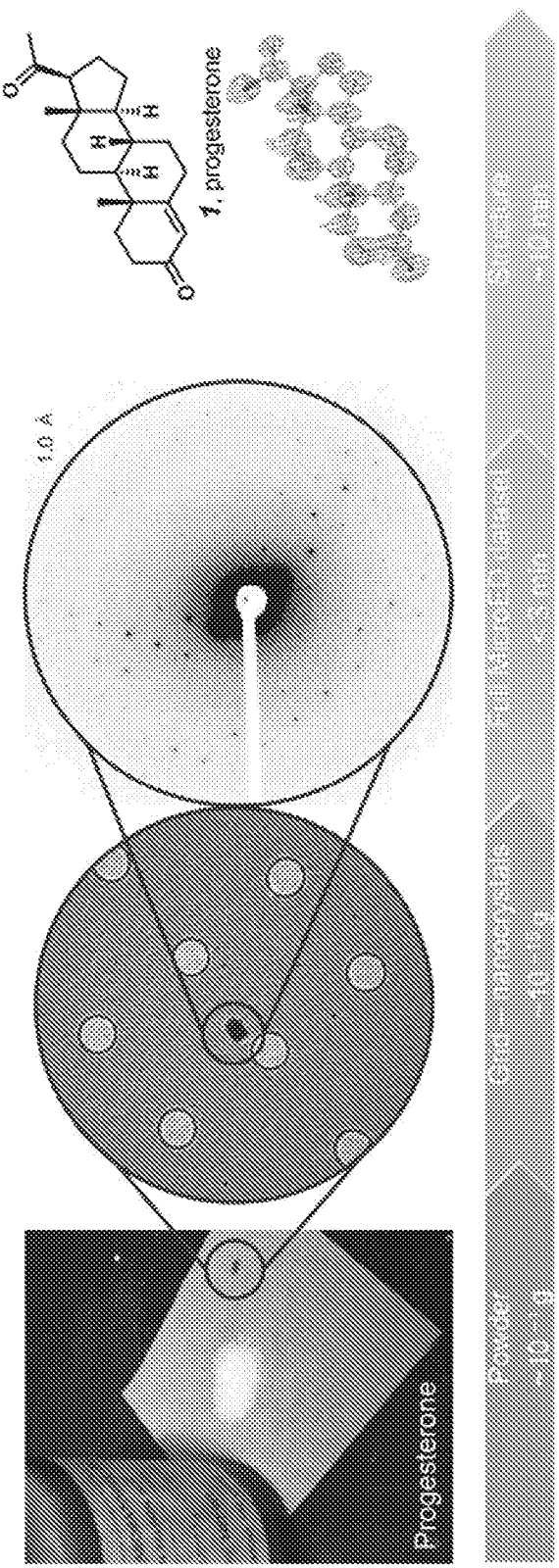
FIG. 1: A schematic depicting a process of applying MicroED to small molecule structural analysis. Commercial progesterone (1) (as denoted in Examples 1 & 2, which relate to FIGS. 1 through 14; progesterone and this figure also relate to Example 5) was analyzed, and an atomic resolution structure was determined at 1 Å resolution. Grid holes are 1 μm in diameter.

The present disclosure provides methods of collecting electron diffraction patterns from nanocrystals to obtain a three-dimensional structural model of a compound. The disclosed methods include applying a sample comprising a compound to an electron microscopy grid, positioning the grid in an electron microscope to place a nanocrystal in a path of accelerated electrons, and recording electron diffraction patterns from the nanocrystal by orienting the grid in the electron microscope to place the nanocrystal in varied orientations with respect to the path of the accelerated electrons. The present disclosure also provides methods of identifying compounds and methods of determining polymorphic forms.

In addition, the present disclosure provides methods of characterizing a first compound from a sample having a first nanocrystal of the first compound, which methods include recording, using an electron microscope and a detector, a first electron-diffraction-pattern set from the first nanocrystal. Also disclosed are methods of screening compounds from a sample, which methods include passing the sample through a chromatography column, dispensing a portion of each fraction onto an electron microscopy grid, and recording electron-diffraction-pattern sets. The present disclosure also provides systems for characterizing a compound from a sample, which systems include modules for high-performance liquid chromatography, dispensing, and electron microscopy.

Definitions

As used in this specification, "a" and "an" can mean one or more. As used herein in the claim(s), when used in conjunction with the word "comprising," the words "a" and "an" can mean one or more than one. As used herein, "another" can mean at least a second or more.

A "three-dimensional structural model" of a molecule is a model of its molecular geometry, and describes the three-dimensional arrangement of its atoms. For example, in a Cartesian coordinate system for a three-dimensional space, the set of (x, y, z) coordinates for each atom of the molecule would describe the three-dimensional arrangement of the atoms. The three-dimensional structural model of a molecule can describe the three-dimensional arrangement of all of its atoms, or can describe the three-dimensional arrangement of fewer than all of its atoms. In particular, the three-dimensional structural model of a molecule describes the identity (e.g., via an atomic number) and three-dimensional arrangement (e.g., with respect to a chosen reference frame, for example in a Cartesian coordinate system having an atom of the molecule at its center) of at least 60% (e.g., 65%, 70%, 75%, 80%, 85%, 90%, 95%, 100%) of the non-hydrogen atoms of the molecule. The three-dimensional structural model of a molecule can describe the connectivity of the molecule's atoms, and can identify the molecule; it need not describe a solution conformation of the molecule. It also need not identify the stereochemistry of the molecule. In addition, the bond lengths and angles need not correspond to those of an average ensemble solution conformation.

An "electron microscopy grid" is the support onto which a sample can be applied. An electron microscopy grid can be disk-shaped (e.g., 3.05 mm diameter). It can be made from a metal such as copper, gold, platinum, stainless steel, titanium, nickel, aluminum, or molybdenum. Its structure can include various patterns, such as mesh, hexagonal, slot, hole, or notch. The electron microscopy grid can be covered with one or more layers of an electron semi-transparent substrate such as carbon that may be perforated.

"Applying" a sample to an electron microscopy grid includes placing a part of the sample onto a side of the electron microscopy grid, after which the molecules in the sample may be on the surface of a layer of carbon, or may be within the holes if a holey grid is being used.

A "three-dimensional ordered array" of a molecule contains a motif that is repeated throughout a part of a crystal by lattice translations. The motif can contain more than one molecule, or can contain less than one molecule.

A "nanocrystal" includes a three-dimensional mosaic. It can include one of the seven types of fundamental unit cells (i.e., triclinic, monoclinic, orthorhombic, rhombohedral, tetragonal, hexagonal, cubic), and can include one of the fourteen Bravais lattices. The convolution of the motif with the choice of lattice can describe the nanocrystal. The nanocrystal can have a dimension, in nanometers, between 20 and 100, 20 and 200, 20 and 400, 20 and 800, 20 and 1000, 20 and 1500, or 20 and 2000. The other dimensions of the nanocrystal can be larger (e.g., 1, 2, 4, 6, 8, 10 micrometers).

The "unit-cell parameters" include the lengths of the three edges of the unit cell. Depending on the type of unit cell, fewer than three values may suffice to describe the unit-cell parameters. For example, for a cubic unit cell, each of the edges would have the same length; thus, a single value for an edge can be sufficient as length information. The unit-cell parameters can also include the three angles of the unit cell. As with edges, fewer than three values may suffice to describe the angles for some of the unit-cell types.

The "space group" describes the overall symmetry of the nanocrystal, and can be one of the 230 possible space groups. Exemplary space groups include $P_1$, $P2_12_12$, and $C_2$. For a biological molecule (e.g., peptide), 65 of the 230 space groups can be relevant, since the absence of mirror planes, glide planes, centers of symmetry, or rotation inversion axes in such molecules make the remaining space groups inapplicable. See, e.g., Cantor & Schimmel, *Biophysical Chemistry, Part II: Techniques for the Study of Biological Structure and Function*, p. 736 (W. H. Freeman and Company 1980).

"Recording" an electron diffraction pattern includes obtaining a description of the electron diffraction pattern in any of the available detection means, such as on a film, an image plate, via an indirect charge-coupled device (CCD) detector, via an indirect complementary metal-oxide-semiconductor (CMOS) detector, via direct monolithic active pixel sensors (MAPS) (e.g., based on CMOS technology or pnCCDs), or via a hybrid pixel detector (e.g., HPAD).

A "cryogenic fluid" is a liquefied gas that can be kept in liquid state at temperatures below −150° C. An exemplary cryogenic fluid is liquid nitrogen.

The term "phase" is used herein in the sense of the phase of the diffracted electrons described as electromagnetic waves having an electric field amplitude as a function of time and space that depends on a maximal amplitude, phase, and wavelength.

A "polymorphic form" of a molecule results from an arrangement or conformation of the constituents of its nanocrystal that might differ from another nanocrystal of the same molecule.

Systems for Determining Structural Models

In some aspects, the methods disclosed herein use electron microscopes (e.g., transmission electron microscopes). Standard electron microscopes can be used, without modification, for carrying out the methods disclosed herein. Some of the sources for obtaining electron microscopy instruments include Thermo Fisher Scientific (168 Third Avenue, Waltham, MA USA 02451); Hitachi High Technologies America, Inc. (10 North Martingale Road, Suite 500, Schaumburg, IL 60173-2295); and JEOL Ltd. (3-1-2 Musashino, Akishima, Tokyo 196-8558, Japan). In principle, another electron source can be used, regardless of whether it is a part of an electron microscope; however, the standard electron microscopes are highlighted here in particular because of their common availability. When an electron microscope is used, it can be operated at a suitable voltage, for example between 50 kV and 400 kV. Suitability of a voltage can be determined by considering the de Broglie wavelength of the electrons in light of the desired resolution as well as by considering the permissible range of electron doses in light of the tolerable radiation damage. For example, the de Broglie relationship provides the wavelength of an electron as $\lambda=h/(m_e v)$, in which $\lambda$ is the wavelength of the electron, h is the Planck's constant, $m_e$ is the mass of the electron, and v is the velocity of the electron. Given that an electron accelerated by a voltage difference of $\Phi$ in volts will have a kinetic energy of $e\Phi=(\frac{1}{2})m_e v^2$, solving the two equations provides the wavelength in Angstroms of the electron in terms of the electron microscope voltage in volts as $\lambda=12.3/\sqrt{\Phi}$. See, e.g., Cantor & Schimmel, *Biophysical Chemistry, Part II: Techniques for the Study of Biological Structure and Function*, p. 820 (W. H. Freeman and Company 1980). Using this equation, one can determine that the wavelength of the electron would approximate 0.06 Å at a voltage of 40 kV, 0.04 Å at a voltage of 100 kV, 0.03 Å at a voltage of 200 kV, and 0.02 Å at a voltage of 300 kV. Each of these wavelengths is sufficient to resolve the individual atoms of a molecule, and is shorter than the typical wavelengths of X-rays used in X-ray crystallography.

Various detectors can be used to record electron diffraction patterns. For example, films, image plates, indirect charge-coupled device detectors, indirect complementary metal-oxide-semiconductor detectors, direct monolithic active pixel sensors, or hybrid pixel detectors can be used. These may be obtained from sources similar to those for electron microscopes, as well as from other sources such as Gatan, Inc. (5794 W. Las Positas Blvd., Pleasanton, CA 94588) (e.g., for CCD or CMOS cameras, as well as for specimen holders) and Electron Microscopy Sciences (P.O. Box 550, 1560 Industry Road, Hatfield, PA 19440) (e.g., for Kodak films). These detectors can be used without modification or without creating any specialized arrangements that differ from those used for traditional transmission electron microscopy (e.g., used in diffraction mode). Although hybrid pixel detectors are more advanced than the other types of detectors in some ways, use of them is not necessary for the methods disclosed herein: any of the commonly available detectors can be used to practice the disclosed methods. For methods that require obtaining structural information quickly however (e.g., within an hour), traditional Kodak films are impractical; thus, in such cases, digital detectors (e.g., indirect CCD, indirect CMOS, direct CMOS or other MAPS, or HPAD) are preferred. In some embodiments, the detectors used are indirect CMOS detectors.

In some embodiments, the used detectors are direct electron detectors or electron counting devices. For example, direct detection devices (DDD) from Gatan Inc. (5794 W. Las Positas Blvd., Pleasanton, CA 94588), FEI (5350 NE Dawson Creek Drive, Hillsboro, Oregon 97124 USA; operating as a subsidiary of Thermo Fisher Scientific), or Direct Electron, LP (13240 Evening Creek Drive, Suite 311, San Diego, CA 92128 USA) can be used. Some of the particular such devices include Gatan K3, FEI Falcon 3EC, and Direct Electron DE-20. See generally G. McMullan, A. R. Faruqi, and R. Henderson, Direct Electron Detectors, *Methods in Enzymology* 579: 1-17.

Electron microscopy grids can be obtained from Ted Pella, Inc. (P.O. Box 492477, Redding, CA 96049-2477); Millipore Sigma (3050 Spruce St., St. Louis, MO 63103); as well as from Electron Microscopy Sciences (P.O. Box 550, 1560 Industry Road, Hatfield, PA 19440).

In some aspects, the methods disclosed herein use chromatography modules, such as HPLC modules. These can be obtained from various sources, such as Waters Corporation (34 Maple Street, Milford, MA 01757); Thermo Fisher Scientific (168 Third Avenue, Waltham, MA USA 02451); Shimadzu Scientific Instruments (7102 Riverwood Drive in Columbia, MD); and Agilent Technologies, Inc. (5301 Stevens Creek Blvd., Santa Clara, CA 95051).

In some aspects, the methods disclosed herein use mass spectrometry modules, such as MS or tandem MS modules. These can be obtained from various sources, such as JEOL Ltd. (3-1-2 Musashino, Akishima, Tokyo 196-8558, Japan); Thermo Fisher Scientific (168 Third Avenue, Waltham, MA USA 02451); Waters Corporation (34 Maple Street, Milford, MA 01757); Agilent Technologies, Inc. (5301 Stevens Creek Blvd., Santa Clara, CA 95051); and Shimadzu Scientific Instruments (7102 Riverwood Drive in Columbia, MD).

For automation, a robot arm such as a modified CTC autosampler, Freeslate robot, or opentron robot can be used to dispense fractionated analytes onto 96- and 384-well plates (or other multi-well plates). An exemplary automation has been programmed to read outputs of UV/Vis signals from an HPLC module to then dispense individual peaks onto single TEM grids via nebulizer, micropipette or syringe. This allows for high throughput screening of compounds in multiple fields of science. Through this process, biological samples obtained from crude plant extracts and animal serum samples were and can be purified by HPLC with corresponding MS peaks to UV/Vis signals and dispensed onto TEM grids for analysis using microED.

Samples of Molecules

In some aspects, the samples used in the methods disclosed herein are in powder form. The sample may already be in powder form, for example as obtained from a commercial supplier. Alternatively, the sample may be obtained from a solid material. The solid material might be used directly or might be ground into powder form (e.g., between two regular light microscopy slides, or via a mortar). The solid material itself can be obtained by evaporating a liquid from another material or by precipitating the solid material from the other material. For example, rotary evaporation can be used to obtain a solid material. Before rotary evaporation, the material can be passed through a chromatography column (e.g., silica gel).

In particular, it is not necessary to perform any specific or deliberate crystallization efforts or procedures to obtain crystals, since as has been found, even seemingly amorphous samples can contain nanocrystals that reveal themselves in an electron microscope. For that reason, the methods disclosed herein can eliminate the arduous task of obtaining a crystal for structural model determination projects. On the other hand, in other embodiments, if a well-grown crystal is already available or is obtained though crystallization methods, a nanocrystal can also be obtained from such a crystal by breaking it up into smaller crystals (e.g., through sonication or mechanical means).

In some embodiments, a full electron diffraction pattern set can be collected from a single nanocrystal, allowing for the determination of a three-dimensional structural model for the molecule from that single nanocrystal without relying on any other nanocrystal. The nanocrystal can have two of its dimensions (e.g., edges) longer than a micrometer (e.g., 1.1, 1.5, 2, 3, 4, 5, 6, 7, 8, 9, 10 micrometers), while one of its dimensions can be shorter than two micrometers (e.g., 20, 40, 60, 80, 100, 150, 200, 250, 300, 350, 400, 450, 500, 600, 700, 800, 900, 1000, 1500 nanometers). The methods disclosed herein can be used without confirming the presence of the nanocrystals beforehand (e.g., via regular human vision or via common light microscopes, which may fail to detect the nanocrystals); the samples can be loaded into an electron microscope in order to locate the nanocrystals once the sample grid is already in the electron microscope.

The sample can be applied to an electron microscopy grid. Before applying the sample, the electron microscopy grid can be layered with a thin layer of carbon by evaporating carbon graphite on it. The electron microscopy grid can be further subjected to glow discharging to improve the way the nanocrystals in the sample distribute on the grid. One the sample is applied to the grid, the grid may further be surrounded by a cryogenic fluid to maintain the nanocrystals at a cryogenic temperature for further data collection. In some embodiments, electron diffraction patterns can also be obtained from samples kept at or near room temperature, as is exemplified in Examples 3 and 4.

In certain embodiments of the methods disclosed herein, a molecule can have an atomic mass, in Daltons, between 100 and 500, 100 and 750, 100 and 1000, 100 and 1500, 100 and 2000, 100 and 2500, 100 and 3000, or 100 and 4000.

Samples that can be analyzed by the disclosed methods include artificially blended mixtures and crude isolated products from chemical reactions. For biologically derived samples, crude extracts from plant matter, cell lysates, and animal blood, serum, plasma, and feces were and can be used. Biological samples can be obtained through simple extraction procedures that are commonplace in laboratory settings using aqueous and organic solvents such as methanol (MeOH), ethanol (EtOH), chloroform ($CHCl_3$), dichloromethane (DCM), diethyl ether ($Et_2O$), ethyl acetate (EtOAc), acetone and acetonitrile (MeCN). The extraction process can be performed on ground or otherwise processed plant matter or from animal samples. This analysis can also be applied to mixtures of known or unknown compounds that can be isolated through different extraction procedures. The disclosed systems and methods eliminate the need for extensive purification or separation processes, as crude crystalline mixtures can be analyzed using the disclosed methods to identify individual substituents.

Using the disclosed methods, drop-casted samples of analyte can be detected and structural information can be obtained in the picogram range (~250 ppb). Micropipettes and syringes can be used to cast single droplets of dilute analyte solutions (up to 1 µM) onto TEM grids that are then evaporated upon standing. Additionally, using an existing HPLC, split lines can be introduced between a mass spectrometer (MS) and a separate nebulizer for analyte deposition. In this way, one is able to track molecular mass and purify complex mixtures of compounds while dispensing nanodroplets of the separated analytes through a nebulizer spray. Crude compound mixtures can be concentrated and dissolved in an appropriate solvent including water, methanol, acetonitrile, isopropanol, hexanes or mixtures thereof (e.g., water/acetonitrile/methanol or hexanes/isopropanol). After filtration through a micron filter, the samples can be employed in this HPLC-microED process. Purified samples can also be employed in this process via directly injecting, nebulizing and/or spraying the analyte. The structural information that can be gathered by the combination of HPLC-MS and microED allows unprecedented unambiguous identification of unknown analytes.

Methods of Collecting Electron Diffraction Patterns

In some aspects, the disclosure relates to collecting electron diffraction patterns from a nanocrystal of a molecule. Such patterns can be collected using a standard transmission electron microscope. The electron microscopy grid containing a nanocrystal of the molecule can be inserted into the electron microscope using a sample holder, which in some embodiments, can keep the nanocrystal at a cryogenic temperature range. Once the grid is placed in the path of electrons, it can be further scanned to locate the nanocrystal. This can be accomplished under low electron dose both in imaging mode and in diffraction mode. In some embodiments, using the diffraction mode for scanning is preferred (e.g., to reduce hysteresis).

After the nanocrystal is located, it (i.e., a portion of it or the entirety of it) can be exposed to the electron beam in diffraction mode to record an electron diffraction pattern. Changing the orientation of the nanocrystal, by changing the orientation of the sample holder that holds the grid (e.g., through a series of tilt angles), one can obtain multiple electron diffraction patterns to sample an adequate number of reciprocal lattice points within the limiting sphere. In some embodiments, the sample stage is continuously rotated (e.g., 0.1, 0.2, 0.3, 0.4, 0.5, 0.6, 0.7, 0.8, 0.9 deg/s) through a range of tilt angles (e.g., 90, 100, 110, 120, 130, 140 degrees), and the data set is collected as a movie. In other embodiments, data for different orientations of the nanocrystal can also be obtained through other methods, such as oscillation, precession, or Weissenberg as is possible with X-ray crystallography.

Methods of Determining Structural Models of Molecules

In some aspects, the methods used to determine structural models of molecules are the standard ones used in X-ray crystallography. Although there are fundamental differences between X-ray diffraction and electron diffraction (e.g., kinematic theory of diffraction vs. dynamical theory of diffraction, diffraction from electron clouds vs. diffraction from the electrostatic potential generated by both the protons and the electrons), ignoring such differences does not bar obtaining a three-dimensional structural model of a molecule. In some embodiments, one or more of these particular nuances of electron diffraction can also be taken into account. In additional embodiments, other refinements, such as those considering the transmission function of the electron microscope for generating the diffraction pattern, the transfer function for generating the image amplitudes from the diffraction pattern, or particular imperfections of the detection system (e.g., differences between the pixels along an x-axis and those along a perpendicular y-axis) can be implemented in the analysis. For quick structural identification, such refinements are typically not necessary. Various options available in X-ray crystallography software, such as the refinement of anisotropic temperature factors, can also be made us of for electron diffraction.

Regarding the available programs for X-ray crystallography applicable to the disclosed methods, using the collection of programs within the CCP4 suite (available from the World Wide Web at ccp4.ac.uk/), one can index and integrate the reflections (e.g., using iMosflm, xia2/DIALS); reduce the data to a higher quality subset (e.g., using AIMLESS); estimate phases from molecular replacement (e.g., using PHASER, MOLREP); estimate phases using direct methods (e.g., SHELXD); and refine structural models (e.g., using REFMAC5), in addition to performing numerous other steps for determining structural models. The theories underlying these implementations are available through numerous publications (e.g., B. Rupp, *Biomolecular Crystallography: Principles, Practice, and Application to Structural Biology*, (Garland Science, ed. 1, 2009) for biomolecules; G. Taylor, Introduction to Phasing, *Acta Crystallographica Section D* 66: 325-38 (2010); K. Cowtan, Phase Problem in X-ray Crystallography, and Its Solution, *Encyclopedia of Life Sciences* 1-5 (2001); and I. Uson & G. M. Sheldrick, Advances in Direct Methods for Protein Crystallography, *Current Opinion in Structural Biology* 9: 643-48 (1999) for phasing). For indexing and integration, one can also use XDS, and for direct methods of estimating phases, one can also use SHELXT or SnB.

While direct methods are preferred in some embodiments for small molecules, for larger molecules such as peptides near or exceeding 2000 Daltons, one may also use suitable methods that make use of isomorphous replacement, anomalous scattering, or various specific implementations of both to estimate the phases.

Methods of Determining Polymorphic Forms and Identifying Molecules

In some aspects, the disclosure relates to determining polymorphic forms of a molecule. In such methods, one may use the same methods described herein for determining a three-dimensional structural model of a molecule. However, one may alternatively use only a subset of the steps needed to determine a full structural model: one may simply determine the unit-cell parameters in some embodiments without proceeding further with the full structural model determination. In some embodiments, depending on prior knowledge about the purity and identity of the molecule in sample and any knowledge about the potential polymorphic forms of the molecule, one may determine the following to infer the polymorphic form of the molecule: only the unit-cell edges; the unit-cell edges and the unit-cell angles; the unit-cell parameters and the space group. Since the methods of determining structural models of molecules disclosed herein are fast (e.g., minutes from powder to structure for some molecules), in some embodiments, determining the polymorphic form entails determining the structural model of the molecules as well as the composition and parameters of the unit cell.

These same methods can also be used to identify a molecule in a mixture. For example, as with determining polymorphic forms, if there is prior knowledge about the unit cell parameters of a molecule, then mere determination of unit cell parameters for a nanocrystal in a sample having a mixture can be sufficient to determine that the sample contains that identified molecule. Even when there is no such prior knowledge, once can determine a structural model for a molecule in a mixture the same way as with determining a structural model for a molecule in a relatively homogenous sample, since once a single nanocrystal is positioned in the path of the electrons, the presence of other heterogeneities at other parts of the grid would not affect the diffraction patterns from the single chosen nanocrystal.

Samples of Mixtures

Disclosed herein are methods to separate complex mixtures of compounds and analyze them using electron diffraction (ED). Included among various embodiments are various methods of sample preparation and automation. In certain preferred embodiments, the method starts with HPLC, and subsequent to UV/Vis analysis, the signal is split for an MS analysis from one output and an ED analysis from another output. In some embodiments, a nebulizer is used to form nanodroplets which are then deposited on an EM grid. Alternatively, a micropipettor or syringe may be used to put droplets on the EM grid. The dispensing devices can be controlled by a robot arm, such as a modified CTC autosampler, a Freeslate robot, or an Opentron robot. The robot can be programmed to deposit onto TEM grids based on UV/Vis peaks or when a desired analyte is detected by mass spectrometry. The EM grids can be contained within 96-well plates or other multi-well plates (e.g., 384-well plates). ED can be performed on these samples using the methods exemplified in Examples 1 through 4. In some embodiments, while dispensing the samples onto grids, for example using nebulizers to spray nanodroplets, the droplet size, solvent mixture composition, and temperature can be used to modulate crystal size, crystallization rate, and dispersion.

Crude mixtures can be crystallized directly and loaded onto TEM grids for data collection (see Examples 6, 7, and 10 for better defined mixtures, and Examples 11 and 12 for cruder mixtures). This flexibility obviates the need for traditional crystallization efforts to grow well-defined, large single crystals for X-ray diffraction. Furthermore, the microED method allows identification of structures within solid mixtures. Structural data can be gathered from simple precipitation as well. In other cases, crude mixtures can be concentrated and dissolved in an appropriate solvent including water, methanol, acetonitrile, isopropanol, hexanes or mixtures thereof (e.g., water/acetonitrile/methanol and hexanes/isopropanol). After filtration through a micron filter, the samples can be deposited onto TEM grids or dry loaded by directly placing a powder on the surface of the grid.

MicroED analysis can be conducted using standard, commercially available TEMs and CCD detectors. The data collection procedure is analogous to that outlined in Examples 1 through 4, whereby micro- and nanocrystals are illuminated by an electron beam in diffraction mode and data is collected over a range of angles through continuous stage rotation. Individual crystals can be isolated using a selected area aperture to reduce background noise and prevent overlapping diffraction from additional components of the mixture. This data collection process can be performed under either cryogenic or ambient temperatures depending on the sensitivity of the sample. Freely available conversion tools are used to convert raw diffraction movies to img files which can then be indexed and integrated using standard crystallographic software packages such as XDS (W. Kabsch, Xds. *Acta Crystallogr. Sect. D Biol. Crystallogr.* 66, 125-132 (2010)). Identity of individual crystals can be confirmed through the verification of unit cell parameters from indexed and integrated data, demonstrating a rapid and easy way to distinguish individual components within a mixture if unit cell parameters of such compounds are known. Furthermore, data can be subsequently processed and solved through direct methods with software such as SHELX to generate an ab initio crystallographic solution for which unambiguous structural verification of individual compounds can be achieved.

EXAMPLES

Example 1: The CryoEM Method MicroED as a Powerful Tool for Small Molecule Structure Determination In the many scientific endeavors that are driven by organic chemistry, unambiguous identification of small molecules is of paramount importance. Over the past 50 years, NMR and other powerful spectroscopic techniques have been developed to address this challenge. While almost all of these techniques rely on inference of connectivity, the unambiguous determination of a small molecule's structure requires X-ray and/or neutron diffraction studies. In practice, however, X-ray crystallography is rarely applied in routine organic chemistry due to intrinsic limitations of both the analytes and the technique. Here we report the use of the electron cryo-microscopy (cryoEM) method microcrystal electron diffraction (MicroED) to provide routine and unambiguous structural determination of small organic molecules. From simple powders, with minimal sample preparation, we could collect high-quality MicroED data from nanocrystals (~100 nm, ~$10^{-15}$ g) resulting in atomic resolution (<1 Å) crystal structures in minutes.

The cryo-electron microscopy (cryoEM) method microelectron diffraction (MicroED) is described herein as a new technique for routine structural analysis providing high-resolution crystal structures from seemingly amorphous powders.

The history of organic chemistry closely parallels the development of new methods for structural characterization. The earliest studies were driven by melting point determination, and over the past 175 years more complex methods for interrogation of structure have been developed. Techniques such as polarimetry,[1] UV-vis,[2] and infrared spectroscopy,[3] coupled with electron paramagnetic resonance,[4] vibrational circular dichroism,[5] circular dichroism,[6] and mass spectrometry[7] have been commonly employed over the years, dramatically expanding our ability to assign structures. In the past 50 years, however, the explosion of NMR spectroscopy[8] and the accompanying abundance of individual NMR experiments have produced a wealth of detailed structural information for organic chemists. Indeed, NMR is a mainstay in chemistry and the most predominant method employed in both routine synthetic chemistry experiments and in advanced structural elucidation of complex small molecules. In the current state of the art, only single crystal X-ray diffraction holds a higher place in terms of precision, producing unequivocal structural information about the position, orientation, connectivity, and placement of individual atoms and bonds within a given molecule.

For decades, small molecule X-ray analysis has been the definitive tool for structural analysis.[9] This technique, however, is not without limitations. The process is considered by many an art, where the production of high-quality crystals suitable for X-ray diffraction requires uncodified "tricks of the trade" as well as a certain amount of luck! Additionally, even after a substance has been successfully crystallized, there is no guarantee that the particular crystal form will be amenable to X-ray diffraction. Since crystal growth is both a slow and arduous process, X-ray diffraction has not been an effective tool for rapid, on-the-fly structural determination of small molecules. For this reason, X-ray diffraction is generally not implemented as a routine analytical tool for the practicing organic chemist, despite the fact that the structural data provided are far superior to any other characterization method to date.

Results and Discussion

Herein, we employ electron cryo-microscopy (CryoEM) method microcrystal electron diffraction (MicroED)[10] to address the long-standing need for fast and reliable structure determination in organic chemistry. Recently, electron diffraction was used to solve the structure of a methylene blue derivative, although no scope studies were undertaken to allow the reader to assess the applicability of the methodology.[11] Moreover, a specialized detector was used for the experiments, limiting the broad adaptability of the described approach to the wider synthetic community.[11] We demonstrate that with minimal sample preparation and experiment time, simple powders and seemingly amorphous materials (in some cases, solids isolated via silica gel chromatography and rotary evaporation) could be directly used in MicroED studies, leading to rapid, high-quality structural elucidation of several classes of complex molecules with atomic resolution, in many cases better than 1 Å. Moreover, we utilize a commercially available microscope that is already in use at universities around the world. MicroED has the potential to dramatically accelerate and impact the fields of synthetic chemistry, natural product chemistry, drug discovery, and many others by delivering rapid, high-resolution atomic structures of complex, small molecules with minimal sample preparation or formal crystallization procedures.

The applicability of MicroED was initially tested on the naturally occurring steroid progesterone (1) as a model system (FIG. 1). The sample was obtained as a powder from chemical supplier Preparations Laboratories Inc. (we estimate the bottle to be more than 20 years old). Small quantities of the seemingly amorphous solid were transferred directly from the bottle onto glass cover slides and ground between another slide to produce a fine powder. The powder was then deposited on a holey carbon-copper grid, cooled to liquid nitrogen temperatures, and transferred to a cryoelectron microscope operating at an acceleration voltage of 200 kV (Thermo Fisher Talos Arctica). An overview of the preparation is shown in FIG. 1. Upon imaging, thousands of nanocrystals were easily discernible on the grid surface providing ample nanocrystals to investigate for diffraction. Typically, for samples such as these, the vast majority of nanocrystals diffracted to ~1 Å resolution or better (FIG. 1). Through continuous rotation of the sample stage, 140 degrees of diffraction data could be collected from a single nanocrystal,[12] while the improved autoloader and piezo stage of the Talos Arctica allowed us to travel through the zero degree point without introducing errors in crystal position. Typically, the stage was rotated at approximately 0.6 deg/s, and an entire data set was collected in less than 3 min as a movie using a bottom mount CetaD CMOS detector (Thermo Fisher) fitted with a thick scintillator for diffraction studies. Software adapted from previous studies[13] was used to convert the diffraction movie frames into SMV format for expeditious processing in the readily available XDS software package commonly used for X-ray crystallography.[13] By collecting data from just a single nanocrystal, the structure of steroid 1 was resolved to an impressive 1 Å resolution. The entire process, from bottle to structure, was easily accomplished in less than 30 min.

Figure 2A:
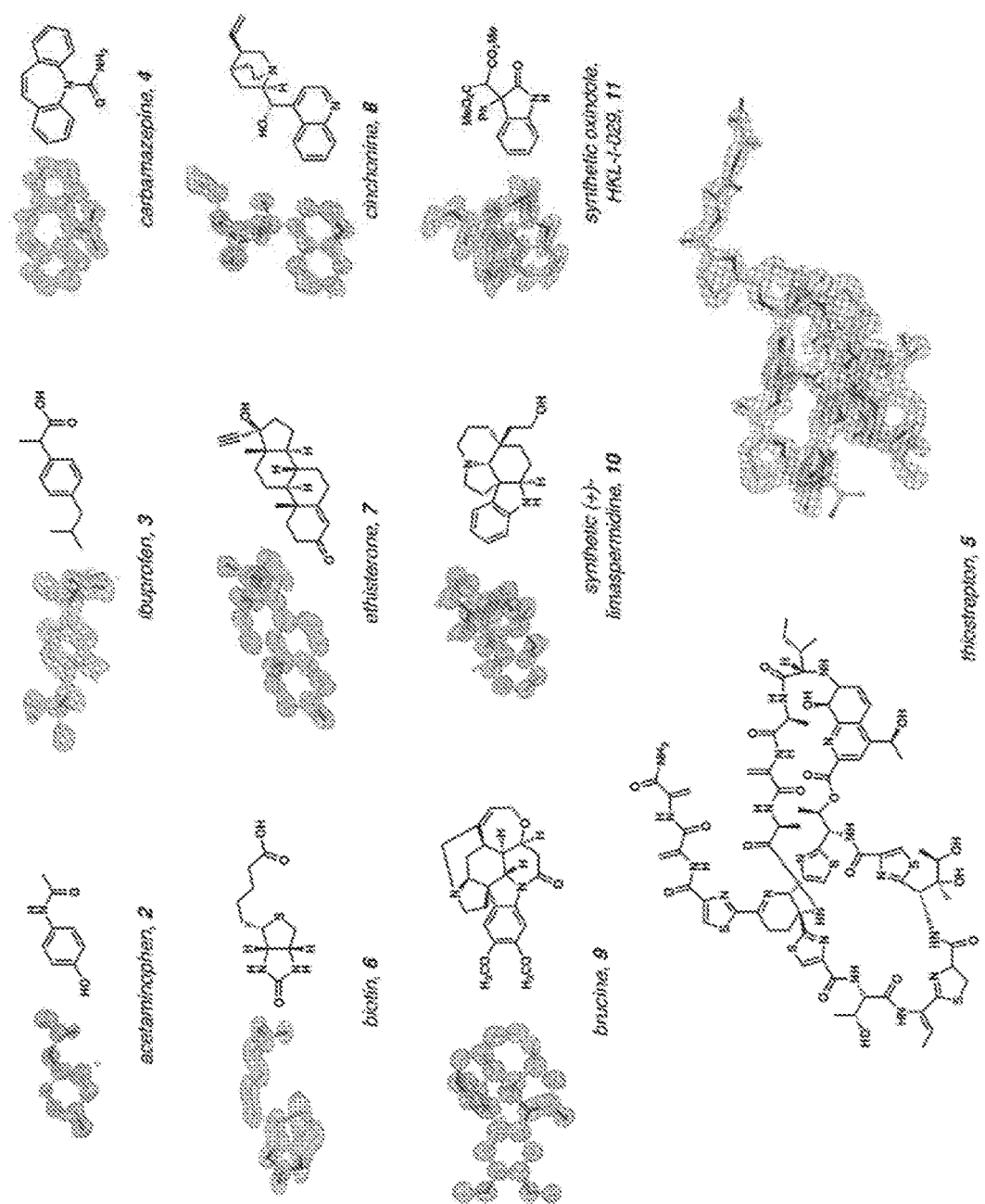
FIGS. 2A to 2C: An illustration of different types of small molecules solved by MicroED. (2A) Several pharmaceuticals, vitamins, commercial natural products, and synthetic samples resolved through MicroED. (2B) Example of an amorphous film utilized in this study (e.g., Example 1) leading to 1 Å resolution data. (2C) Protons could be observed for several compounds through MicroED. Green density are $F_o$-$F_c$ maps showing positive density belonging to hydrogen atoms of the molecule. (Color versions of the figures are being deposited with the USPTO, and once public, should become available through SCORE within Public PAIR.)

Encouraged by these results, we wanted to investigate a wide range of natural products to fully explore the scope and applicability of this powerful structural determination method for small molecules (FIG. 2A). The Talos Arctica was particularly amenable to our studies as it is capable of storing up to 12 different grids at once, providing effortless swapping of sample grids for rapid investigation of multiple compounds. Once a reliable sample prep routine had been established, over-the-counter medications were purchased from local pharmacies for investigation. Tablets of CVS-branded acetaminophen and Kroger-branded ibuprofen were crushed using a mortar and pestle, and the ground powder was placed on electron microscopy grids as described above. Despite the heterogeneity of such pharmaceuticals, which typically include a multitude of coatings, binders, and other formulation agents, we were astonished to obtain such clearly resolved atomic resolution structures of both acetaminophen (2) and ibuprofen (3) in rapid succession. Just as impressively, structures of the sodium channel blocker carbamazepine (4) and the macrocyclic polypeptide antibiotic thiostrepton (5) were also determined from seemingly amorphous powders used as received from Sigma-Aldrich. We went on to further study several commercially available natural products and derivatives. Once again, compounds were used as received, without any crystallization, to yield atomic resolution structures of biotin (6), ethisterone (7), cinchonine (8), and brucine (9). Of the 11 different commercial bioactives examined, all 11 yielded processable MicroED data. Of those 11 compounds, 10 were amenable to rapid structure determination by direct methods,[14] while one was determined by molecular replacement.[15] As mentioned previously, all structures were obtained without any crystallization attempts or chemical modifications to compounds examined. While these pharmaceutical and commercial natural products were likely recrystallized for purification purposes by the manufacturer, the powders examined by MicroED possessed nanocrystals a billionth the size (~100 nm) of crystals typically needed for X-ray crystallography. This was powder to structure.

Figure 2B:
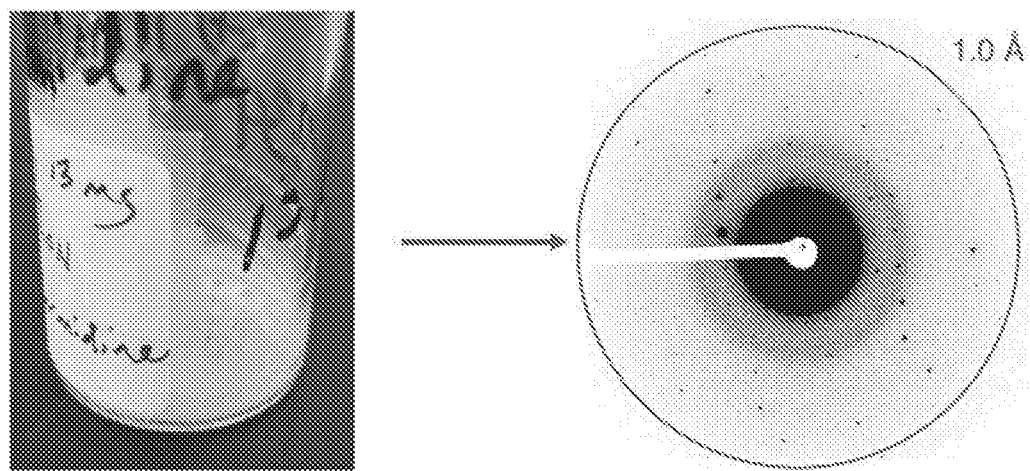
Figure 2C:
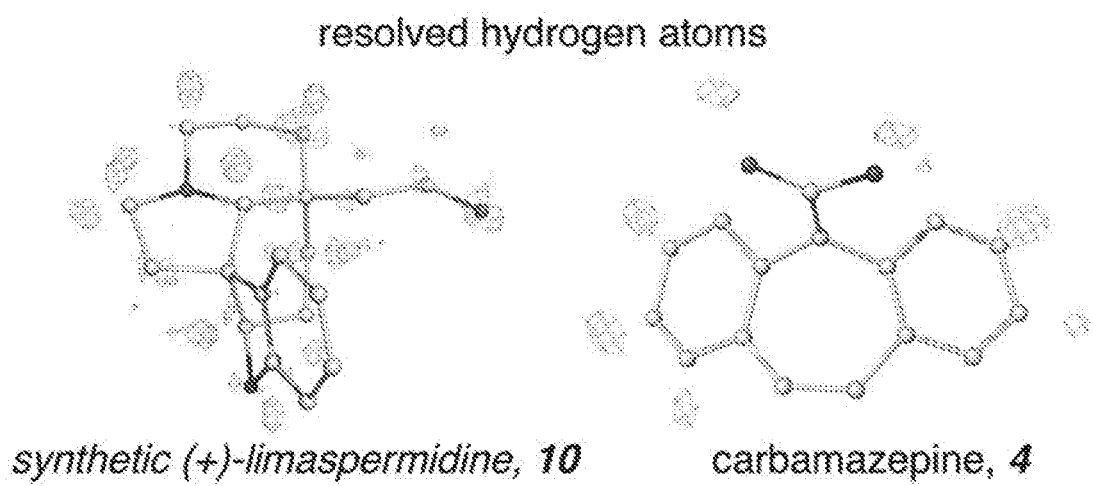

Next we decided to investigate compounds that were never crystallized, but instead were purified by flash column chromatography. Since silica gel chromatography is the most common method of purification in early stage research for complex molecules in drug discovery, natural product isolation efforts, and synthesis efforts in general, we were interested to see whether solid samples prepared in such a way would be amenable to analysis by MicroED. Four compounds, purified by chromatographic methods, were collected from our laboratories, and samples of these seemingly amorphous solids were analyzed. Here, two of four compounds diffracted, yielding atomic resolution structures at or below 1 Å (10 and 11, FIGS. 2A, 2B). While the success rate for these compounds was 50%, it is worthy to note that no crystallization procedures were employed in the isolation of these materials. Notably, (+)-limaspermidine (10), an alkaloid natural product synthesized by our laboratories,[16] was resolved from a residue of only milligram quantities of material following flash chromatography and rotary evaporation from a scintillation vial (FIG. 2B). Furthermore, while it is extremely challenging to observe protons in X-ray structures, electrons interact with matter more strongly than X-rays and are affected by charge, making them relatively common to observe in MicroED data.[17-21] For all structures resolved from our samples, at least some, if not most, protons could be observed on the molecule. In particular, the density maps obtained for limaspermidine (10) and carbamazepine (4) after refinement showed protons associated with almost all atoms in these molecules (FIG. 2C).

Figure 3:
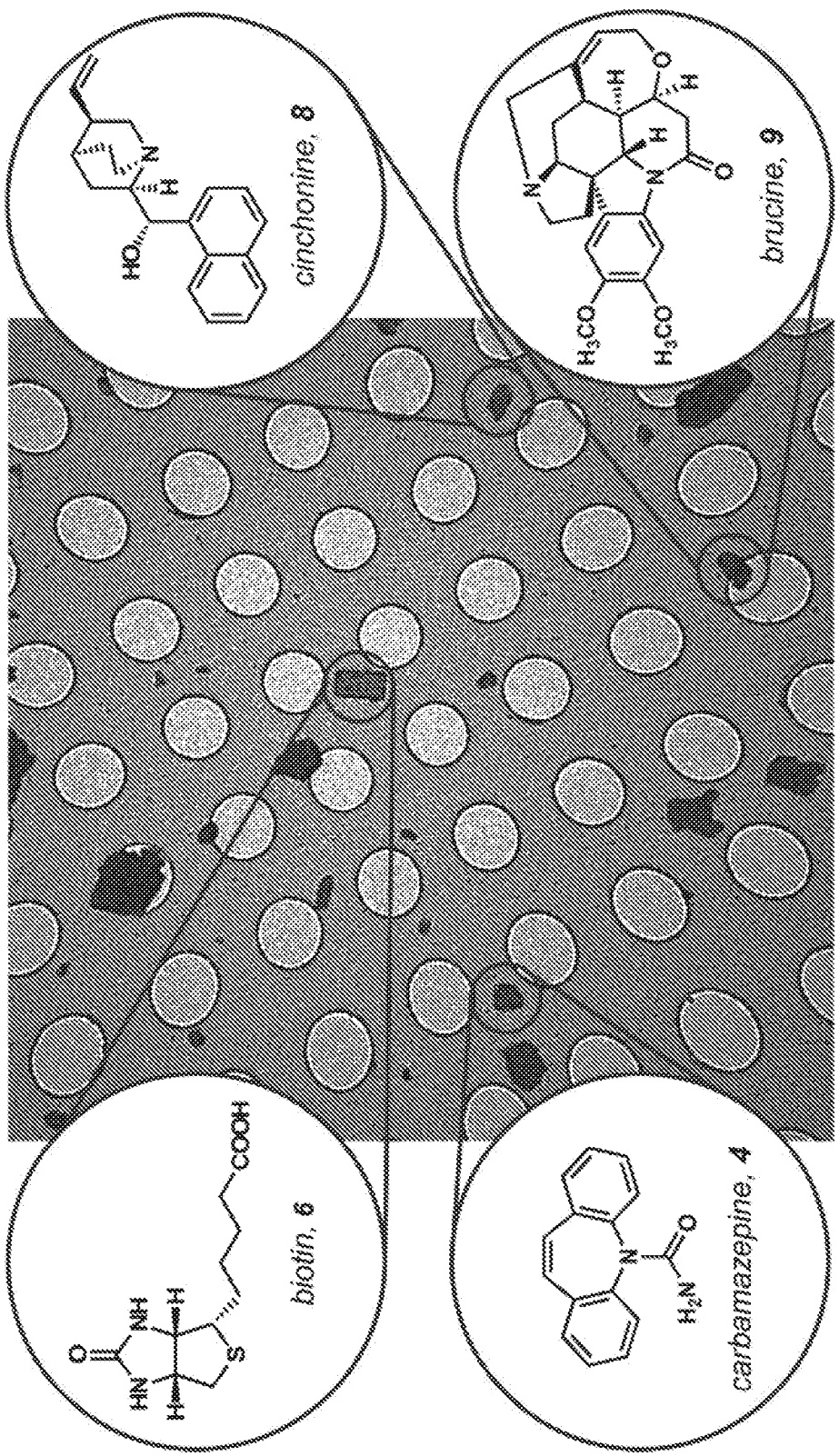
FIG. 3: An illustration of the identification of compounds from heterogeneous mixtures. An EM grid was prepared as above with biotin, brucine, carbamazepine, and cinchonine powders mixed together. All four compounds identified by unit cell parameters using MicroED data from within the same grid square. All structures were solved to ~1 Å resolution. Grid holes are 2 μm in diameter.
Figure 4:
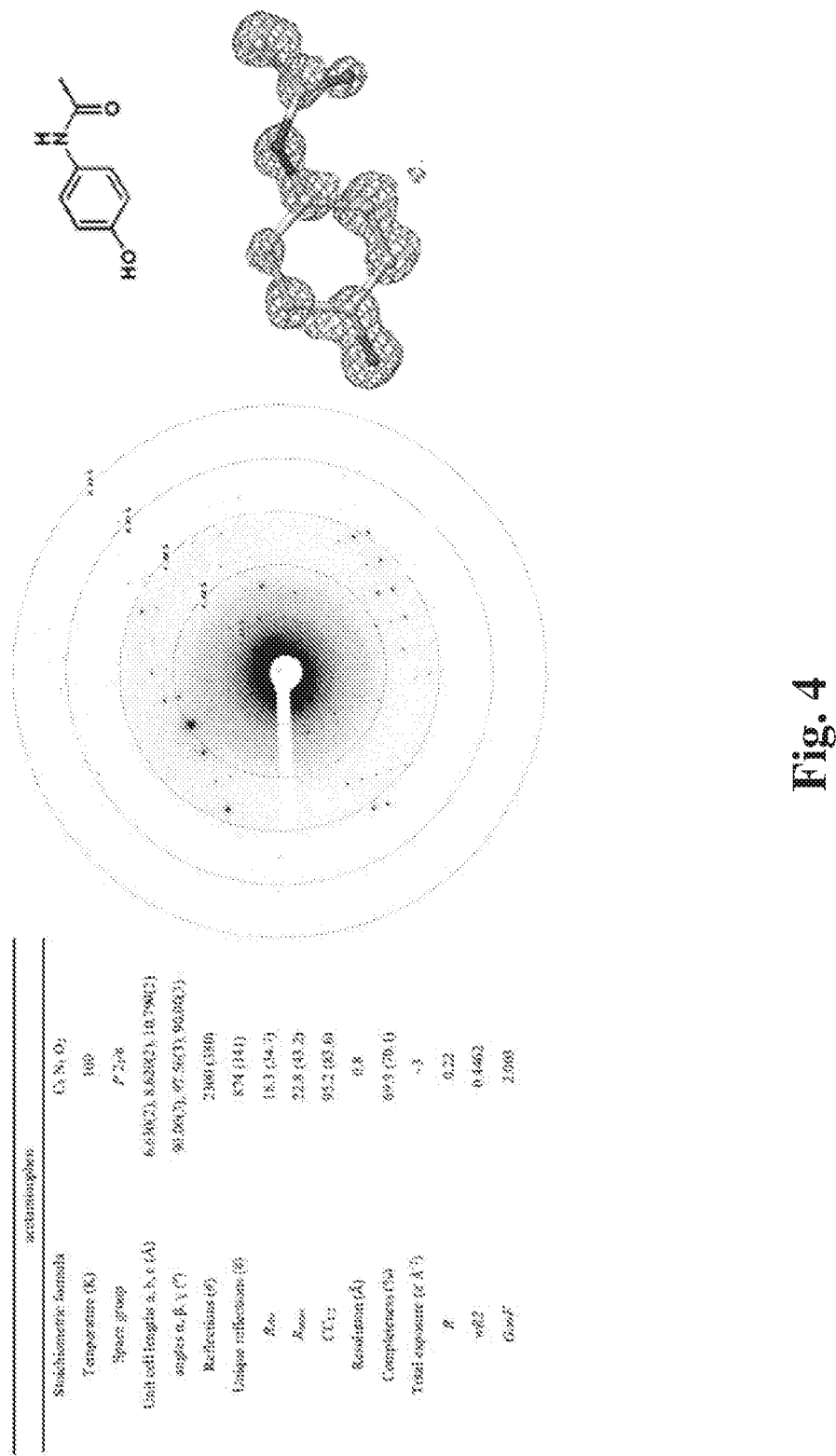
FIG. 4: A table showing data processing statistics, and illustrations showing a sample electron diffraction pattern, a sample electrostatic potential map contour, and a sample structural model for acetaminophen.
Figure 5:
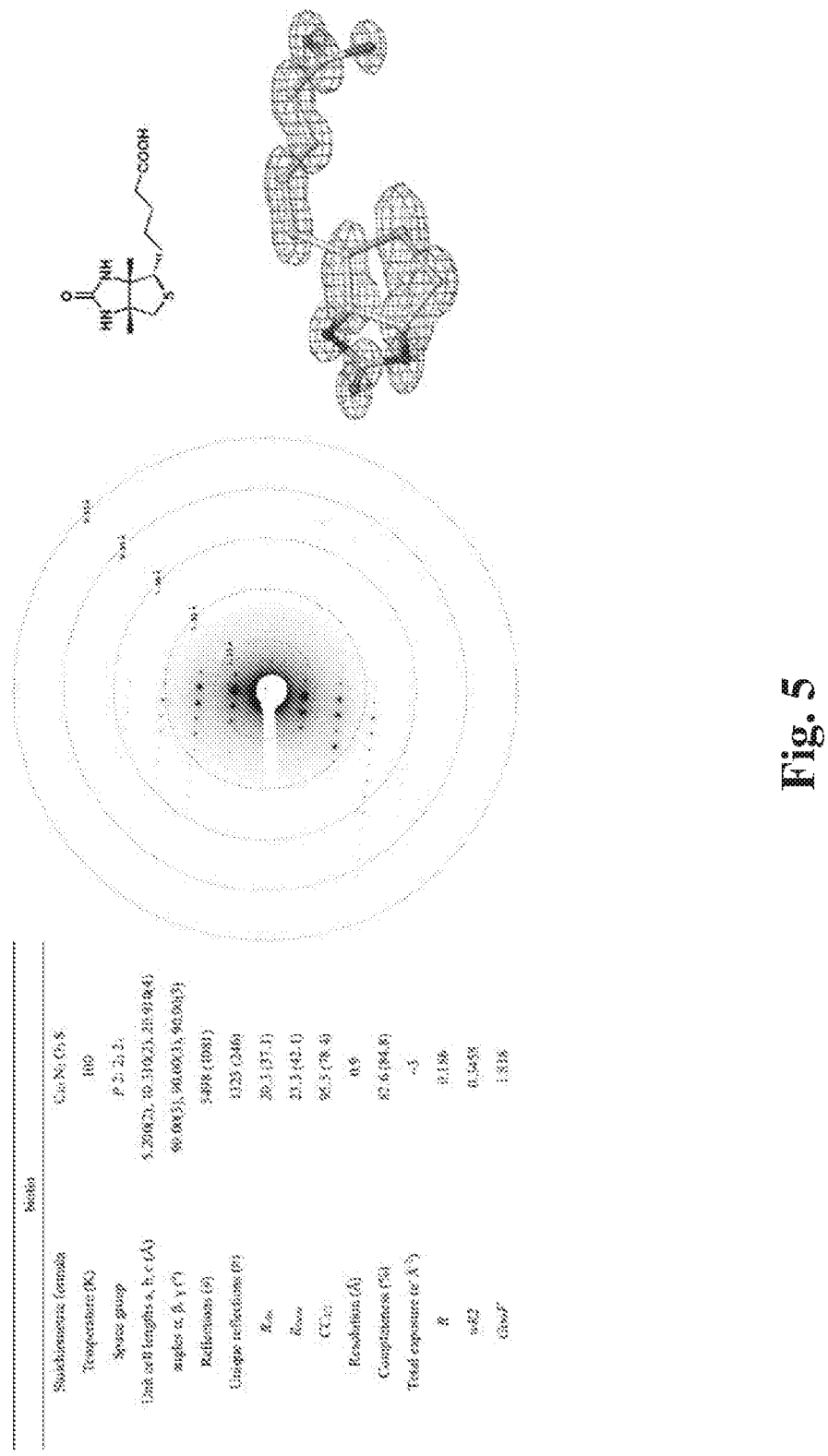
FIG. 5: A table showing data processing statistics, and illustrations showing a sample electron diffraction pattern, a sample electrostatic potential map contour, and a sample structural model for biotin.
Figure 6:
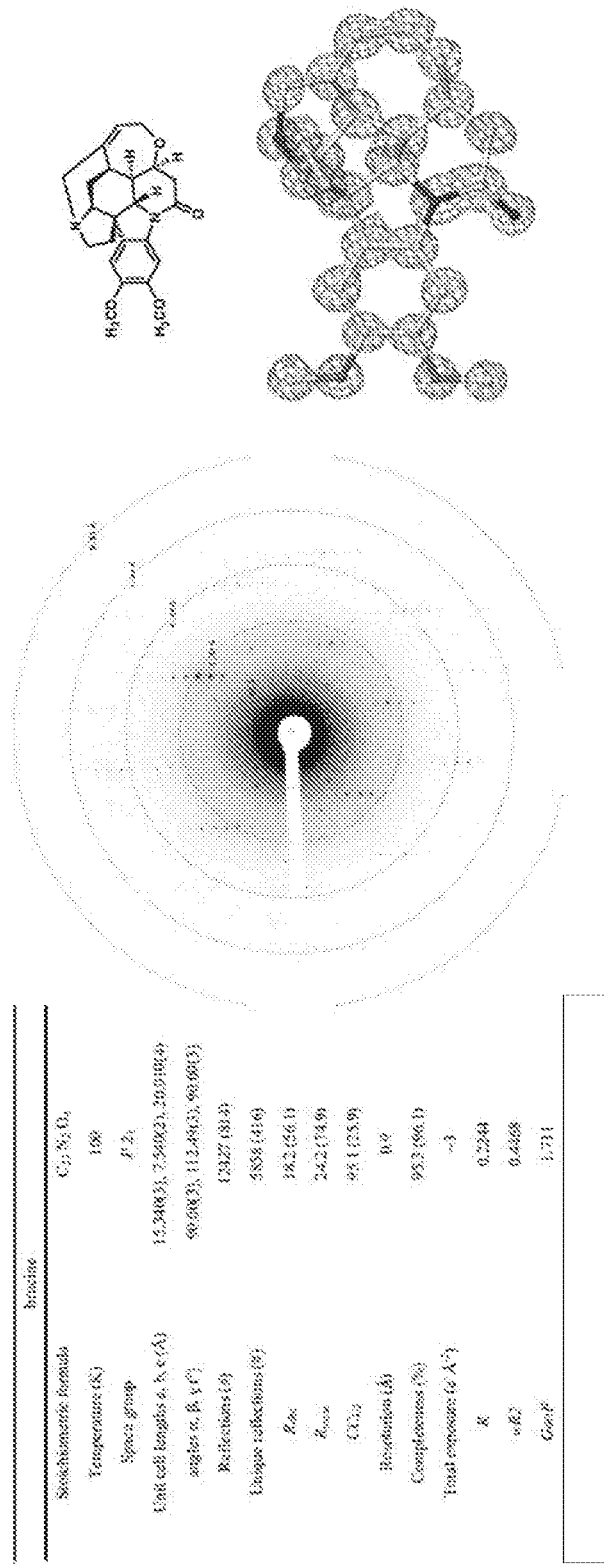
FIG. 6: A table showing data processing statistics, and illustrations showing a sample electron diffraction pattern, a sample electrostatic potential map contour, and a sample structural model for brucine.
Figure 7:
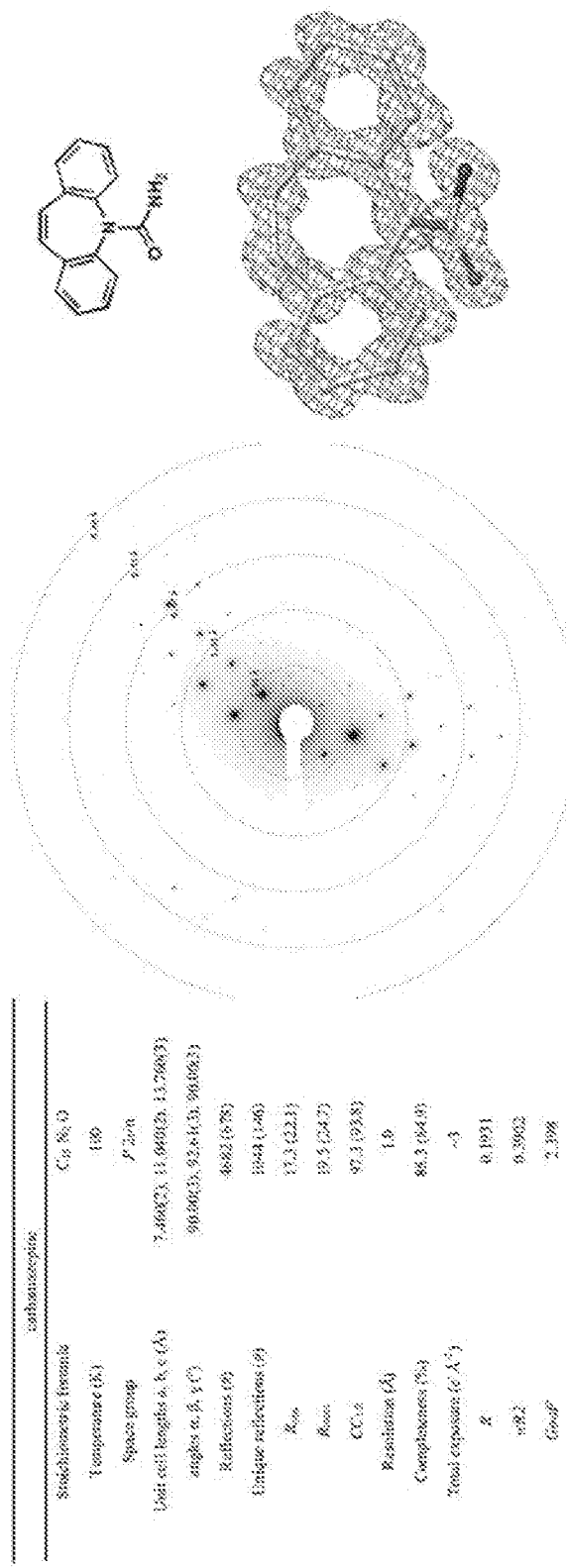
FIG. 7: A table showing data processing statistics, and illustrations showing a sample electron diffraction pattern, a sample electrostatic potential map contour, and a sample structural model for carbamazepine.
Figure 8:
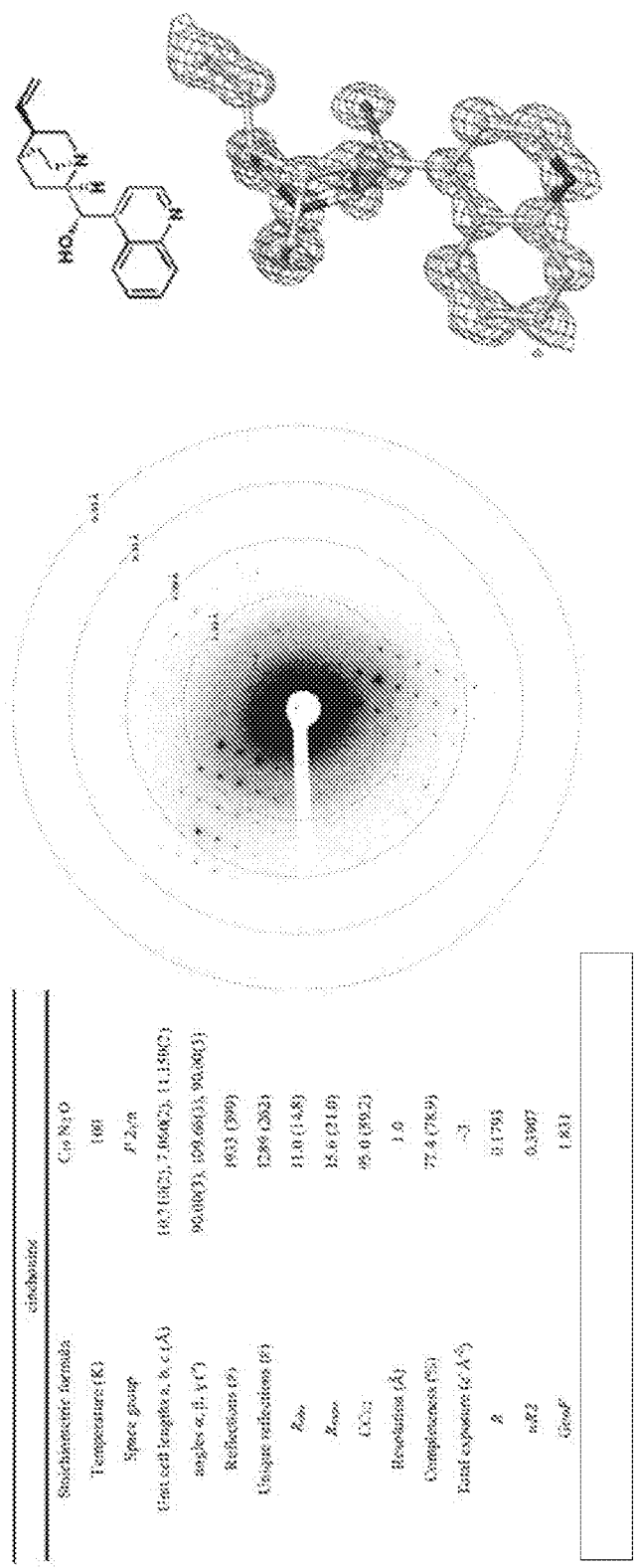
FIG. 8: A table showing data processing statistics, and illustrations showing a sample electron diffraction pattern, a sample electrostatic potential map contour, and a sample structural model for cinchonine.
Figure 9:
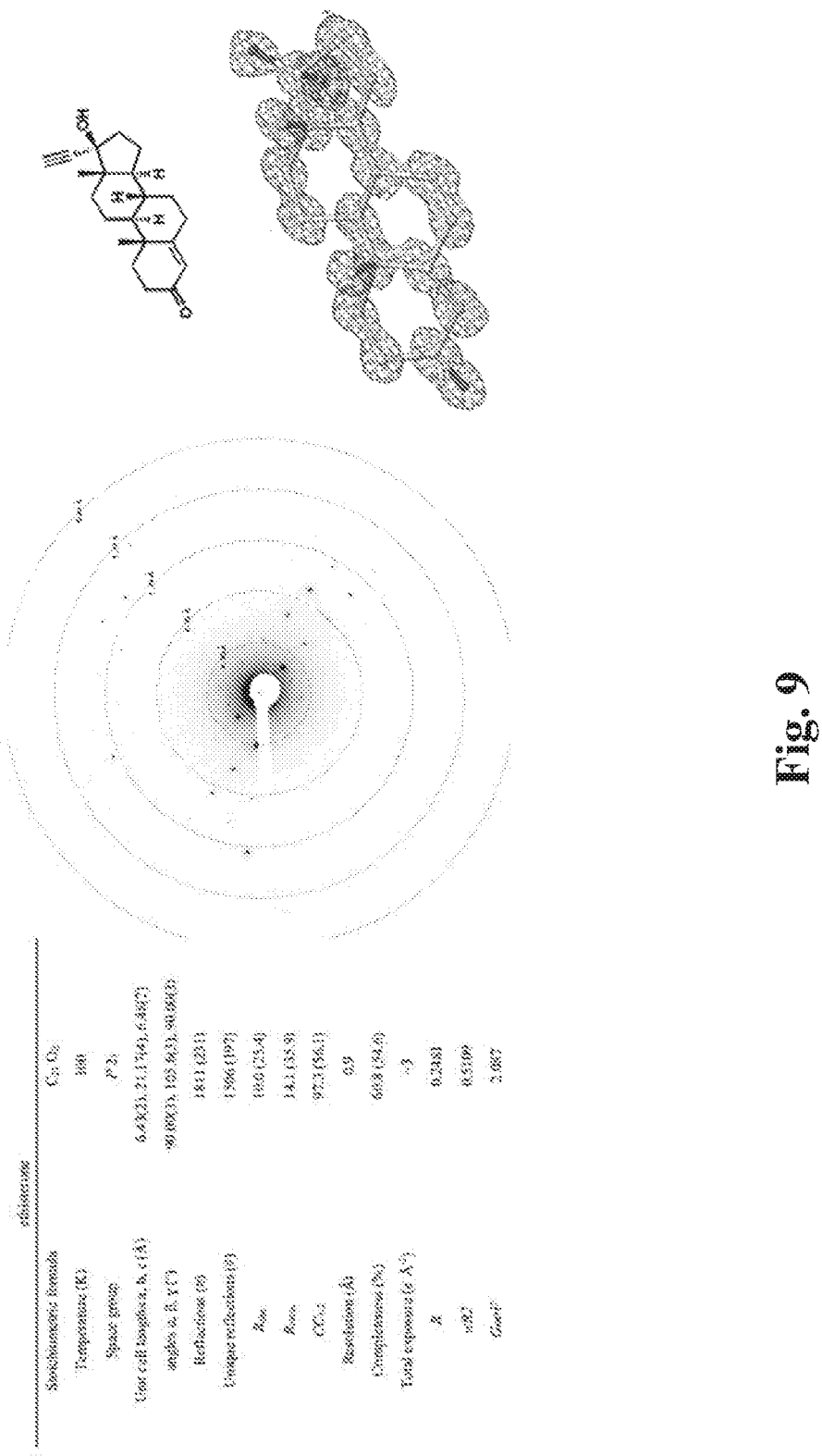
FIG. 9: A table showing data processing statistics, and illustrations showing a sample electron diffraction pattern, a sample electrostatic potential map contour, and a sample structural model for ethisterone.
Figure 10:
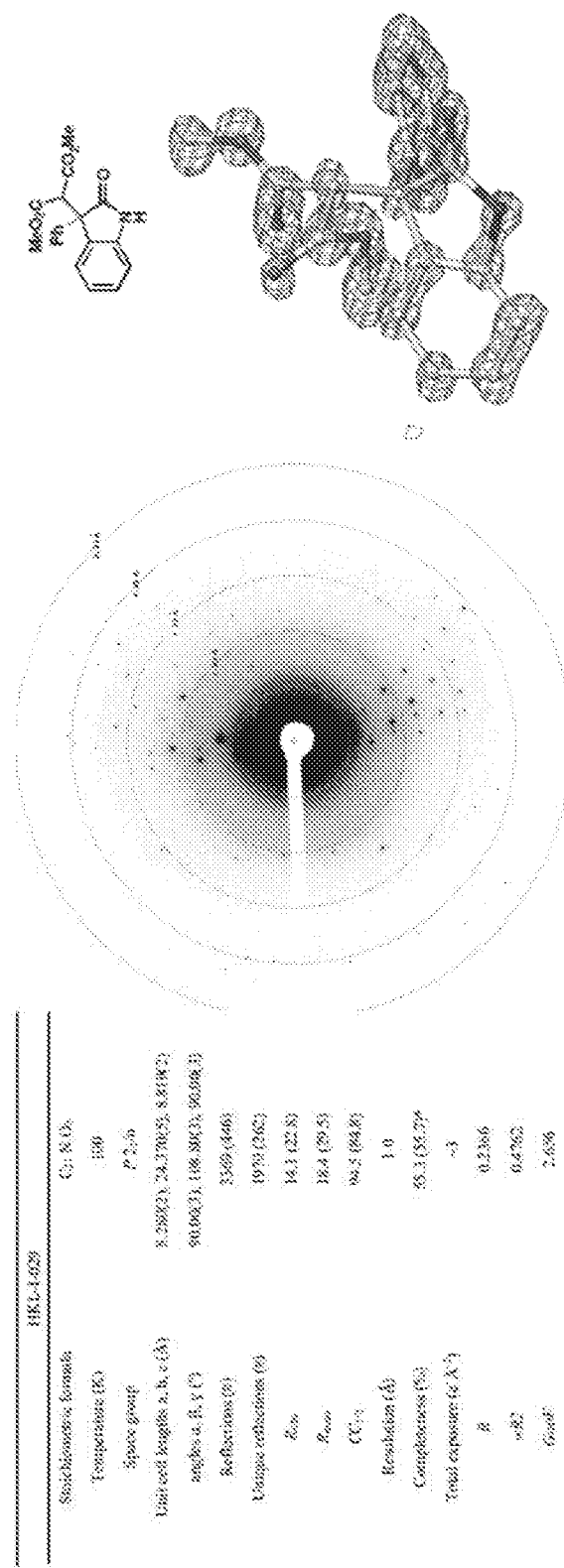
FIG. 10: A table showing data processing statistics, and illustrations showing a sample electron diffraction pattern, a sample electrostatic potential map contour, and a sample structural model for HKL-I-029. *The completeness of this compound was limited due to preferred orientation.
Figure 11:
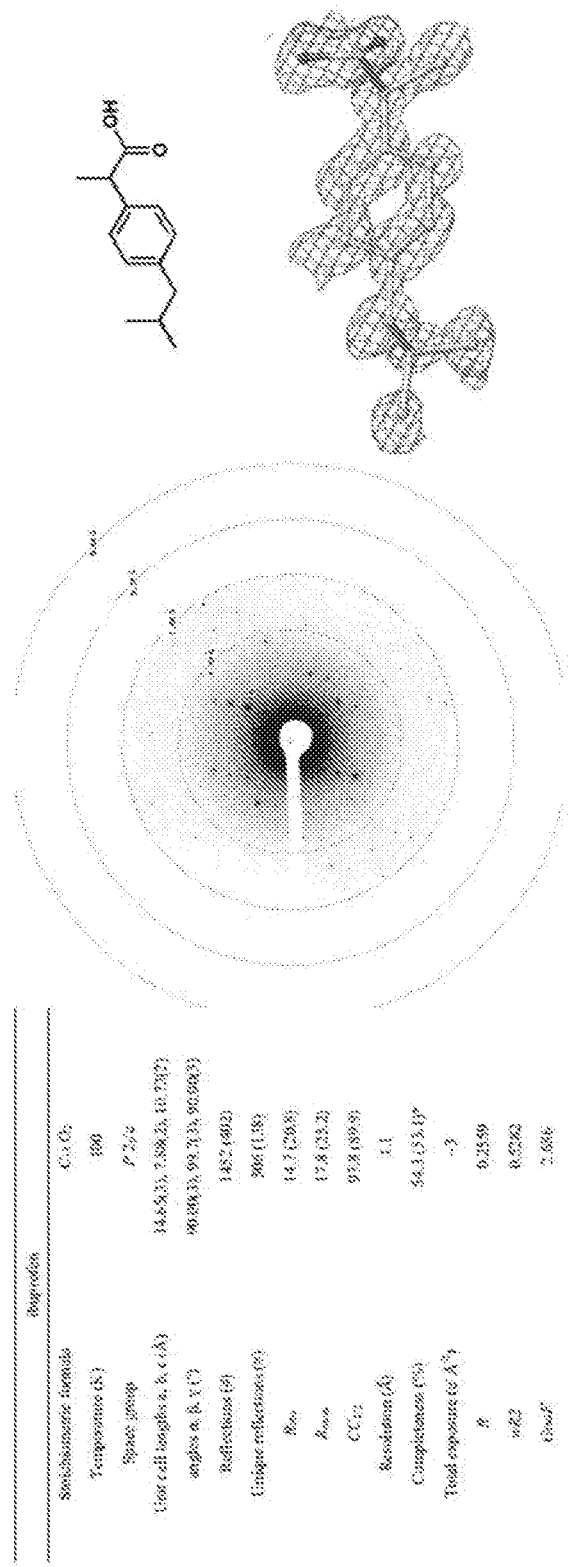
FIG. 11: A table showing data processing statistics, and illustrations showing a sample electron diffraction pattern, a sample electrostatic potential map contour, and a sample structural model for ibuprofen. *The completeness of this compound was limited due to preferred orientation.
Figure 12:
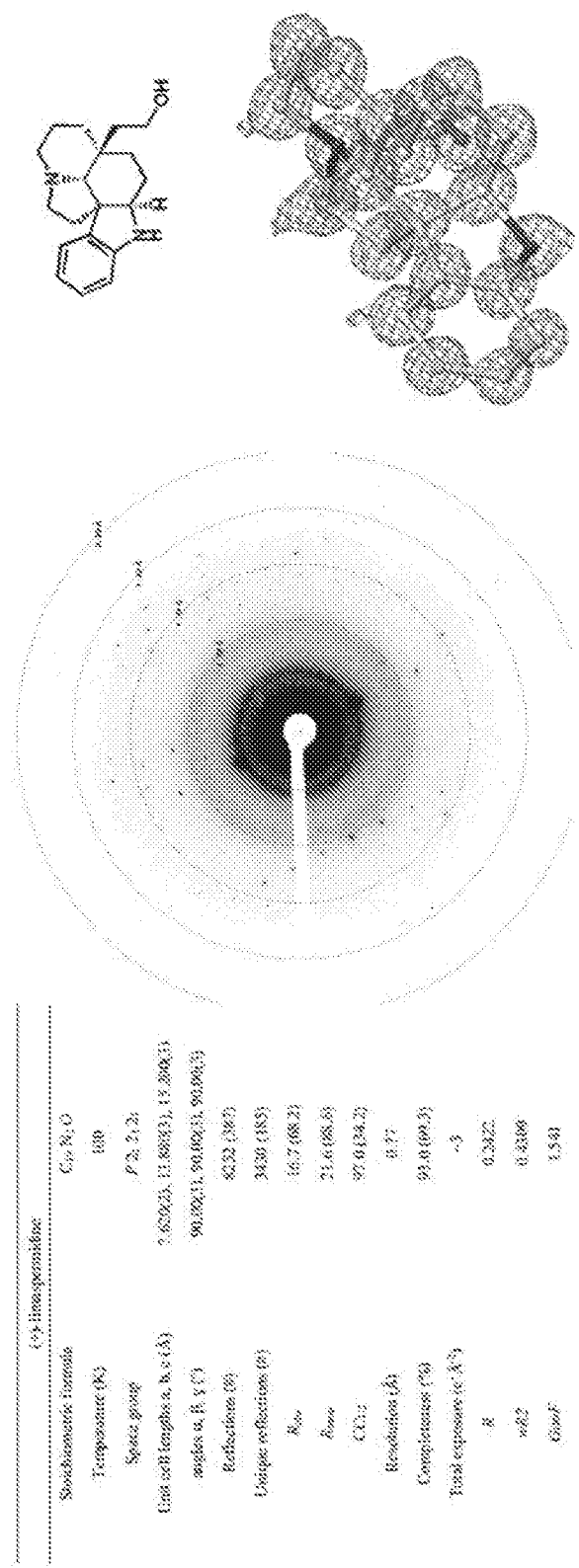
FIG. 12: A table showing data processing statistics, and illustrations showing a sample electron diffraction pattern, a sample electrostatic potential map contour, and a sample structural model for (+)-limaspermidine.
Figure 13:
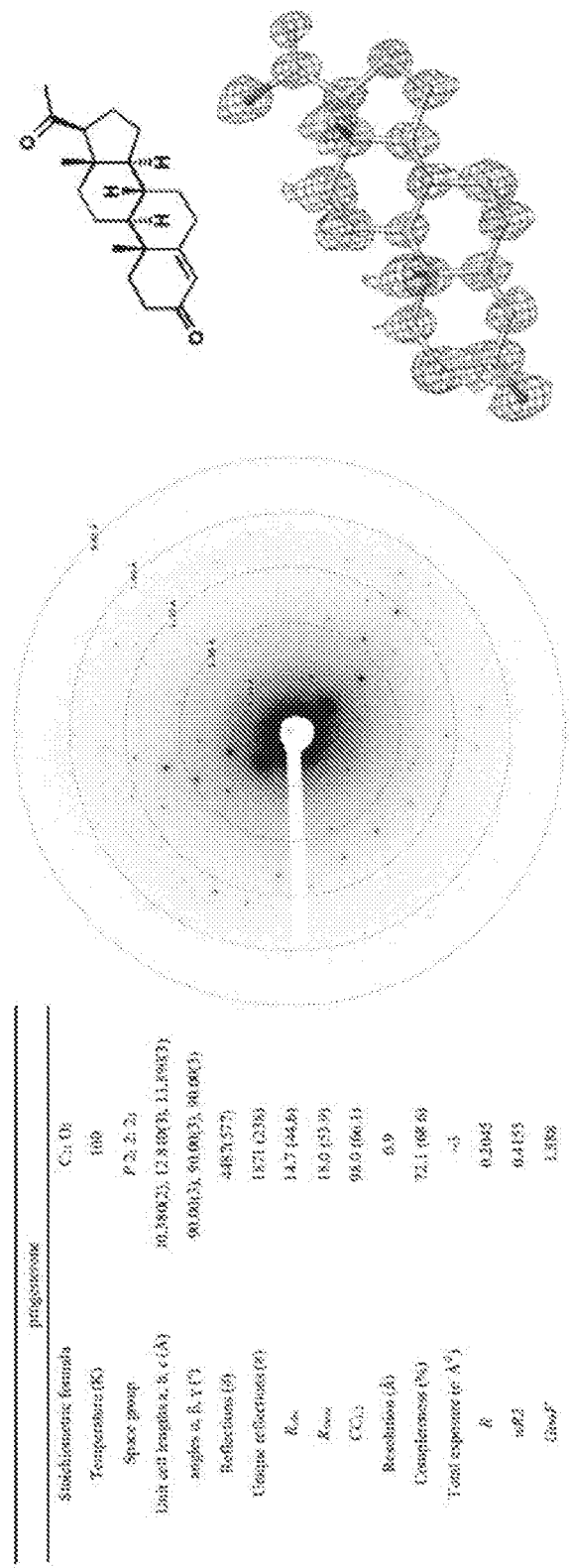
FIG. 13: A table showing data processing statistics, and illustrations showing a sample electron diffraction pattern, a sample electrostatic potential map contour, and a sample structural model for progesterone.
Figure 14:
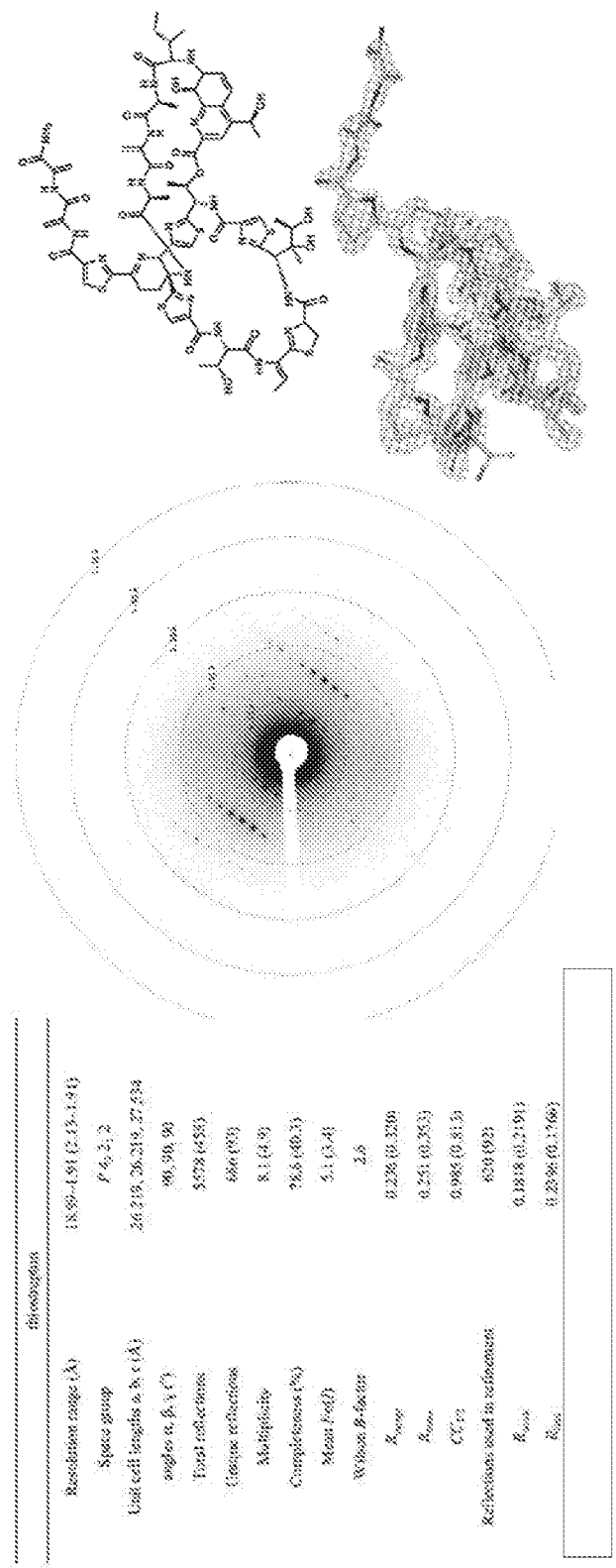
FIG. 14: A table showing data processing statistics, and illustrations showing a sample electron diffraction pattern, a sample electrostatic potential map contour, and a sample structural model for thiostrepton.

Astounded by the ease with which such high-quality data were obtained and the apparent generality of MicroED to small molecules, we undertook studies to examine heterogeneous samples (mixtures of compounds). In the case of heterogeneous samples, single crystal X-ray diffraction precludes the study of mixtures, and NMR is poorly suited for this task. For this experiment, mixtures of four compounds (4, 6, 8 and 9, cf. FIG. 3) were crushed together and deposited on a holey copper-carbon. Several crystal forms belonging to the different compounds in the mixture were visually identified on the grids (FIG. 3). MicroED data were collected from several nanocrystals, and the identity of each species was resolved within minutes by confirmation of unit cell parameters. After compound identification, atomic resolution structures could be rapidly determined for all small molecules present in the mixture (FIG. 3). (Note: no unexpected or unusually high safety hazards were encountered.)

The results described here introduce a powerful new characterization tool into the organic chemist's toolbox. While MicroED was initially developed for structure determination of biological materials such as proteins in a frozen, hydrated state,[22,23] we demonstrate that cross pollination of macromolecular structural methods of CryoEM are powerful tools for chemical synthesis, drug characterization, and drug discovery. Prior to this work, MicroED has allowed for the structural characterization of several proteins from crystals which had generally been unsuitable for X-ray crystallography due to their small size or morphologies.[22-24] Despite this success, the MicroED method has largely gone unnoticed in the small molecule communities. On the basis of our findings, we anticipate that MicroED will be enthusiastically received by many types of small molecule chemists in both academia and industry. Here we have shown that a variety of seemingly amorphous solid materials can lead to rapid atomic resolution structure determination by MicroED with little or no additional sample preparation or crystallization. The fact that a solid film in a flask, following solvent removal from a flash chromatography purification, can lead to an atomic resolution molecular structure, is evidence that MicroED will likely have a profound effect on the structural characterization work-flow of organic chemists. Although the past 50 years have seen huge advances in the state of the art, no completely new techniques have been introduced that alter the routine structural interrogation of organic substances. NMR[8] IR,[3] UV-vis,[2] and X-ray diffraction[9] have been routinely in place since the 1960s and are still utilized today as the most common methods for structure determination in chemistry. We believe that electron diffraction is potentially the next big advance in the field and are enthusiastic about the prospects of expanding its utility as a routine analytical technique for chemists.[25,26]

MicroED was developed for the determination of atomic resolution protein structures from submicron thick, frozen-hydrated crystals that are typically too small for X-ray diffraction.[22,23] In MicroED, crystals are illuminated by an extremely low dose (typically <0.01 e$^-$/Å$^2$/s) electron beam, while the crystals are continuously rotated and diffraction is collected on a fast camera as a movie.[13] MicroED data are then processed using broadly available software for X-ray crystallography without the need for specialized software for structure analysis and refinement.[12]

Other electron diffraction methods include automated diffraction tomography[27] (ADT) and rotation electron diffraction[28] (RED). These methods differ from MicroED in the sampling of diffraction space, through tilt series and/or precession. The broad applicability of MicroED has been demonstrated since its conception[10,12] as structures of large globular proteins,[23] small proteins,[22] peptides,[19] membrane proteins,[29] and inorganic compounds[18] have been successfully determined. In many of these examples, hydrogens were observed and reported with the first example in 2015[19] followed by an independent report from Palatinus and co workers two years later.[30] Most recently, the structure of a small organic molecule, carbamazepine, was determined by MicroED to sub-Angstrom resolution.[24]

Accession Codes

Data and materials availability: MicroED density maps have been deposited to the PDB (thiostrepton, 6MXF), EMDB (EMD-9282, EMD-9284, EMD-9285, EMD-9286, EMD-9287, EMD-9288, EMD-9289, EMD-9290, EMD-9291, EMD-9292), and CCDC (1876036, 1876037, 1876038, 1876039, 1876040, 1876041, 1876042, 1876043, 1876044, 1876045).

References for Example 1

1. Schreier, P.; Bernreuther, A.; Huffer, M. *Analysis of Chiral Organic Molecules: Methodology and Applications*; Walter de Gruyter:Berlin, 2011.
2. Scott, A. I. *Interpretation of the Ultraviolet Spectra of Natural Products: International Series of Monographs on Organic Chemistry*; Elsevier: Amsterdam, 2013; Vol. 7.
3. Coates, J. Interpretation of infrared spectra, a practical approach. In *Encyclopedia of Analytical Chemistry: Applications, Theory and Instrumentation*; Meyers, R. A., Ed.; Wiley: New York, 2000; Vol. 12, pp 10815-10837.
4. Dougherty, D. A. Spin control in organic molecules. *Acc. Chem. Res.* 1991, 24, 88-94, DOI: 10.1021/ar00003a005.
5. Stephens, P. J.; Devlin, F. J.; Pan, J. J. The determination of the absolute configurations of chiral molecules using vibrational circular dichroism (VCD) spectroscopy. *Chirality* 2008, 20, 643-663, DOI: 10.1002/chir.20477.
6. Berova, N.; Bari, L. D.; Pescitelli, G. Application of electronic circular dichroism in configurational and conformational analysis of organic compounds. *Chem. Soc. Rev.* 2007, 36, 914-931, DOI: 10.1039/b515476f.
7. De Hoffmann, E. Mass spectrometry. In *Kirk Othmer Encyclopedia of Chemical Technology*; John Wiley & Sons: New York, 2000.
8. Günther, H. *NMR Spectroscopy: Basic Principles, Concepts and Applications in Chemistry*; John Wiley & Sons: New York, 2013.
9. Dunitz, J. D. *X-ray Analysis and the Structure of Organic Molecules*; Verlag Helvetica Chimica Acta: Zürich, 1995.
10. Shi, D.; Nannenga, B. L.; Iadanza, M. G.; Gonen, T. Three-dimensional electron crystallography of protein microcrystals. *eLife* 2013, 2, e01345, DOI: 10.7554/eLife.01345.
11. Gruene, T.; Wennmacher, J. T. C.; Zaubitzer, C.; Holstein, J. J.; Heidler, J.; Fecteau-Lefebvre, A.; De Carlo, S.; Müller, E.; Goldie, K. N.; Regeni, I.; Li, T.; Santiso-Quinones, G.; Steinfeld, G.; Handschin, S.; van Genderen, E.; van Bokhoven, J. A.; Clever, G. H.; Pantelic, R. Rapid structure determination of microcrystalline molecular compounds using electron diffraction. *Angew. Chem., Int. Ed.* 2018, DOI: 10.1002/anie.201811318.
12. Nannenga, B. L.; Shi, D.; Leslie, A. G. W.; Gonen, T. High-resolution structure determination by continuous-rotation data collection in MicroED. *Nat. Methods* 2014, 11, 927-930, DOI: 10.1038/nmeth.3043.
13. Hattne, J.; Reyes, F. E.; Nannenga, B. L.; Shi, D.; de la Cruz, M. J.; Leslie, A. G. W.; Gonen, T. MicroED data collection and processing. *Acta Crystallogr., Sect. A: Found. Adv.* 2015, 71, 353-360, DOI: 10.1107/S2053273315010669.
14. Sheldrick, G. SHELXT—Integrated space-group and crystal-structure determination. *Acta Crystallogr., Sect. A: Found. Adv.* 2015, 71, 3-8, DOI: 10.1107/S2053273314026370.
15. Vagin, A.; Teplyakov, A. MOLREP: an Automated Program for Molecular Replacement. *J. Appl. Crystallogr.* 1997, 30, 1022-1025, DOI: 10.1107/S0021889897006766.
16. Pritchett, B. P.; Donckele, E. J.; Stoltz, B. M. Enantioselective Catalysis Coupled with Stereodivergent Cyclization Strategies Enables Rapid Syntheses of (+)-Limaspermidine and (+)-Kopsihainanine A. *Angew. Chem., Int. Ed.* 2017, 56, 12624-12627, DOI: 10.1002/anie.201707304.
17. Henderson, R. The potential and limitations of neutrons, electrons and X-rays for atomic resolution microscopy of unstained biological molecules. *Q. Rev. Biophys.* 1995, 28, 171-193, DOI: 10.1017/S003358350000305X.
18. Vergara, S.; Lukes, D. A.; Martynowycz, M. W.; Santiago, U.; Plascencia-Villa, G.; Weiss, S. C.; de la Cruz, M. J.; Black, D. M.; Alvarez, M. M.; López-Lozano, X.; Barnes, C. O.; Lin, G.; Weissker, H.-C.; Whetten, R. L.; Gonen, T.; Yacaman, M. J.; Calero, G. MicroED Structure of Au146(p-MBA)57 at Subatomic Resolution Reveals a Twinned FCC Cluster. *J. Phys. Chem. Lett.* 2017, 8, 5523-5530, DOI: 10.1021/acs.jpclett.7b02621.
19. Rodriguez, J. A.; Ivanova, M. I.; Sawaya, M. R.; Cascio, D.; Reyes, F. E.; Shi, D.; Sangwan, S.; Guenther, E. L.; Johnson, L. M.; Zhang, M.; Jiang, L.; Arbing, M. A.; Nannenga, B. L.; Hattne, J.; Whitelegge, J.; Brewster, A. S.; Messerschmidt, M.; Boutet, S.; Sauter, N. K.; Gonen, T.; Eisenberg, D. S. Structure of the toxic core of alpha-synuclein from invisible crystals. *Nature* 2015, 525, 486-490, DOI: 10.1038/nature15368.
20. Sawaya, M. R.; Rodriguez, J.; Cascio, D.; Collazo, M. J.; Shi, D.; Reyes, F. E.; Hattne, J.; Gonen, T.; Eisenberg, D. S. Ab initio structure determination from prion nanocrystals at atomic resolution by MicroED. *Proc. Natl. Acad. Sci. U.S.A.* 2016, 113, 11232-11236, DOI: 10.1073/pnas.1606287113.
21. Hattne, J.; Shi, D.; Glynn, C.; Zee, C.-T.; Gallagher-Jones, M.; Martynowycz, M. W.; Rodriguez, J. A.; Gonen, T. Analysis of Global and Site-Specific Radiation Damage in Cryo-EM. *Structure* 2018, 26, 759-766, DOI: 10.1016/j.str.2018.03.021.
22. de la Cruz, M. J.; Hattne, J.; Shi, D.; Seidler, P.; Rodriguez, J.; Reyes, F. E.; Sawaya, M. R.; Cascio, D.; Weiss, S. C.; Kim, S. K.; Hinck, C. S.; Hinck, A. P.; Calero, G.; Eisenberg, D.; Gonen, T. Atomic resolution structures from fragmented protein crystals by the cryoEM method MicroED. *Nat. Methods* 2017, 14, 399-402, DOI: 10.1038/nmeth.4178.
23. Nannenga, B. L.; Shi, D.; Hattne, J.; Reyes, F. E.; Gonen, T. Structure of catalase determined by MicroED. *eLife* 2014, 3, e03600, DOI: 10.7554/eLife.03600.
24. Gallagher-Jones, M.; Glynn, C.; Boyer, D. R.; Martynowycz, M. W.; Hernandez, E.; Miao, J.; Zee, C.-T.; Novikova, I. V.; Goldschmidt, L.; McFarlane, H. T.; Helguera, G. F.; Evans, J. E.; Sawaya, M. R.; Cascio, D.; Eisenberg, D. S.; Gonen, T.; Rodriguez, J. A. Sub-ångström cryo-EM structure of a prion protofibril reveals a polar clasp. *Nat. Struct. Mol. Biol.* 2018, 25, 131-134, DOI: 10.1038/s41594-017-0018-0.
25. Martynowycz, M. W.; Gonen, T. From electron crystallography of 2D crystals to MicroED of 3D crystals. *Curr. Opin. Colloid Interface Sci.* 2018, 34, 9-16, DOI: 10.1016/j.cocis.2018.01.010.
26. Nannenga, B. L.; Gonen, T. Protein structure determination by MicroED. *Curr. Opin. Struct. Biol.* 2014, 27, 24-31, DOI: 10.1016/j.sbi.2014.03.004.
27. Kolb, U.; Mugnaioli, E.; Gorelik, T. E. Automated electron diffraction tomography—a new tool for nano crystal structure analysis. *Cryst. Res. Technol.* 2011, 46, 542-554, DOI: 10.1002/crat.201100036.
28. Wan, W.; Sun, J.; Su, J.; Hovmoller, S.; Zou, X. Three-dimensional rotation electron diffraction: software RED for automated data collection and data processing. *J. Appl. Crystallogr.* 2013, 46, 1863-1873, DOI: 10.1107/S0021889813027714.
29. Liu, S.; Gonen, T. MicroED structure of the NaK ion channel reveals a Na$^+$ partition process into the selectivity filter. *Commun. Biol.* 2018, 38, 1-36, DOI: 10.1038/s42003-018-0040-8.
30. Palatinus, L.; Brázda, P.; Boullay, P.; Perez, O.; Klementová, M.; Petit, S.; Eigner, V.; Zaarour, M.; Mintova, S. Hydrogen positions in single nanocrystals revealed by electron diffraction. *Science* 2017, 355, 166-169, DOI: 10.1126/science.aak9652.

Example 2: Additional Details for the CryoEM Method MicroED as a Powerful Tool for Small Molecule Structure Determination Materials and Methods All commercial samples were used as received with no additional crystallization or chemical modification. Ethisterone, cinchonine, carbamazepine, and biotin were purchased from Sigma-Aldrich. Brucine was purchased from the The Matheson Company, Inc. Progesterone was purchased from Preparations Laboratories Inc. Thiostrepton was purchased from EMD Millipore. CVS® brand acetaminophen and Kroger® brand ibuprofen were used as over-thecounter medications. (+)-Limaspermadine and HKL-I-029 were synthesized according to previously reported literature procedures.[1,2]

Sample Preparation

To prepare commercial compounds for MicroED, approximately 1 mg of product as received was placed between two microscope slides and ground to a fine powder. The ground powder was placed into an Eppendorf tube along with a pre-clipped Quantifoil R2/2 Cu300 or Quantifoil R1/4 Cu300 mesh grid. The TEM grid was then removed from the Eppendorf tube and gently tapped against a filter paper to remove excess powder. Non-commercial samples of HKL-I-029 and (+)-limaspermadine were concentrated under vacuum to yield a dry film and solid powder respectively. Sample grids of HKL-I-029 were prepared by adding a TEM grid directly to a 20 mL scintillation vial with gentle shaking. (+)-Limaspermadine grids were prepared by scraping the residue off the side of a 20 mL scintillation vial over a TEM grid. Once sample grids were prepared, they were subsequently plunged into liquid nitrogen, placed into the sample cartridge, and loaded into the microscope for analysis. Heterogenous sample mixtures were prepared by adding ~1 mg of biotin, carbamazepine, cinchonine, and brucine to a glass cover slide and grinding to a fine powder. The heterogenous powder was then added to an Eppendorf tube and the grid was prepared in the same manner as the homogeneous samples.

Instrument Parameters

All data were collected on a Thermo-Fischer Talos Artica electron cryomicroscope operating at an acceleration voltage of 200 keV, corresponding to a wavelength of ~0.0251 Å. Screening of the TEM grids for micro crystals was done by operating the microscope in over focused diffraction mode to minimize diffraction and hysteresis between screening and diffraction operational modes.

Data Collection Procedure

MicroED data collection was collected in rolling shutter using a Thermo-Fischer CetaD CMOS 4 k×4 k camera. Images were collected as a movie as the crystal was continuously rotated in the electron beam.[3] (See, e.g., the movie file available from C. Jones, The CryoEM Method MicroED as a Powerful Tool for Small Molecule Structure Determination, ACS Cent. Sci. 4(11): 1587-92 (2018), which is hereby incorporated herein in its entirety). Typical data collection was performed using a constant tilt rate of ~0.6° s$^{-1}$ d over an angular wedge of ~60° between the minimum and maximum tilt ranges of −72° to +72° degrees, respectively. During continuous rotation the camera integrated frames continuously at a rate of 1-3 s per frame. The dose rate was calibrated to <0.03 e$^-$Å$^{-2}$ s$^{-1}$. Crystals selected for data collection were isolated by a selected area aperture to reduce the background noise contributions, and calibrated to eucentric height to stay in the aperture over the entire tilt range. Diffraction movies saved as SER files were converted to SMV format using in-house software developed for the CetaD and made freely available online (cryoem.ucla.edu/pages/MicroED). Frames were indexed and integrated in XDS, and multiple datasets were scaled and merged using XSCALE.[4,5] The intensities were converted to SHELX format using XDSCONV.[5] All structures except thiostrepton (see below) were solved by ab initio direct methods in SHELXT, and refined in SHELXL as previously described.[6,7]

Four datasets from thiostrepton were indexed and integrated in MOSFLM through its graphical user interface, iMosflm.[8,9] Data were merged in AIMLESS, and phased by molecular replacement in MOLREP using 1E9W as a search model.[10,11] The solution was refined using REFMAC5 with electron scattering factors to a resolution of 1.9 Å with the free R set copied from the initial search model.[12]

Compound Data and Statistics

Individual integration and refinement statistics can be found for each compound in FIGS. 4-14 along with corresponding densities.

Reference for Example 2

1. Y. Liu, S.-J. Han, W.-B. Liu, B. M. Stoltz, Catalytic Enantioselective Construction of Quaternary Stereocenters: Assembly of Key Building Blocks for the Synthesis of Biologically Active Molecules. *Acc. Chem. Res.* 48, 740-751 (2015).
2. B. P. Pritchett, E. J. Donckele, B. M. Stoltz, Enantioselective Catalysis Coupled with Stereodivergent Cyclization Strategies Enables Rapid Syntheses of (+)-Limaspermidine and (+)-Kopsihainanine A. *Angew. Chemie Int. Ed.* 56, 12624-12627 (2017).
3. B. L. Nannenga, D. Shi, A. G. W. Leslie, T. Gonen, High-resolution structure determination by continuous-rotation data collection in MicroED. *Nat. Methods.* 11, 927-930 (2014).

4. W. Kabsch, Xds. *Acta Crystallogr. Sect. D Biol. Crystallogr.* 66, 125-132 (2010).
5. W. Kabsch, Integration, scaling, space-group assignment and post-refinement. *Acta Crystallogr. Sect. D Biol. Crystallogr.* 66, 133-144 (2010).
6. G. M. Sheldrick, SHELXT—Integrated space-group and crystal-structure determination. *Acta Crystallogr. Sect. A Found. Crystallogr.* 71, 3-8 (2015).
7. G. M. Sheldrick, Crystal structure refinement with SHELXL. *Acta Crystallogr. Sect. C Struct. Chem.* 71, 3-8 (2015).
8. A. G. W. Leslie, H. R. Powell, (2007; http://link.springer.com/10.1007/978-1-4020-6316-9_4), pp. 41-51.
9. T. G. G. Battye, L. Kontogiannis, O. Johnson, H. R. Powell, A. G. W. Leslie, iMOSFLM: A new graphical interface for diffraction-image processing with MOSFLM. *Acta Crystallogr. Sect. D Biol. Crystallogr.* 67, 271-281 (2011).
10. P. R. Evans, G. N. Murshudov, How good are my data and what is the resolution? *Acta Crystallogr. Sect. D Biol. Crystallogr.* 69, 1204-1214 (2013).
11. A. Vagin, A. Teplyakov, MOLREP: an Automated Program for Molecular Replacement. *J. Appl. Crystallogr.* 30, 1022-1025 (1997).
12. G. N. Murshudov et al., REFMAC 5 for the refinement of macromolecular crystal structures. *Acta Crystallogr. Sect. D Biol. Crystallogr.* 67, 355-367 (2011).

Example 3: Characterization of Reactive Organometallic Species Via MicroED

Here we apply microcrystal electron diffraction (MicroED) to the structural determination of transition metal complexes. We find that the simultaneous use of 300 keV electrons, very low electron doses, and an ultra-sensitive camera allows for the collection of data without cryogenic cooling of the stage. This technique reveals the first crystal structures of the classic zirconocene hydride, colloquially known as "Schwartz's reagent", a novel Pd(II) complex not amenable to solution-state NMR or X-ray crystallography, and five other paramagnetic and diamagnetic transition metal complexes.

Introduction

For over a century crystallography has fueled developments in modern chemistry. Within the chemical enterprise, crystallography has played a particularly special role in organometallic chemistry. Here, NMR-silent nuclei, paramagnetic spin, diversity of bonding and coordination environments, and poor reactivity profiles hinder the application of many solution-state characterization techniques. However, the need for carefully prepared single crystals with dimensions on the order of 0.1 mm$^3$ can also limit the application of X-ray crystallography. Moreover, neutron diffraction can be limited by the requirement of even larger crystals (~0.5 mm$^3$) and incompatibility with boron-containing compounds, due to destructive nuclear reactions.[1] Here we employ electron diffraction, performed at ambient temperature using a 300 keV TEM, to structurally characterize organometallic compounds, reactive intermediates, and transition metal coordination complexes. We leverage sensitive detectors that accurately measure diffraction at low electron doses to perform continuous rotation MicroED at ambient temperature. We disclose the first crystal structure of the privileged hydrozirconation reagent chloridobis(η5-cyclopentadienyl)hydridozirconium, colloquially known as Schwartz's reagent, which was obtained from bulk powder, utilized as purchased and determined by direct methods. We also report an ab initio structure of a Pd(II) 1,2-dipallidated alkyl species, obtained as a precipitant from the reaction mixture of ethylene with a pseudo-low-coordinate Pd(I) dimer. As a demonstration of the broad applicability of MicroED, we also determine the structures of five other transition metal complexes.

Results and Discussion

Figure 15A:
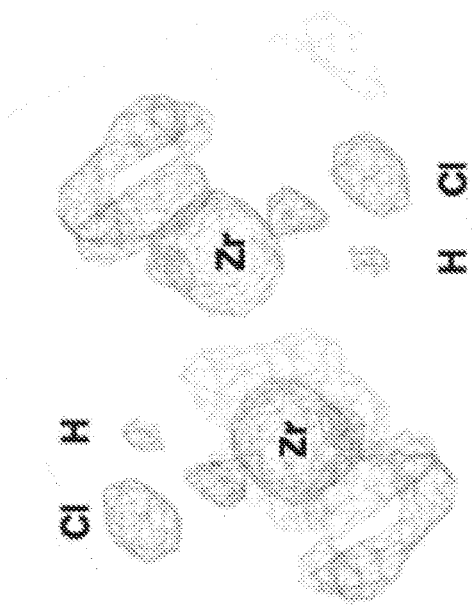
FIGS. 15A to 15D: Illustrations related to the determination of a three-dimensional structural model of Schwartz's reagent (1) (as denoted in Examples 3 & 4, which relate to FIGS. 15A through 34). (15A) Proposed structure of Schwartz's reagent and the refined structure with potential map overlay (R1=13.9%, GooF=2.116, completeness=90.6%, resolution=1.15 Å). (15B) Pre-refinement difference Fourier map generated using default X-ray scattering factors. Isolated green lobes indicate diagnostic regions of electron density geometrically consistent with doubly bridging hydrides. (15C) Unit cell of the refined crystal structure generated by applying electron scattering parameters, viewed at a slight tilt along the a-axis. Highlighted slice in dark blue corresponds to the (0 0 2) Bragg plane. (15D) Contour map of the central mirror plane depicted in (15C) with the screened Coulomb potential of hydrides clearly visible.
Figure 15B:
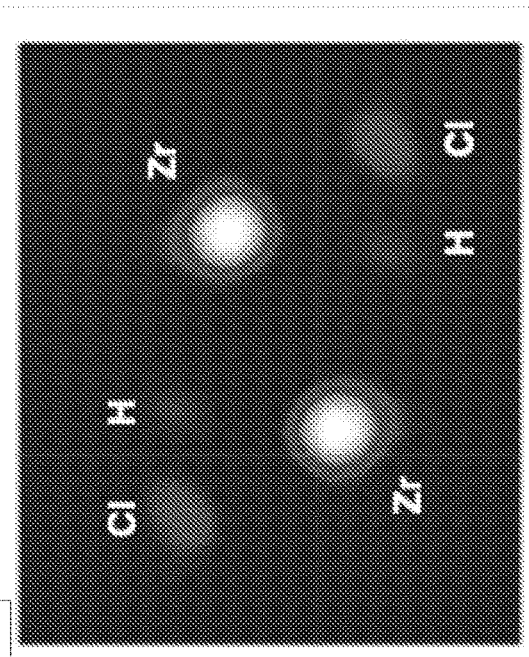

Having recently reported the application of the CryoEM method MicroED to determine structures of several complex organic molecules,[2] we now evaluated the facility with which MicroED could interrogate complex organometallic species. We were particularly interested in chemical entities that failed to yield structures by conventional structural elucidation methods—crystallography or solution-state characterization. We first interrogated the structure of chloridobis(η5-cyclopentadienyl)hydridozirconium 1 (FIG. 15A; compound identifying numbers are different between Examples 1 & 2 on the one hand, and Examples 3 & 4 on the other hand),[3] a well-known industrial catalyst colloquially referred to as Schwartz's reagent. Schwartz's reagent sees widespread use in modern organic synthesis and is useful for a number of unique transformations mediated via hydrozirconation intermediates.[4-6]

Figure 15C:
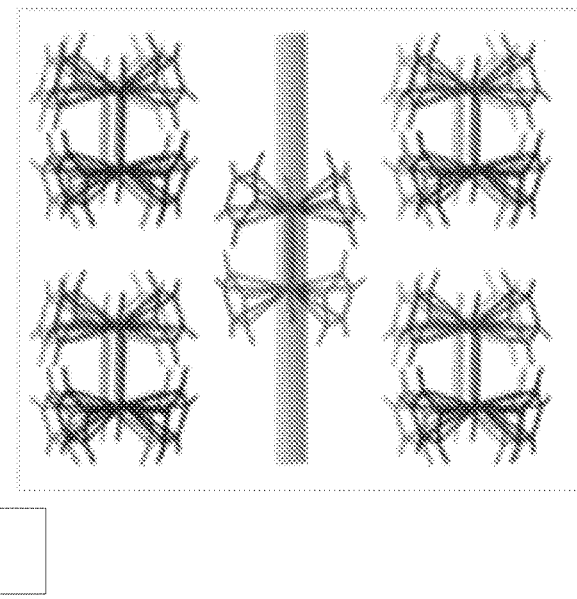
Figure 15D:
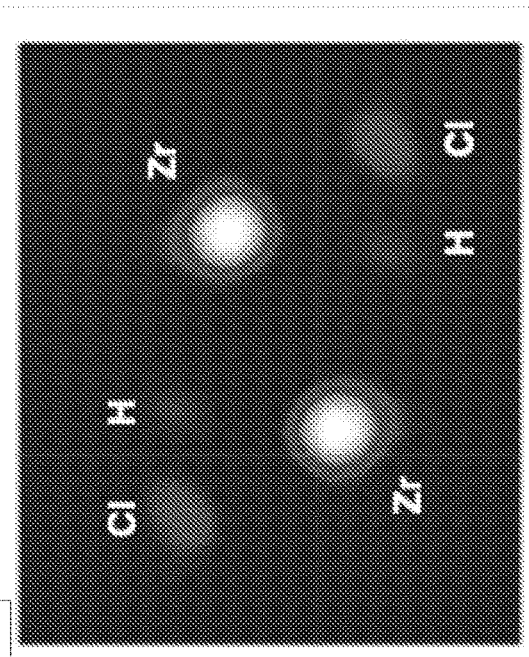
Figure 18:
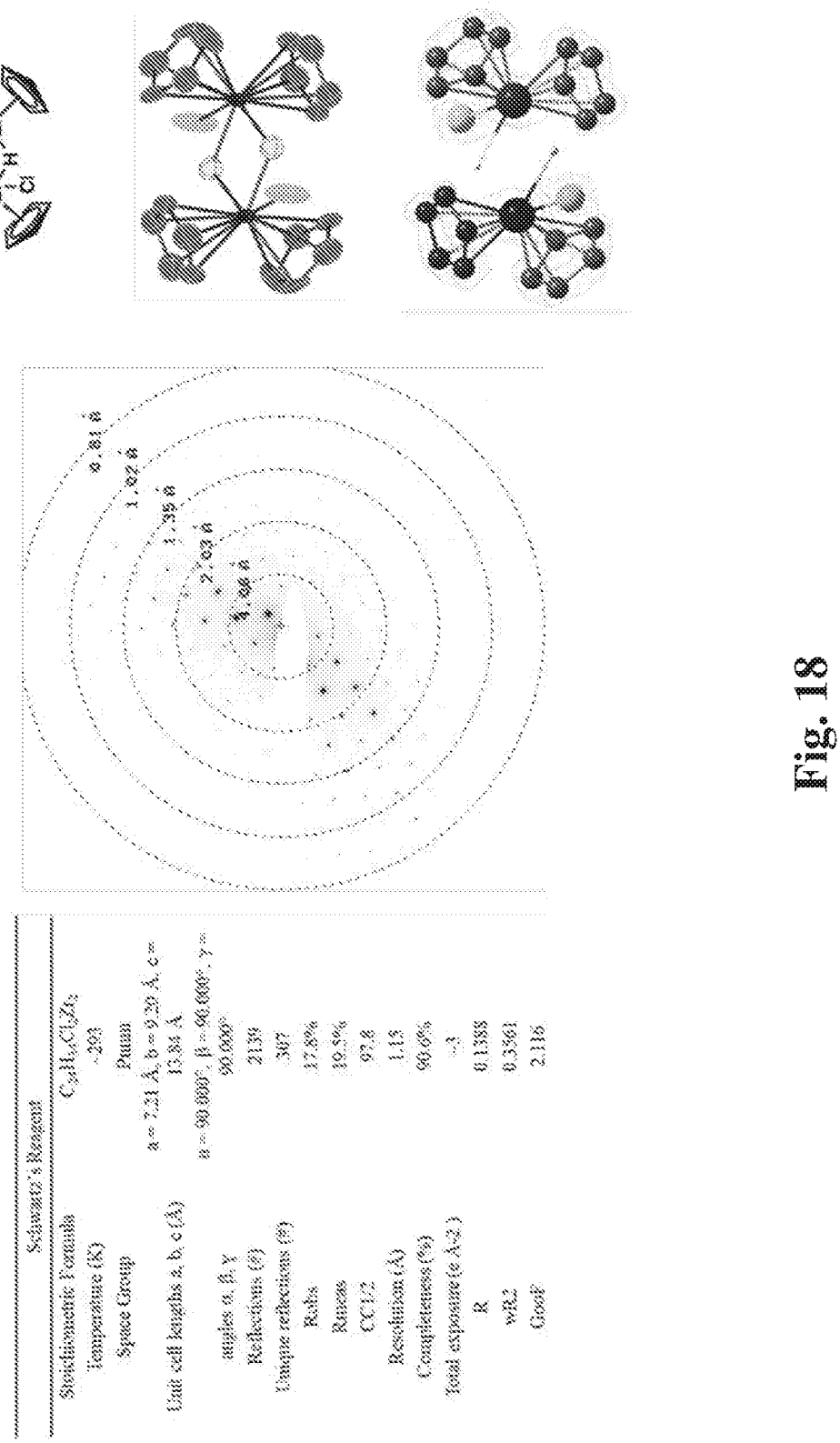
FIG. 18: A table showing data and statistics, and illustrations showing a sample electron diffraction pattern and solved structural models for compound 1.

However, despite its synthetic relevance and the countervailing fact that half a century has transpired since Wailes and Weigold first discovered this species,[7,8] no single crystal structure of this canonical zirconocene complex has been obtained. This gap in crystallographic data has been attributed to the low solubility of the complex in hydrocarbon and ethereal solvents and its reactivity with polar chlorinated solvents,[9] precluding its crystallization and hindering NMR studies. As such, the currently accepted structure of Schwartz's reagent, a centrosymmetric dimer doubly linked by two bridging hydride ligands, represents a reconstruction from a combination of FTIR spectroscopy,[7,8] solid-state $^{35}$Cl NMR studies,[10] and X-ray diffraction of related complexes.[11] To confirm this inferred structure, we subjected commercially acquired Schwartz's reagent to ambient temperature MicroED. Continuous-rotation data was collected from three crystals (Movie S1: available from C. Jones, Characterization of reactive organometallic species via MicroED (2019), doi=10.26434/chemrxiv.7940525.v2 uploaded at https://chemrxiv.org/articles/Characterization_of_reactive_organometallic_species_via_MicroED/7940525, which is hereby incorporated herein in its entirety); diffraction was reduced and merged to obtain a high-completeness (90.6%) solution resolved at 1.15 Å. The room temperature Schwartz's structure was then determined ab initio by direct methods and refined to reveal the expected centrosymmetric dimer. Importantly, refinement proceeded with only the relevant electron scattering factors as inputs,[12] requiring no ex post facto corrections, calculations, or molecular replacement procedures. The structure with riding hydrogens on the cyclopentadienyl ligands refined with anisotropic displacement parameters to an R1 value of 13.9%. Critically, we had already observed suggestive regions of electron density consistent with bridging hydrides in the initial difference Fourier map (FIG. 16B). To trace this more explicitly, we tracked peaks in the screened Coulomb potential within the unit cell, representing atomic locations. A sampling of consecutive two-dimensional slices in real space along the a-axis at the central mirror plane that runs orthogonal to the cyclopentadienyl rings but bisects the zirconium, chlorine, and hydrogen atoms (FIG. 15C; Movie S2: available from C. Jones, Characterization of reactive organometallic species via MicroED (2019), doi=10.26434/chemrxiv.7940525.v2 uploaded at https://chemrxiv.org/articles/Characterization_of_reactive_organometallic_species_via_MicroED/7940525, which is hereby incorporated herein in its entirety) shows two hydrides emerging from the void space of the noise floor, thus corroborating the hydride positions observed during structural refinement (FIG. 15D).

Figure 19:
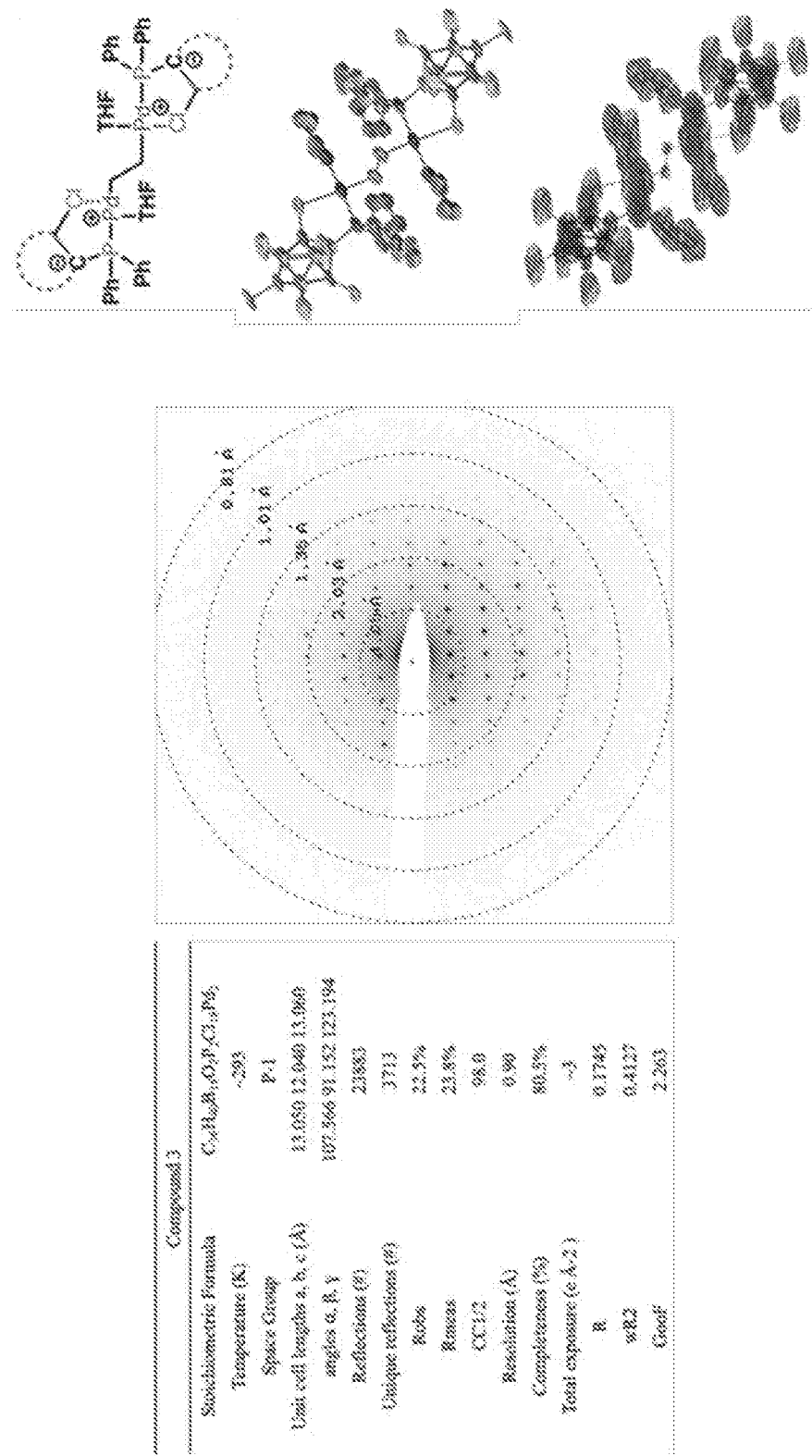
FIG. 19: A table showing data and statistics, and illustrations showing a sample electron diffraction pattern and solved structural models for compound 3.
Figure 20:
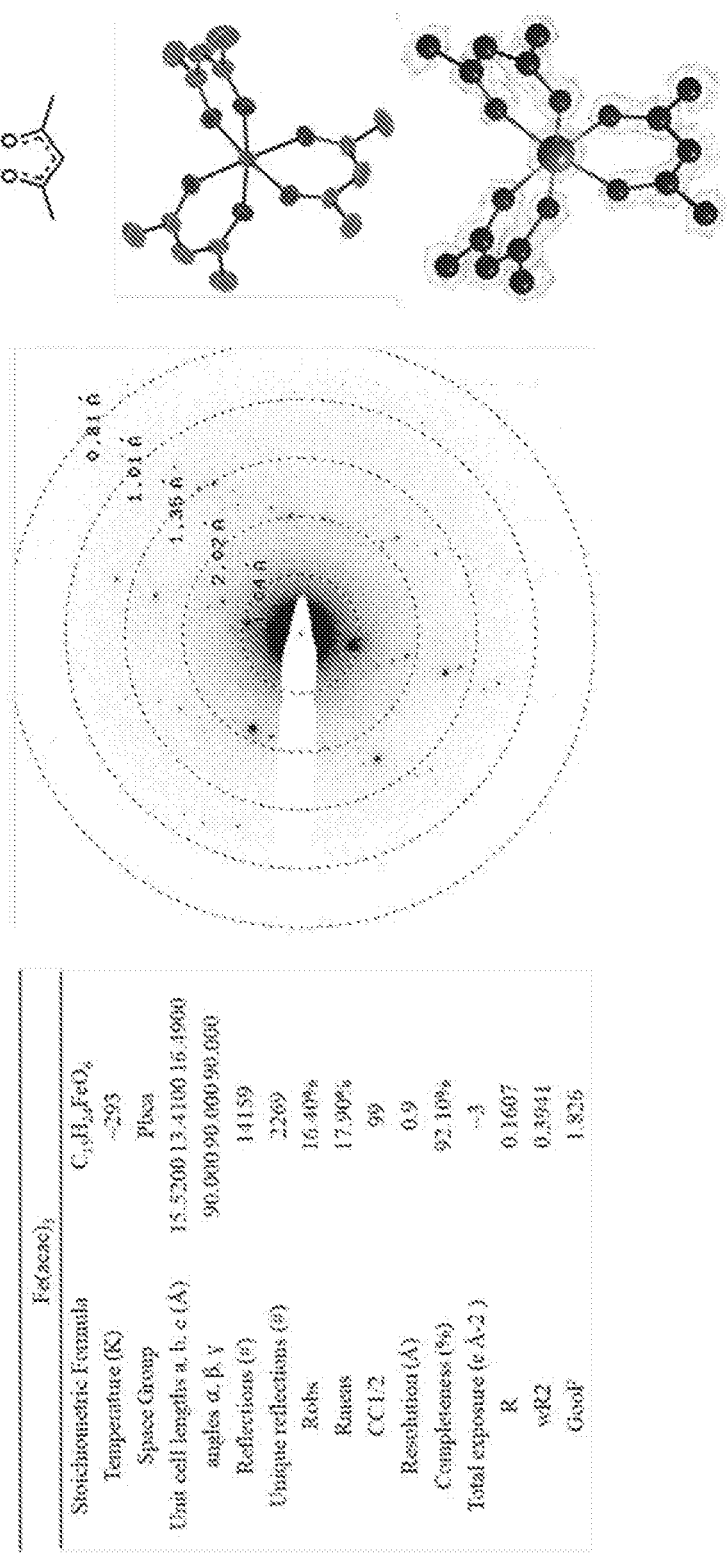
FIG. 20: A table showing data and statistics, and illustrations showing a sample electron diffraction pattern and solved structural models for compound 4.
Figure 21:
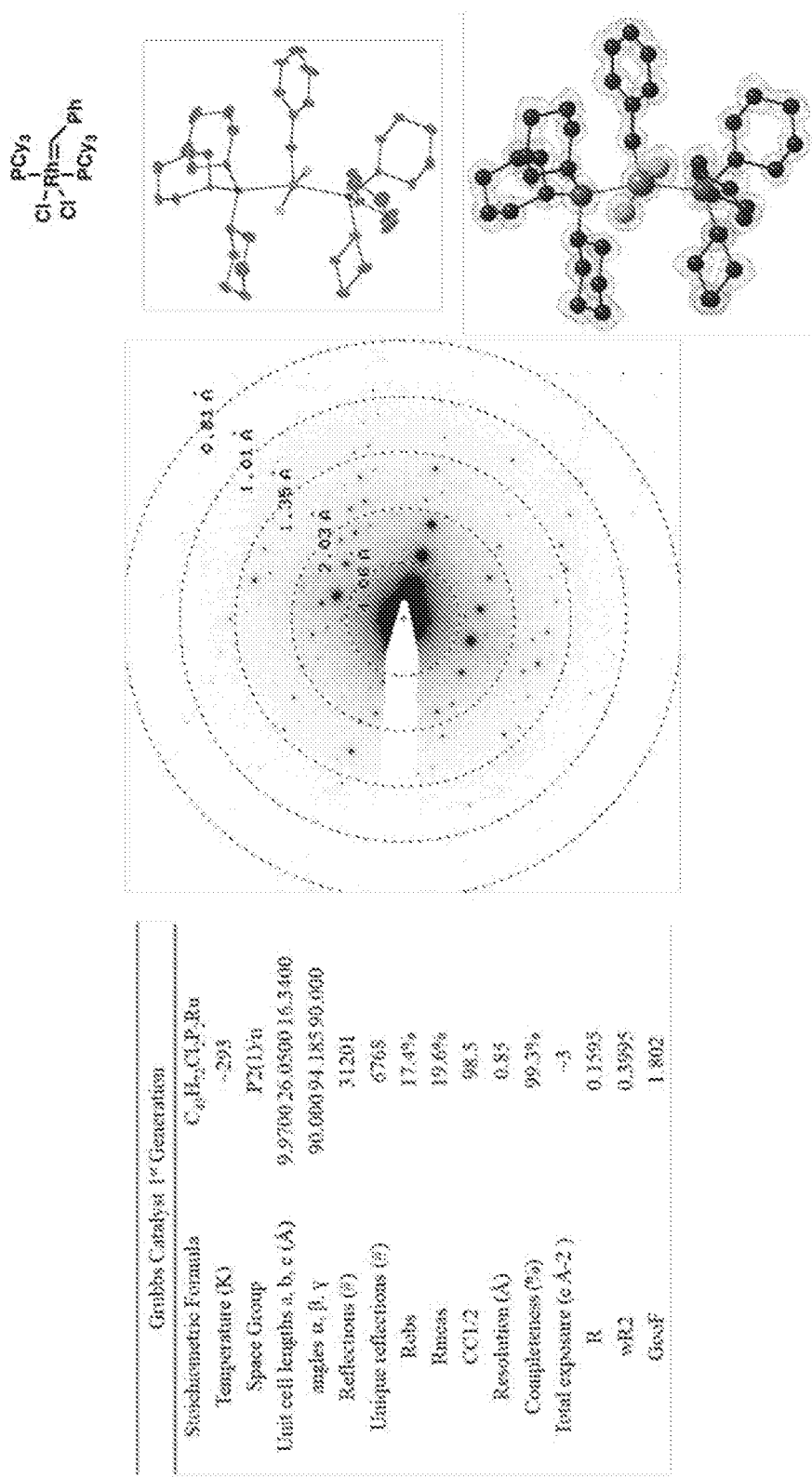
FIG. 21: A table showing data and statistics, and illustrations showing a sample electron diffraction pattern and solved structural models for compound 5.
Figure 22:
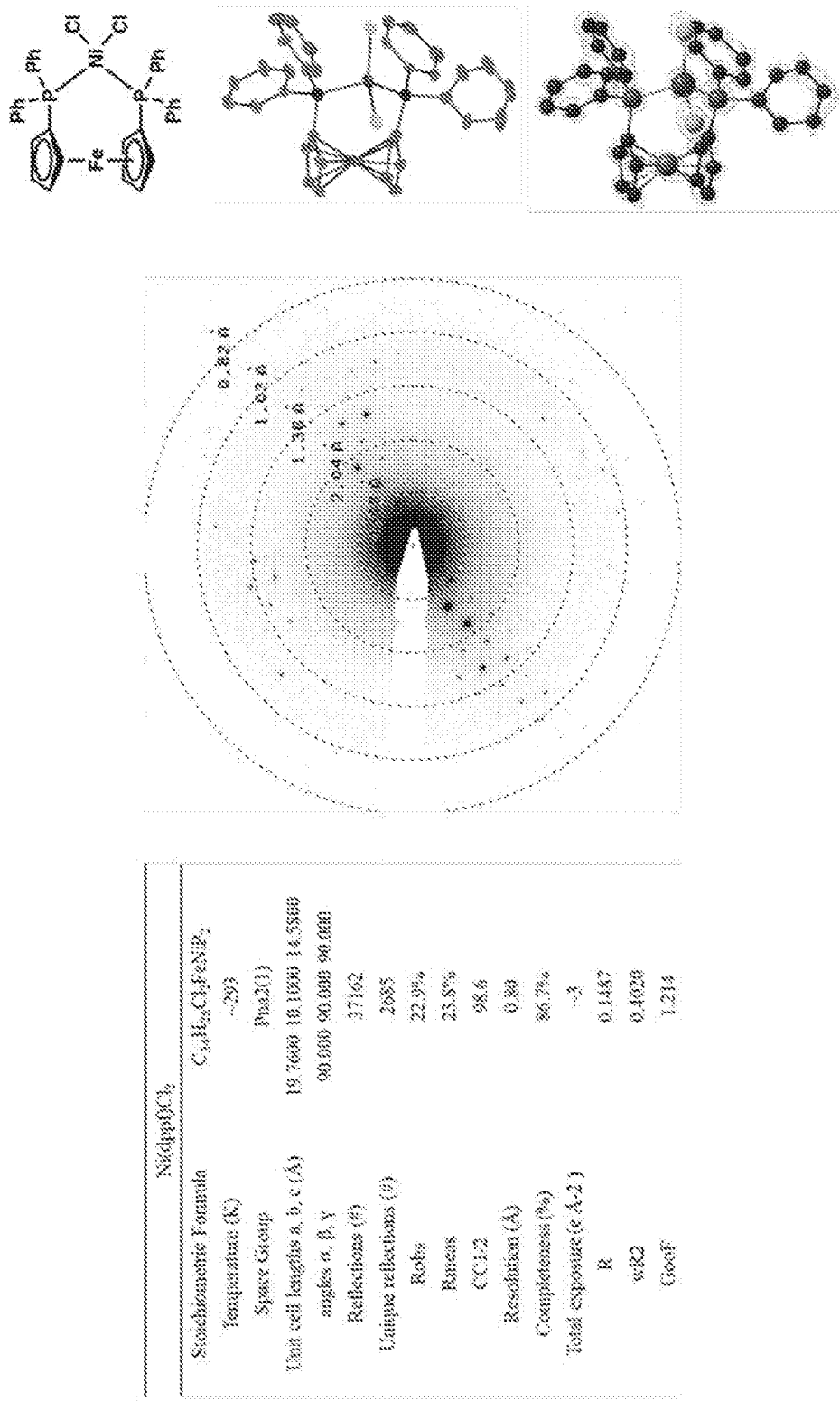
FIG. 22: A table showing data and statistics, and illustrations showing a sample electron diffraction pattern and solved structural models for compound 6.
Figure 23:
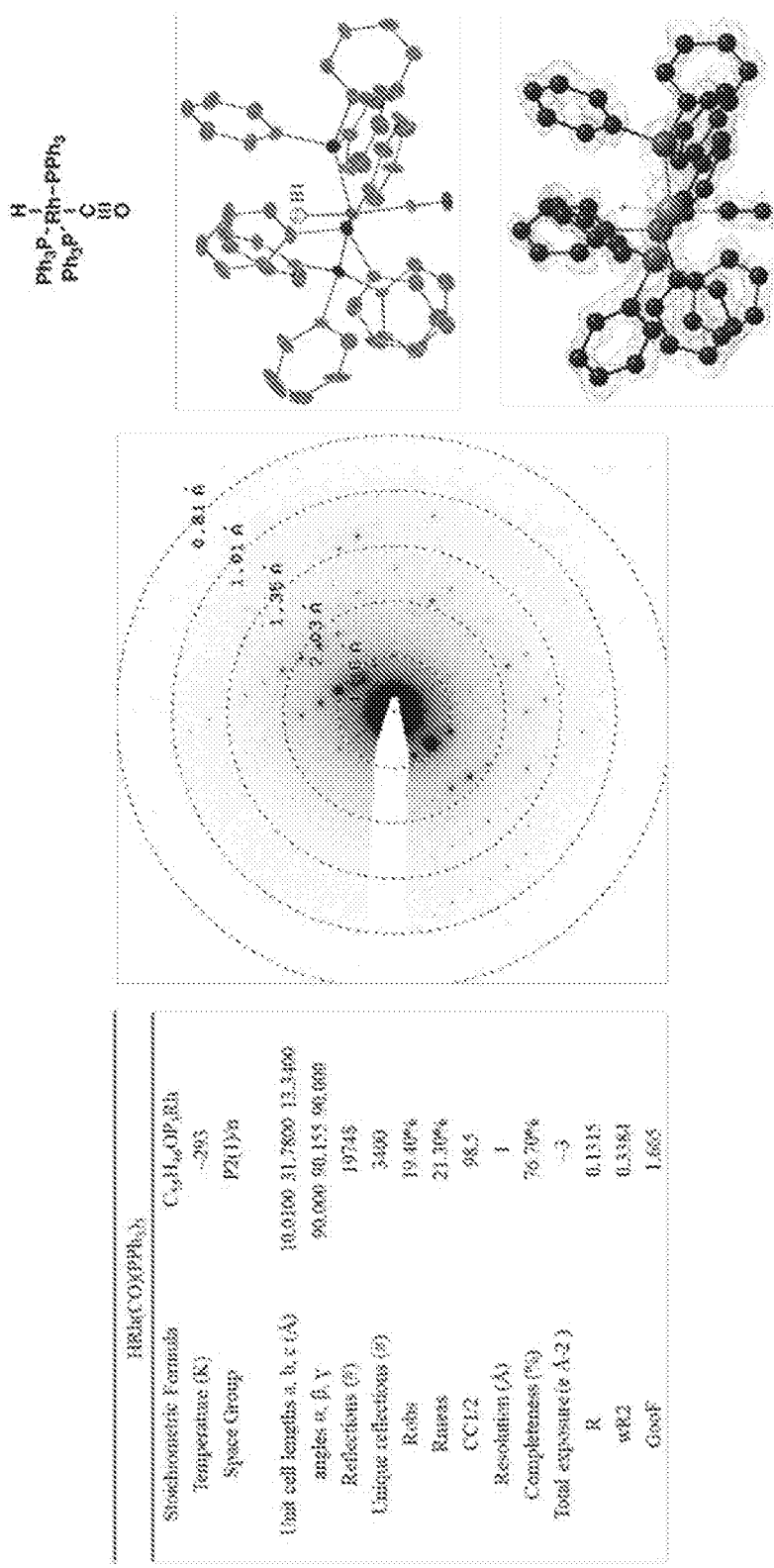
FIG. 23: A table showing data and statistics, and illustrations showing a sample electron diffraction pattern and solved structural models for compound 7.
Figure 24:
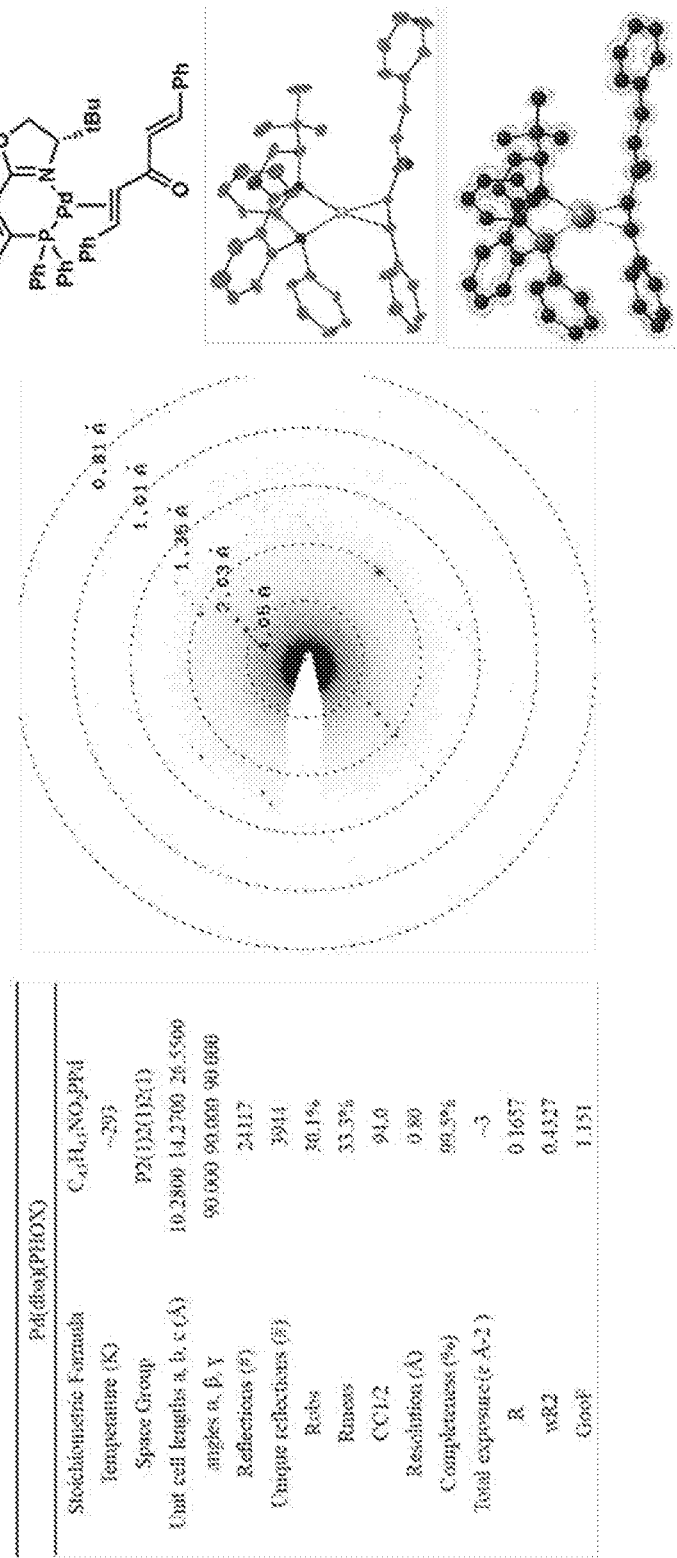
FIG. 24: A table showing data and statistics, and illustrations showing a sample electron diffraction pattern and solved structural models for compound 8.

Concurrent to our study of the application of MicroED to organometallic species, we sought to apply MicroED to active research problems in our groups including the reactivity of dimeric Pd(I) complexes. Dimeric palladium(I) species featuring Pd—Pd bonds have been previously reported to react with a variety of small molecules to give homolytic cleavage[13] or insertion products.[14] Pd(I) dimer 2 (FIG. 16), synthesized by thermolysis or UV irradiation of the methyl palladium phosphine precursor,[15] was fully characterized by single crystal XRD (FIG. 16B) and multinuclear NMR (see Example 4). To study the reactivity of this species (2) a THF solution was treated with ethylene gas, which interestingly led to a dramatic color change and precipitation of a yellow solid (FIG. 16A). Efforts to characterize this solid, however, were frustrated by the lack of solubility and fragile nature of the putative ethylene adduct, as treatment of the precipitant with a variety of crystallization and/or NMR solvents led to rapid gas release and reformation of starting material 2. Typically, such physical properties of a reactive intermediate would preclude definitive structural characterization. The yellow precipitate was instead taken directly from the reaction mix and deposited on an EM grid for characterization by MicroED. Remarkably, under high magnification the apparently amorphous solid proved to have nanocrystalline domains that yielded the electron diffraction patterns shown in FIG. 19. Diffraction movies were reduced to yield a high completeness dataset that produced an ab initio solution, which during refinement led to the definitive structural assignment of the species as the unexpected oxidative insertion product 3 (FIG. 16D). Such ethylene insertion products have been reported but remain rare.[16-18] This structure features two Pd(II) phosphine moieties linked by the reduced ethylene linker (FIG. 16C). The extended linker precludes ipso-π-arene interactions of the phosphines and therefore one equivalent of THF completes the coordination sphere of each palladium center.

To establish the generality of our approach we went on to determine structures of five additional commonly-used organometallic compounds and transition metal coordination complexes (FIG. 17). The structures of tris(acetylacetonato)iron(III) [Fe(acac)3] (4), benzylidene-bis(tricyclohexylphosphino)-dichlororuthenium (Grubbs' 1st generation catalyst) (5), [1,1-bis(diphenylphosphino)ferrocene]dichloronickel(II) (6), Pd(dibenzylideneacetone)((S)-4-tert-butyl-2-[2-(diphenylphosphino)phenyl]-2-oxazoline) (Pd(dba)(PHOX)) (7), and carbonyl(hydrido)tris(triphenylphosphane)rhodium(I) [HRh(CO)(PPh3)3] (8), (FIG. 17A), were all determined using direct methods from data collected at non-cryogenic temperatures. Together, this set of molecular structures demonstrates the utility of ambient temperature electron diffraction for the study of transition-metal complexes. Bulk powders of these compounds were analyzed by MicroED as previously described,[2] but now at ambient temperature (ca. 23° C.), using a low flux 300 keV electron beam (e.g., below 0.01e-/Å$^2$ per second). Movies were collected from continuously rotating crystals using a TVIPS XF-416 camera in rolling shutter mode. Data collected from one or more crystals were merged and resulted in the assignment of space group and unit cell parameters that closely matched published values for XRD structures of these compounds.[19] The position of the observed hydride in the case of the Rh—H complex (8) is both geometrically and symmetrically consistent with the published X-ray crystallographic data.[20] While the published structures of these compounds are associated with lower statistical errors in general, our ambient temperature MicroED structures were determined from bulk powders (i.e., no formal recrystallization). These considerations render electron diffraction a powerful alternative for structural determination of transition-metal hydride structures. While the current quality of electron diffraction data does not allow for the unambiguous placement of atoms such as metal hydrides with high enough precision to facilitate accurate discussion of bond lengths and angles, the statistics of hydride localization are expected to improve with subsequent amelioration of microscopes and detectors, and improved refinement frameworks.

Conclusions

Ambient temperature electron diffraction is an advantageous step toward the routine determination of organometallic species potentially applicable to a wide array of small molecule organometallic and inorganic solids. The ability to routinely solve structures from nanocrystalline material and unambiguously determine the position of all atoms, including historically challenging hydrides attached to heavy atoms, presents chemists with a potent tool for the broad identification and characterization of elusive, but relevant, complexes. Armed with this method, we have determined structures of a diverse series of organometallic compounds and transition metal coordination complexes, including those obtained from both commercial and laboratory synthesis. Importantly, each of these structures was determined ab initio by direct methods and refined using methods common to XRD. Our application of ambient temperature MicroED to the structure determination of Schwartz's reagent, obtained directly from the commercial seemingly amorphous powder, highlights the power of this new approach. Despite the importance of this molecule in synthetic chemistry, no previous high-resolution crystal structures have been obtained, as a result of the seemingly amorphous nature of the white powder obtained by precipitation during its preparation. Our ambient temperature MicroED structure not only confirms the dimeric nature of the reagent, but more remarkably, identifies the likely locations of bridging hydrides that are visible in electrostatic potential maps and can be refined freely. This method also allows for the determination of an unusual Pd(II) intermediate that was not amenable to structure determination by solution-state NMR or single crystal X-ray diffraction. Moreover, neutron diffraction would be incompatible with this compound due to destructive boron neutron capture nuclear reactions. Importantly, while several protein structures have been determined by MicroED using molecular replacement, and structures of small molecules and polypeptides of known connectivity have been determined from MicroED data via direct methods, the reported Pd(II) complex (3) is the first reported complex molecular structure solved by MicroED without prior knowledge of the structure or other corroborating spectroscopic studies. While our data does not facilitate extensive discussions of bond lengths or angles due to higher-than-expected statistical errors in refinement compared to traditional XRD, the fact that cryogenic temperatures are not required to obtain structural information from reactive metal complexes is ground breaking as many research institutions can make rapid use of readily available TEM facilities. We find that the use of shorter wavelengths reduces electron-crystal interactions, thereby attenuating electron dosage and multiple elastic scattering, leading to less radiation damage and improved resolution. Moreover, utilization of a more sensitive and faster detector, with shorter dead-time reduces peak overlap between frames as well. Ambient temperature measurements also dramatically simplify sample preparation and loading, eliminating issues typically associated with cryogenic cooling that often complicate crystal screening and data collection (e.g., ice deposition). We envision that micro-electron diffraction will continue to improve and find new applications in the molecular sciences. Efforts directed toward a multitude of new frontiers in small molecule electron diffraction are already underway. These efforts are expected to bring new horizons for small molecule structure determination over the coming months and years.

References for Example 3

1 Nedunchezhian, K.; Aswath, N.; Thiruppathy, M.; Thirugnanamurthy, S., Boron Neutron Capture Therapy—A Literature Review. *J. Clin. Diagn. Res.* 2016, 10, ZE01-ZE04.
2 Jones, C. G.; Martynowycz, M. W.; Hattne, J.; Fulton, T. J.; Stoltz, B. M.; Rodriguez, J. A 2; Nelson, H. M.; Gonen, T. The CryoEM Method MicroED as a Powerful Tool for Jones, C. G.; Martynowycz, M. W.; Hattne, J.; Fulton, T. J.; Stoltz, B. M.; Rodriguez, J. A.; Nelson, H. M.; Gonen, T. The CryoEM Method MicroED as a Powerful Tool for Small Molecule Structure Determination. *ACS Central Science* 2018, 4, 1587-1592.
3 Hart, D. W.; Schwartz, J. Hydrozirconation. Organic synthesis via organozirconium intermediates. Synthesis and rearrangement of alkylzirconium(IV) complexes and their reaction with electrophiles. *J. Am. Chem. Soc.* 1974, 96, 8115-8116.
4 Schwartz, J.; Labinger, J. A. Hydrozirconation: A new transition metal reagent for organic synthesis. *Angew. Chem. Int. Ed. Engl.* 1976, 15, 333-340.
5 Wieclaw, M. M.; Stecko, S. Hydrozirconation of C=X functionalities with Schwartz's reagent. *Eur. J. Org. Chem.* 2018, 2018, 6601-6623.
6 Pinheiro, D. L. J.; de Castro, P. P.; Amarante, G. W. Recent Developments and Synthetic Applications of Nucleophilic Zirconocene Complexes from Schwartz's Reagent. *Eur. J. Org. Chem.* 2018, 35, 4828-4844.
7 Kautzner, B.; Wailes, P. C.; Weigold, H. Hydrides of bis(cyclopentadienyl)zirconium. *J. Chem. Soc., Chem. Commun.* 1969, 1105.
8 Wailes, P. C.; Weigold, H. Hydrido complexes of zirconium I. Preparation. *J. Organomet. Chem.* 1970, 24, 405-411.
9 Takahashi, T.; Suzuki, N.; Jayasuriya, N.; Wipf, P. Chlorobis(cyclopentadienyl)hydridozirconium. *Encyclopedia of Reagents for Organic Synthesis* 2006.
10 Rossini, A. J.; Mills, R. W.; Briscoe, G. A.; Norton, E. L; Geier, S. J.; Hung, I.; Zheng, S.; Autschbach, J.; Schurko, R. W. Solid-State Chlorine NMR of Group IV Transition Metal Organometallic Complexes. *J. Am. Chem. Soc.* 2009, 131, 3317-3330.
11 Harlan, C. J.; Bott, S. G.; Barron, A. R. Methyl-hydride metathesis between [Zr(cp)2Me2] and [HAl(µ3-NBut)]4: molecular structures of [Me1-xHxAl(µ3-NBut)]4 (x=0, 0.78 or 1) and [(cp)2ZrMe(µ-H)]2 (cp=η5-C5H5). *J. Chem. Soc., Dalton Trans.* 1997, 637-642.
12 Peng, L. M. Electron atomic scattering factors and scattering potentials of crystals. *Micron* 1999, 30, 625-648.
13 Fafard, C. M.; Adhikari, D.; Foxman, B. M.; Mindiola, D. J.; Ozerov, O. V. Addition of Ammonia, Water, and Dihydrogen Across a Single Pd—Pd Bond. *J. Am. Chem. Soc.* 2007, 129, 10318-10319.
14 Huacuja, R.; Graham, D. J.; Fafard, C. M.; Chen, C.-H.; Foxman, B. M.; Herbert, D. E.; Alliger, G.; Thomas, C. M.; Ozerov, O. V. Reactivity of a Pd(I)—Pd(I) Dimer with O2: Monohapto Pd Superoxide and Dipalladium Peroxide in Equilibrium. *J. Am. Chem. Soc.* 2011, 133, 3820-3823.
15 Kleinsasser, J. F.; Reinhart, E. D.; Estrada, J.; Jordan, R. F.; Lavallo, V., Ethylene Oligomerization and Polymerization by Palladium(II) Methyl Complexes Supported by Phosphines Bearing a Perchlorinated 10-Vertex closo-Carborane Anion Substituent. *Organometallics* 2018, 37, 4773-4783.
16 Hetterscheid, D. G. H.; Kaiser, J.; Reijerse, E.; Peters, T. P. J.; Thewissen, S.; Blok, A. N. J.; Smits, J. M. M.; de Gelder, R.; de Bruin, B. IrII(ethene): Metal or Carbon Radical? *J. Am. Chem. Soc.* 2005, 127, 1895-1905.
17 Van Voorhees, S. L.; Wayland, B. B. Formation of metallo hydride, formyl, and alkyl complexes of Rh(TMTAA). *Organometallics* 1987, 6, 204-206.
18 Huacuja, Rafael (2014). Synthesis and Reactivity of Unusual Palladium (II) Complexes Supported by a Diarylamido/BIS(Phosphine) PNP Pincer Ligand. Doctoral dissertation, Texas A & M University. Available electronically from http://hdl.handle.net/1969.1/152457.
19 Weng, S.-S.; Ke, C.-S.; Chen, F.-K.; Lyu, Y.-F.; Lin, G.-Y. Transesterification Catalyzed by Iron(III) β-Diketonate Species. *Tetrahedron* 2011, 67, 1640-1648.
20 Babra, I. S.; Morley, L. S.; Nyburg, S. C.; Parkins, A. W. The crystal and molecular structure of a new polymorph of carbonylhydridotris(triphenylphosphine)rhodium(I) having a Rh-H stretching absorption at 2013 cm-1. *J. Crystallogr. Spectrosc. Res.* 1993, 23, 997-1000.

Example 4: Additional Details for Characterization of Reactive Organometallic Species Via MicroED General Considerations Grubbs Catalyst® 1st Generation and Schwartz's reagent were purchased from Sigma-Aldrich. Carbonyl(hydrido)tris (triphenylphosphane)rhodium(I) was purchased from Strem Chemicals. All commercial samples were used as received from the supplier. Pd(dba)(PHOX), Fe(acac)$_3$, and Ni(dppf) Cl$_2$ were prepared according to the reported literature procedures.[1-3] Synthetic samples were precipitated from solution and used as prepared with no formal recrystallization. Unless otherwise stated, all manipulations were carried out using standard Schlenk or glovebox techniques (O$_2$, H$_2$O<1 ppm) under a dinitrogen or argon atmosphere. Solvents were dried on K or CaH$_2$ and distilled under argon before use. ($\kappa^2$-P,Cl—PPh$_2$CB$_9$Cl$_9$)PdMe(THF) was prepared according to the literature procedure.[4] $^1$H NMR spectra were recorded at room temperature on Bruker Avance 300 MHz, Bruker Avance 400 MHz, or Bruker Avance 600 MHz spectrometers. NMR chemical shifts are reported in parts per million (ppm). $^1$H NMR and $^{13}$C NMR chemical shifts were referenced to residual protio solvent. $^{11}$B NMR chemical shifts were externally referenced to BF$_3$OEt$_2$. $^{31}$P NMR chemical shifts were externally referenced to 80% H$_3$PO$_4$ in H$_2$O. The mass spectrometry data was collected on an Agilent LCTOF Multimode-ESI/APCI with direct injection.

Sample Preparation

Samples were prepped using Quantifoil R1/2 Cu200 mesh grids. For preparation of Pd(dba)(PHOX), Ni(dppf)Cl$_2$, and Fe(acac)$_3$ samples, grids were placed in a dram vial with ~1 mg of compound and shaken lightly. The samples were tapped against the surface of a filter paper to remove residual compound and the TEM grid was subsequently transferred to a clean vial. Schwartz's reagent, compounds Grubbs Catalyst and Rh hydride samples were prepared in a similar fashion within a glove box under N$_2$ as received from the supplier. All samples were transferred from sealed vials to the sample holder under ambient conditions with no additional experimental setup.

Instrument Parameters

All data was collected on a FEI Technai TF-30 electron microscope operating at ambient temperature with an operating voltage of 300 keV, corresponding to a wavelength of ~0.0196 Å using a single-tilt sample holder. TEM grids were screened by operating the microscope in over focused diffraction mode.

Data Collection Procedure

Diffraction data was collected using rolling shutter mode with a TVIPS TemCam-XF416 CMOS 4 k×4 k camera. Images were collected as movies by continuous rotation of crystals under a parallel electron beam using a constant tilt rate of ~0.6 s-1 deg over an angular wedge of ~50° between the minimum and maximum tilt ranges of −72° to +72° respectively[5] During data collection, the camera integrated continuously at a rate of 3 s per frame. Crystals were isolated using a selected area aperture to reduce background noise and calibrated to eucentric height to remain within the aperture during continuous rotation over the tilt range.

Diffraction movies were saved as TVIPS files and were converted to SMV format using open source software freely available online (https://cryoem.ucla.edu/pages/MicroED). Frames were indexed and integrated in XDS and multiple datasets were scaled and merged using XSCALE.[6,7] Intensities were converted to SHELX format using XDSCONV.[7] All structures were solved ab initio using direct methods in SHELXT and refined in SHELXL.[8,9]

Screened Coulombic Potential Computational Analysis and Isolation of Hydrides

The SHELXLE-refined structure was loaded into MATLAB using the tom_mrcread function from the Max Planck Institute of Biochemistry's tomography toolbox (see S. Nickell et al., *J. Struct. Biol.* 2005, 149, 227-234). Since tom_mrcread does not accommodate .res files, the shelx2map conversion tool was used to generate .map files directly from the SHELXLE output (http://shelx.uni-ac.gwdg.de/~tg/research/programs/conv/shelx2map/). This gave two daughter files, a difference Fourier map of the asymmetric unit and a standard map. Both of these .map files could be loaded without modification into MATLAB using tom_mrcread. The output from tom_mrcread was stored in a temporary variable which materialized as a 40×20×24 single. These arbitrary dimensional values scale to the corresponding unit cell vectors (i.e., a=7.21, b=9.20, c=13.84). To facilitate further manipulation, each of these dimensions was multiplied by a factor of 4; the variable was thus resized into a 160×80×96 double vol using the imresize command. To take consecutive real-space slices of screened Coulombic potential along the aaxis, a loop of this general template was employed:

```
for x=2:159
imagesc(squeeze(sum(vol(x−1:x+1,:,:),1))), axis image tight manual, colormap jet;
set(gca, 'YTickLabel',(10:10:80)./80);
set(gca, 'XTickLabel',(10:10:90)./96);
pause( );
end
```

Figure 25:
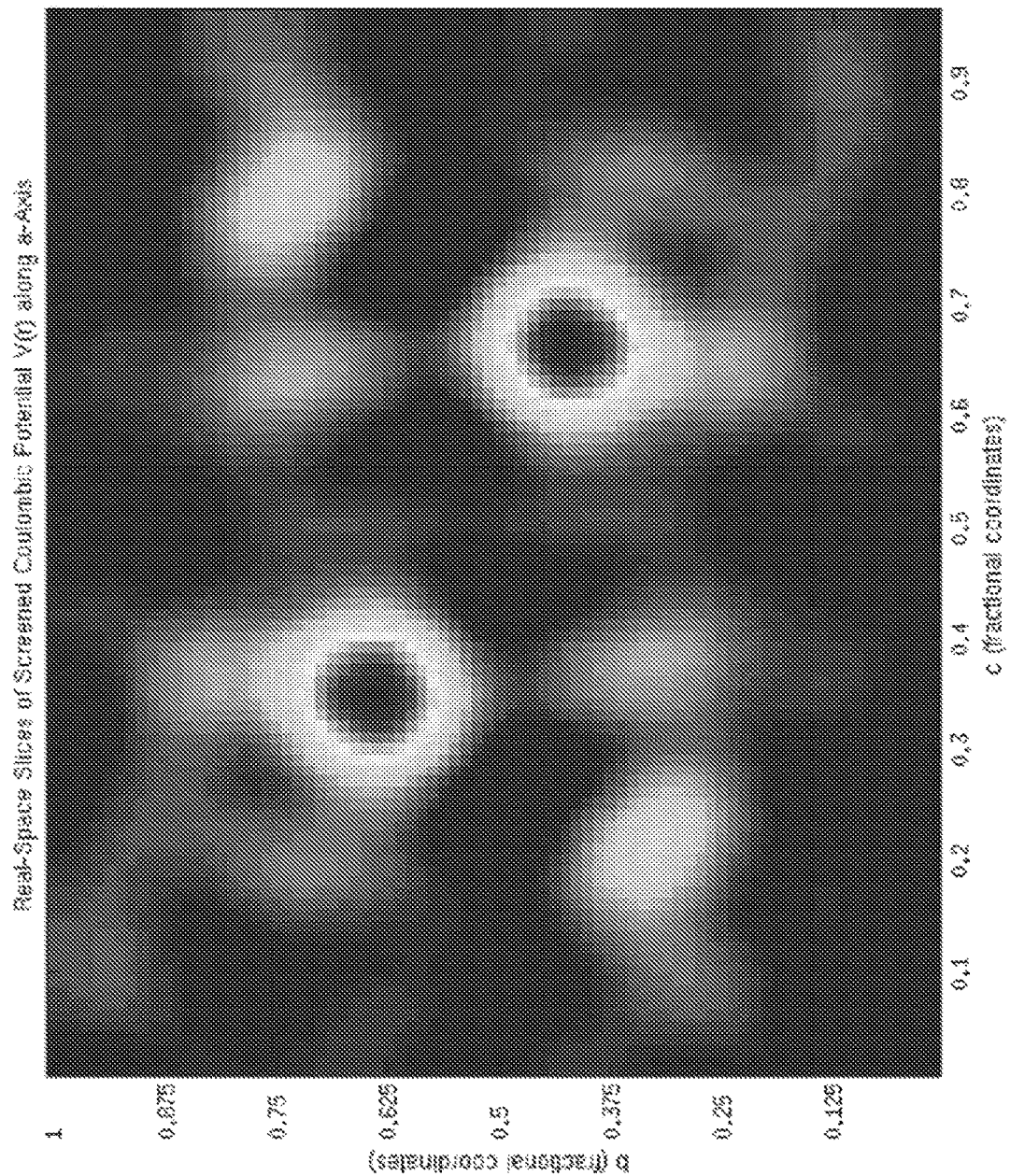
FIG. 25: An illustration of a diagnostic frame showing clear screened Coulombic potential for the two hydrides, which materialize at (0.378, 0.291) and (0.622, 0.709). These values correspond precisely to the fractional coordinates predicted by the .cif file generated from SHELXLE.
Figure 27:
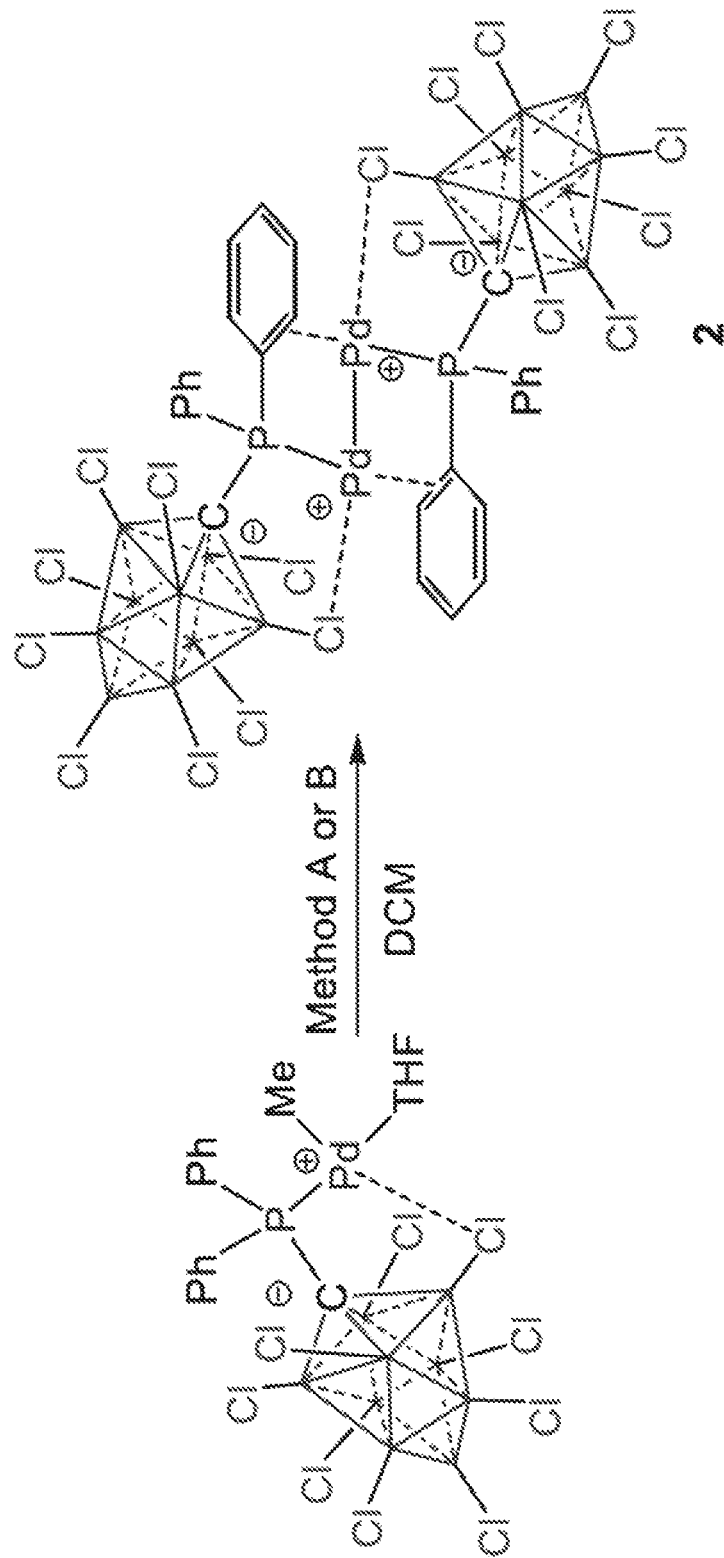
FIG. 27: An illustration showing a scheme for complex 2.
Figure 28:
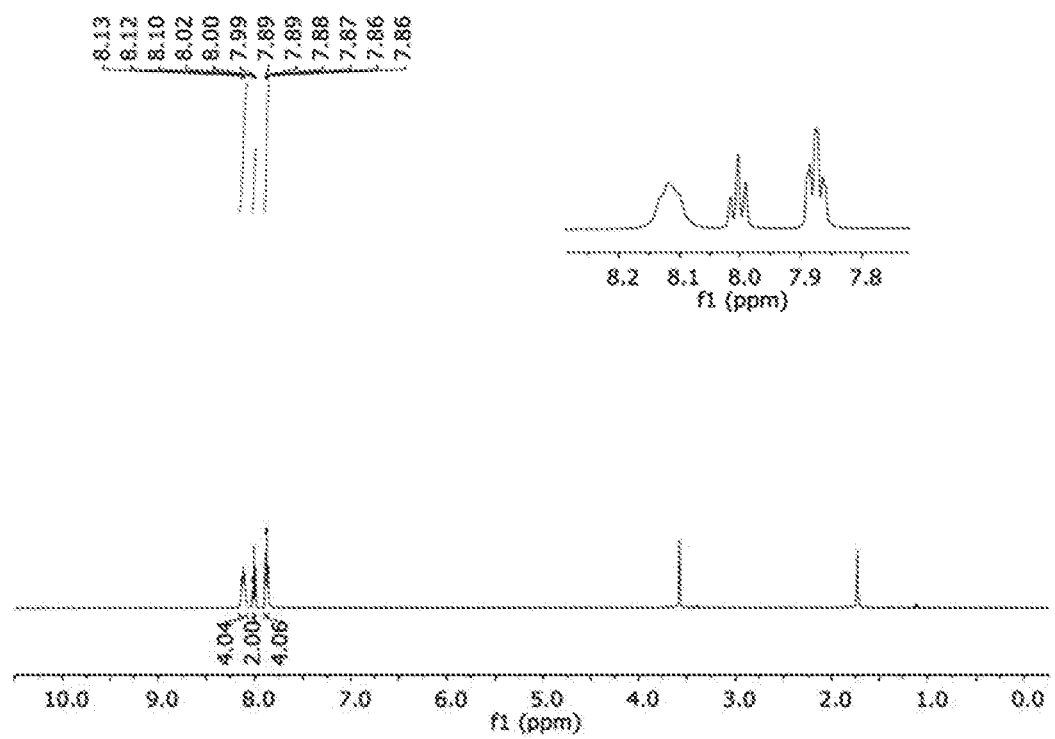
FIG. 28: A graph showing a $^1$H NMR spectrum of compound 2 (THF-$d_8$, 600 MHz).
Figure 29:
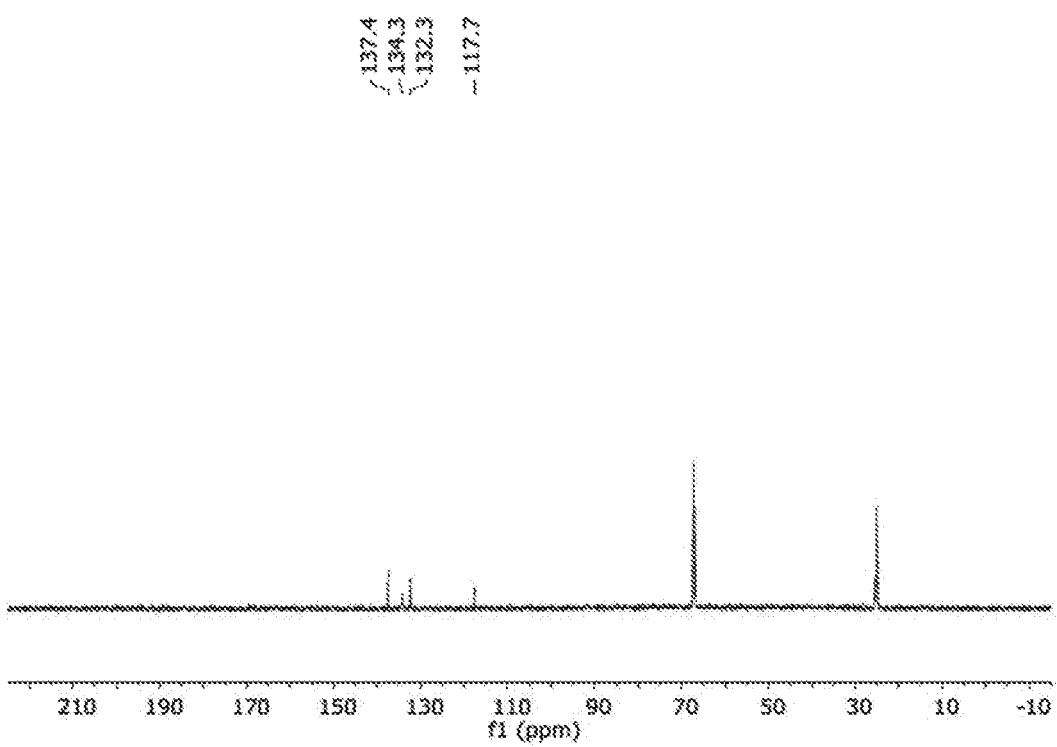
FIG. 29: A graph showing a $^{13}$C NMR spectrum of compound 2 (THF-$d_8$, 151 MHz).
Figure 30:
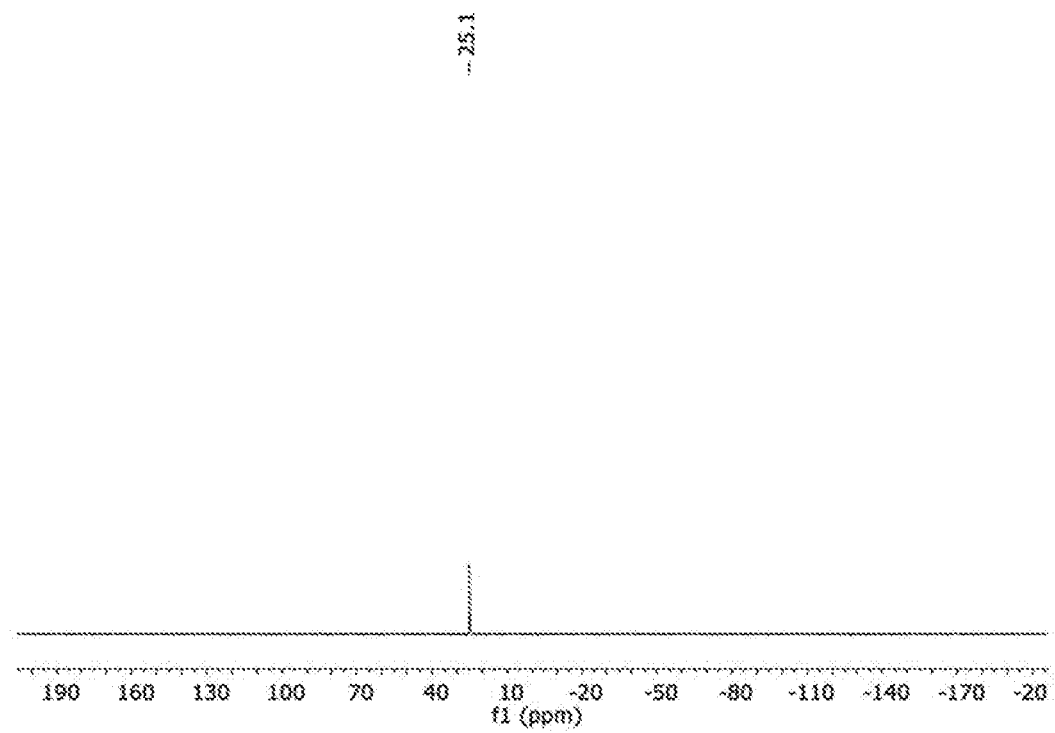
FIG. 30: A graph showing a $^{31}$P[$^1$H] NMR spectrum of compound 2 (THF-$d_8$, 243 MHz).
Figure 31:
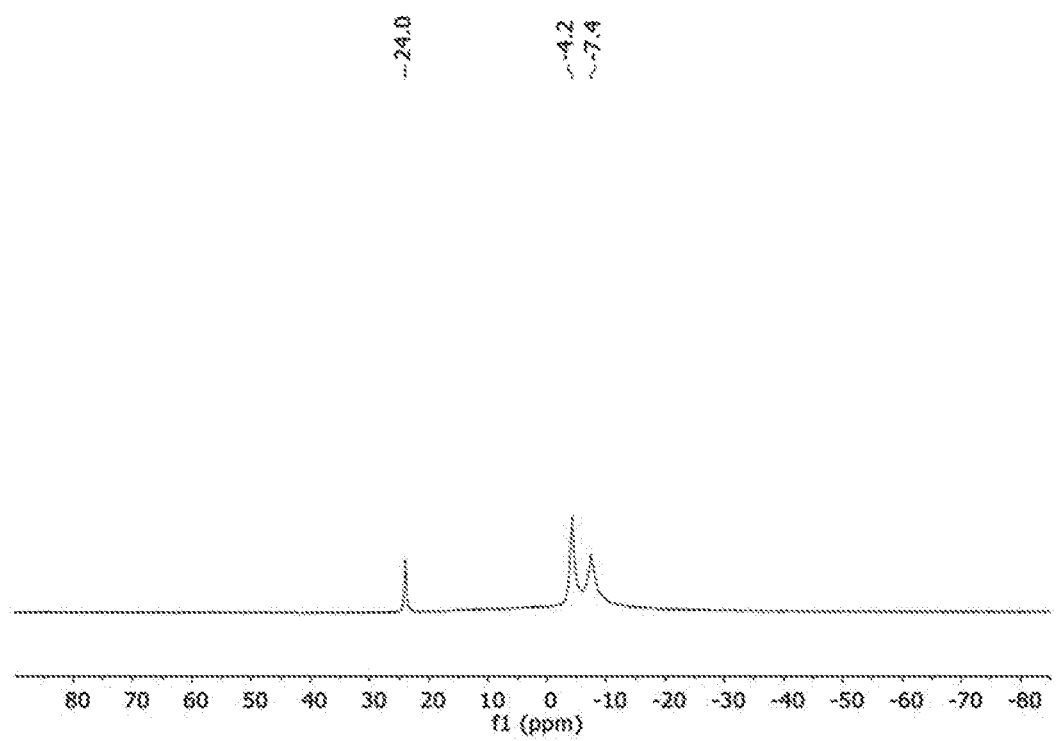
FIG. 31: A graph showing a $^{11}$B[$^1$H] NMR spectrum of compound 2 (THF-$d_8$, 192 MHz).
Figure 32:
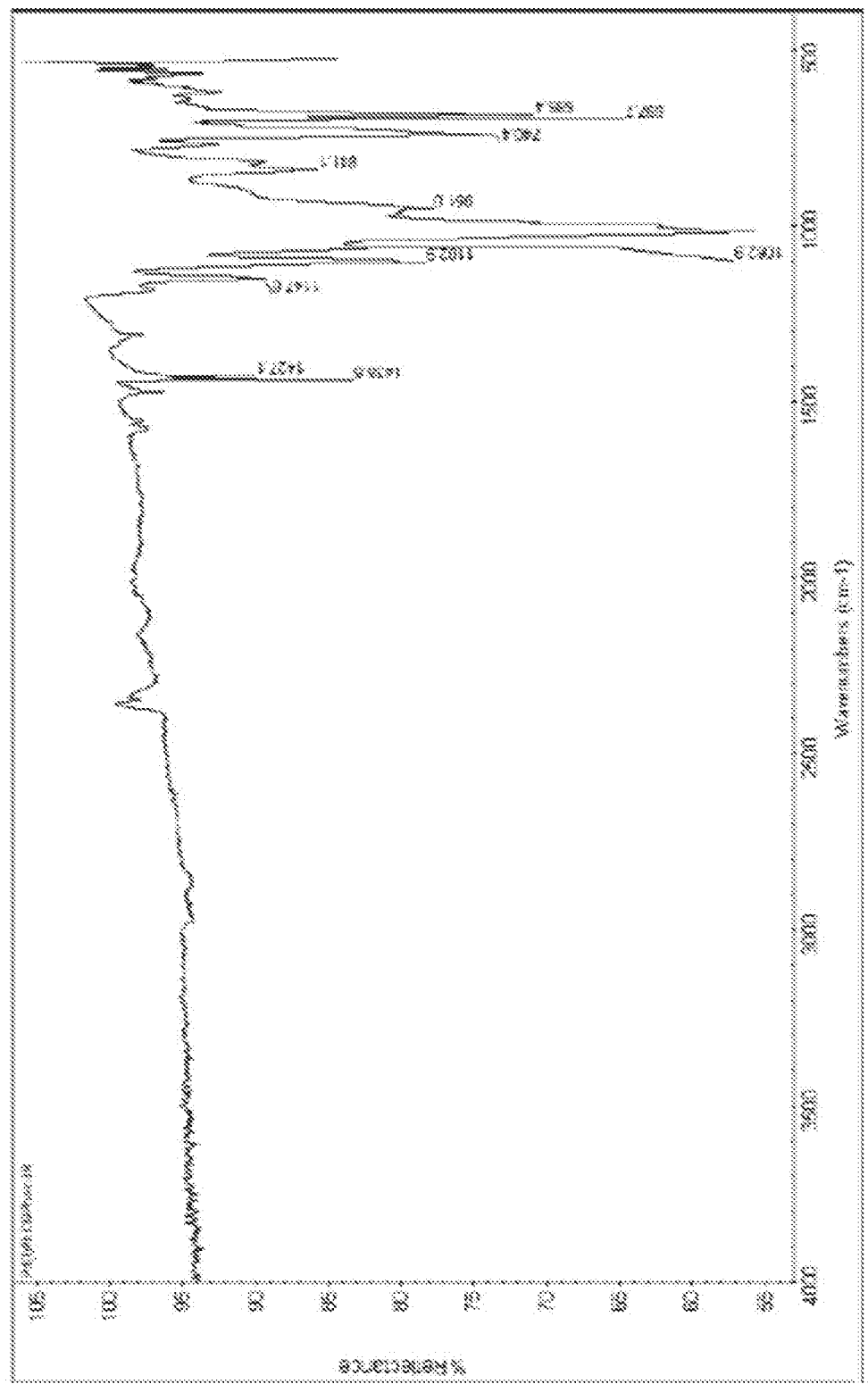
FIG. 32: A graph showing an FTIR spectrum of compound 2.

These lines of code generate images which look like the one shown in FIG. 25.

To confirm the presence of the hydrides, the diagnostic areas of Yukawa potential were crossreferenced to the fractional coordinates of the .cif file generated from SHELXLE. They matched exactly. (FIG. 26).

The upper and lower bounds of the loop correspond to the minimum and maximum values possible for the a-axis adjusted by 1 (i.e., 1+1, 160−1). This is because the first argument of vol visualizes a single slice by isolating one frame (i.e., the frame between x−1 and x+1). To display an average of several frames in lieu of a single frame (i.e., to thicken the width of one slice), the x−1 and x+1 parameters can be adjusted accordingly. To display a series of slices taken along a different axis, simply adjust the bounds of the loop and the position of the variable argument accordingly. The set commands provide increments for the axes. Supplying a numerical argument for pause will auto-cycle through the frames. Here is an exemplary loop showing thicker slices taken along the b-axis, with a 0.4-second delay between slices (note that the dimensions of the resulting images will shift according to the dimensions of the slices taken along the new axis):

```
for x=1:80
imagesc(squeeze(sum(vol(:,4*x−3:4*x,:),2))), axis image tight manual, colormap jet;
pause(0.4);
end
```

Electron Diffraction Data and Statistics

Data, statistics, a sample diffraction pattern, and structures for compounds 1, 3, 4, 5, 6, 7, and 8 are shown in FIGS. 18-24.

To generate .gif files containing all of the individual slices taken along the a-axis, each image generated was saved as a .png file using the imwrite function and horizontally concatenated using strcat, as follows:

```
for x=1:159
    imwrite(uint8(squeeze((255/5.3)*vol(x,:,:))),strcat('./filepath',int2str(x),'.png'),'png')
;
end
```

The resulting stack of .png images was loaded into the image processing software ImageJ and fused into a .gif file. Two .gif files of slices taken along the a-axis and b-axis—both generated using code supplied above—are available for perusal as Supplementary Movies 1 and 2, respectively from C. Jones, Characterization of reactive organometallic species via MicroED (2019), doi=10.26434/chemrxiv.7940525.v2 uploaded at https://chemrxiv.org/articles/Characterization_of_reactive_organometallic_species_via_MicroED/7940525. These movies provide a powerful bird's-eye view of what it would look like to traverse the unit cell from disparate incident trajectories. Violet fire LUTs were implemented in ImageJ for the a-axis movie, while MATLAB's default jet colormap was used for the b-axis movie.

Synthetic Procedure and Spectroscopic Data for Compounds 2 and 3

Synthesis of Complex 2:

Complex ($\kappa^2$-P,Cl—PPh$_2$CB$_9$Cl$_9$)PdMe(THF) (500 mg) was placed in a 200 mL flame dried Schlenk flask and was subsequently dissolved in DCM (80 mL). The flask was placed on the Schlenk line and placed under UV radiation (Method A) or heated to 40° C. (Method B) for 4 days without stirring. After 4 days, the reaction was taken into the glovebox and filtered through a Hirsch funnel fitted with a glass microfiber filter and washed with DCM (5×20 mL). The red solid was then passed through the filter with copious amounts of THF. The THF was then removed in vacuo to give a complex 2 as a red solid (Method A: 309 mg 66% yield; Method B: 178 mg (35% yield)). Crystals suitable for an X-ray diffraction study were obtained by layering a THF solution of 2 with pentane. m.p.=221° C. (dec.): $^1$H NMR (600 MHz, THF-d$_8$, 25° C.): δ=8.13, 8.12, 8.10 (t, 4H, $^3$J(H,H)=9.0 Hz), δ=8.02, 8.00, 7.99 (t, 2H, $^3$J(H,H)=7.4 Hz), δ=7.89-7.86 (dt, 4H, $^3$J(H,H)=7.5 Hz, $^4$J(H,H)=2.5 Hz); $^{13}$C NMR (151 MHz, THF-d$_8$, 25° C.): δ=137.4, 134.3, 132.3, 117.7; $^{31}$P[$^1$H] NMR (243 MHz, THF-d$_8$, 25° C.): δ=25.1; $^{11}$B[$^1$H] NMR (192 MHz, THF-d$_8$, 25° C.): δ=24.0, −4.2, −7.4. (FIGS. 27-32).

Figure 33:
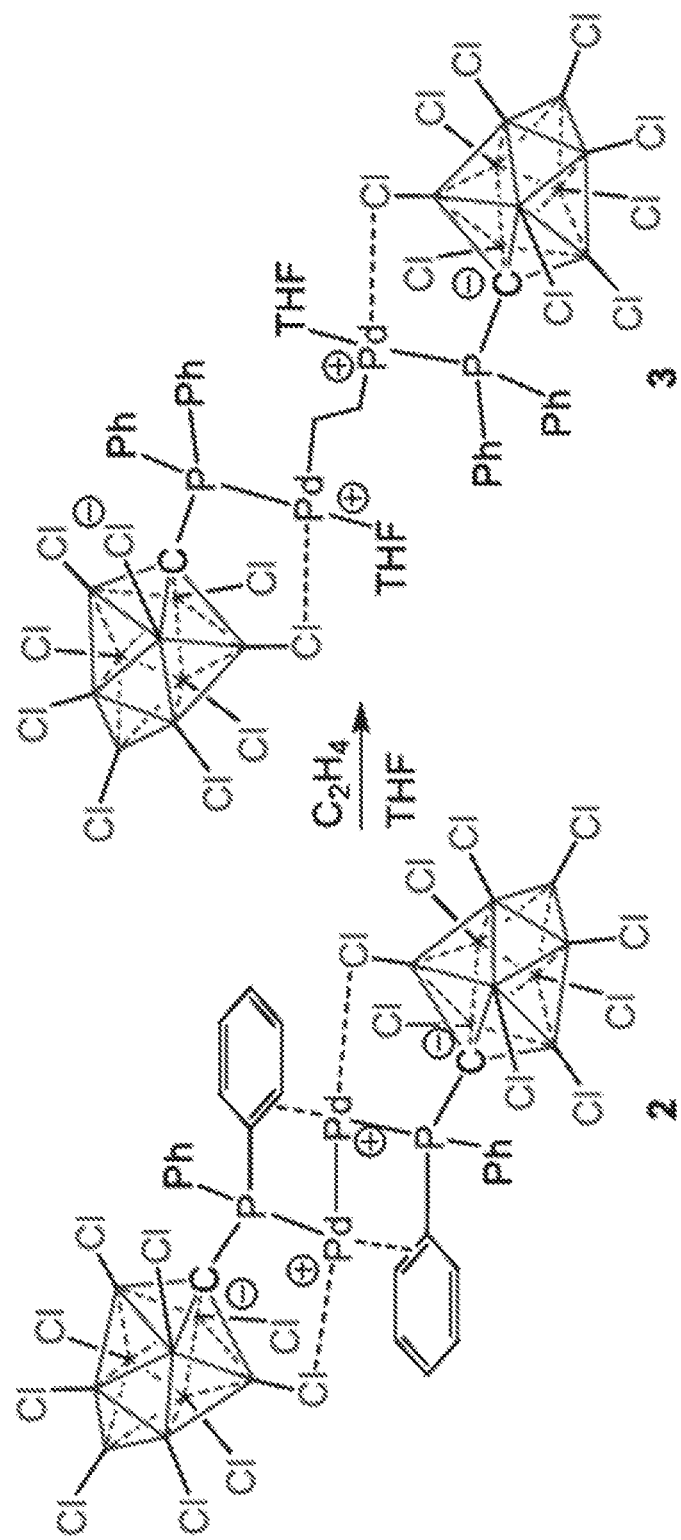
FIG. 33: An illustration showing a scheme for complex 3.
Figure 34:
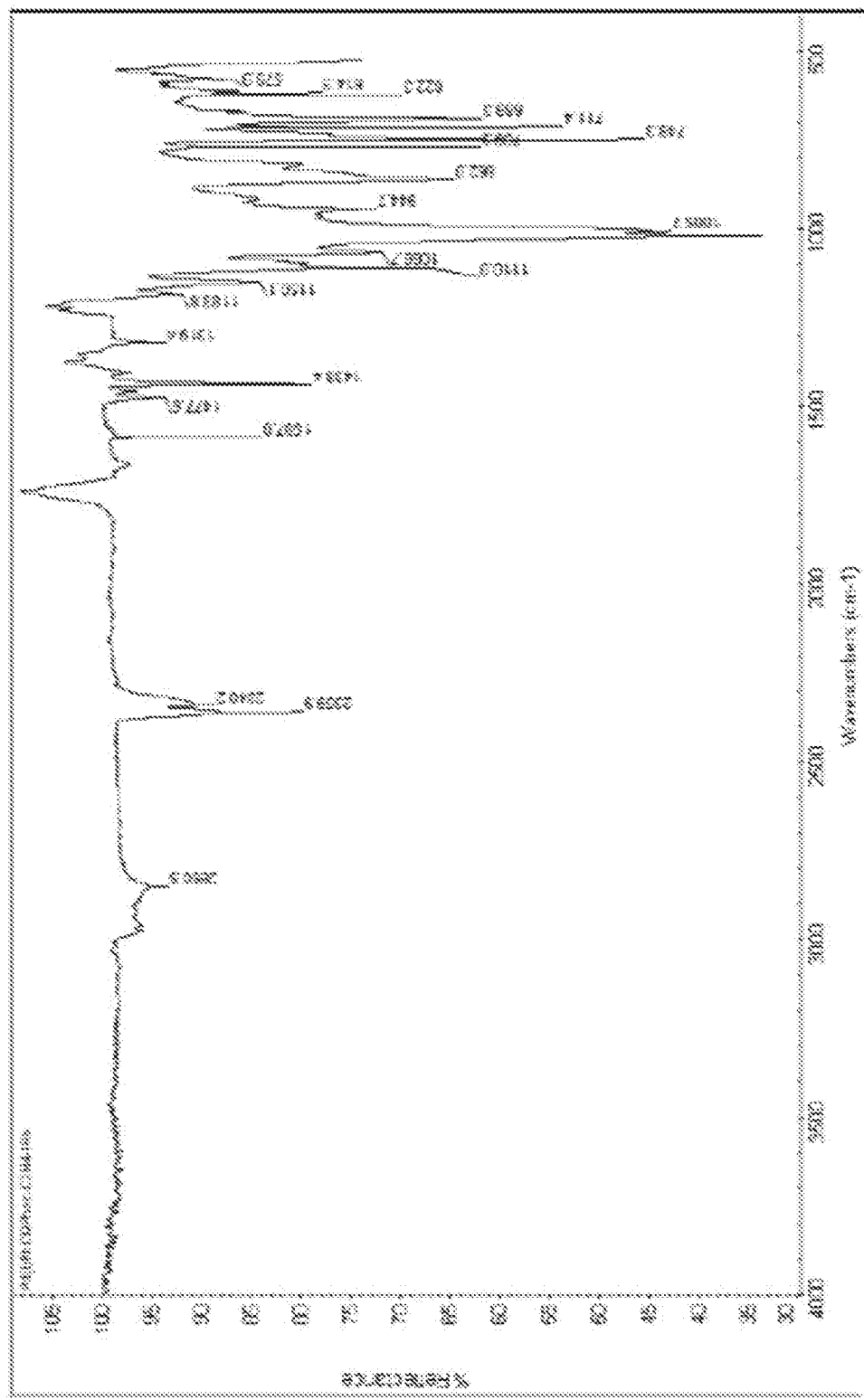
FIG. 34: A graph showing an FTIR spectrum of compound 3.

Synthesis of Complex 3:

Complex 2 (80 mg) was weighted into a glass scintillation vial and THF (10 mL) was added. The THF solution was then placed in a dried 25 mL thick-walled Teflon Schlenk tube. The vial was washed with THF (5 mL) and added to the Schlenk tube. The tube was sealed and then a regimen of free-pump-thaw was carried out with liquid N$_2$. Once at room temperature, the Schlenk tube was then back-filled with ethylene atmosphere and then submerged in liquid N$_2$ to condense roughly 1 cm of liquid ethylene. After sealing the Teflon Schlenk, the reaction was allowed to warm to room temperature with the ethylene slowly diffusing into the rest of the THF solution. After 6 hours, the reaction turned clear with a yellow powder settled at the bottom. With constant positive ethylene pressure, the THF was removed via syringe and then the Schlenk was placed under vacuum to remove residual solvent, giving 3 (64 mg, 72% yield). (FIGS. 33-34).

Reversibility Experiment of 3:

Compound 3 was placed in acetonitrile, where bubbling was immediately observed and the solution turned purple. Once all compound was dissolved and gas evolution ceased, the acetonitrile was removed in vacuo. The solid was dissolved in THF and placed under vacuum. This step was repeated 3 times. The red solid was then dissolved in THF-d$_8$ and complex 2 was observed by multinuclear NMR. $^1$H NMR (300 MHz, THF-d$_8$, 25° C.): δ=8.13, 8.12. 8.11 (td, 4H, $^3$J(H,H)=8.2 Hz), δ=8.01, 8.00, 7.99 (t, 2H, $^3$J(H,H)=7.6 Hz), δ=7.89-7.86 (td, 4H, $^3$J(H,H)=8.0 Hz, $^4$J(H,H)=3.0 Hz); $^{13}$C NMR (101 MHz, THF-d$_8$, 25° C.): δ=137.4, 134.3, 132.3, 117.7; $^{31}$P[$^1$H] NMR (162 MHz, THF-d$_8$, 25° C.): δ=25.0; $^{11}$B[$^1$H] NMR (96 MHz, THF-d$_8$, 25° C.): δ=24.0, −4.2, −7.6.

X-Ray Crystal Data for Compound 2:

Diffraction data were collected on a Bruker-AXS Apex II diffractometer with an Apex II CCD detector using Mo K$_\alpha$ radiation (λ=0.71073 Å) from a fine-focus sealed tube source. Data were collected at 100 K by performing 0.5° ω-scans, integrated using SAINT,[10] and absorption corrected using SADABS.[11] The structure was solved by direct methods using SHELXT[8] and refined against F2 on all data by full-matrix least squares with SHELXL-2018/3[9] following established refinement strategies.[12] All non-hydrogen atoms were refined anisotropically. All hydrogen atoms were included into the model at geometrically calculated positions and refined using a riding model. The isotropic displacement parameters of all hydrogen atoms were fixed to 1.2 times the U value of the atoms they are linked to (1.5 times for methyl groups). Crystal and data quality details, as well as a summary of the residual refinement values, are listed in the accompanying table.

Compound 2 crystallizes in the monoclinic centrosymmetric space group P2$_1$/c with one molecule of 2, two molecules of tetrahydrofuran, and one molecule that was a mixture of pentane and tetrahydrofuran per asymmetric unit. The ratio of pentane:tetrahydrofuran was refined freely and converged at 51:49. The solvent molecules were refined with the help of similarity restraints on 1,2- and 1,3-distances as well as similarity and rigid-bond restraints for anisotropic displacement parameters. The mixture of solvents result in an empirical formula with non-integer numbers of atoms for C, H, and O.

References for Example 4

1. D. C. Behenna, J. T. Mohr, N. H. Sherden, S. C. Marinescu, A. M. Harned, K. Tani, M. Seto, S. Ma, Z. Novák, M. R. Krout, R. M. McFadden, J. L. Roizen, J. A. Enquist, D. E. White, S. R. Levine, K. V. Petrova, A. Iwashita, S. C. Virgil, B. M. Stoltz, Enantioselective Decarboxylative Alkylation Reactions: Catalyst Development, Substrate Scope, and Mechanistic Studies. *Science* 17, 14199-14223 (2011).
2. M. K. Chaudhuri, S. K. Ghosh, Novel synthesis of tris(acetylacetonato)iron(III). *Dalton Trans.* 839-840 (1983).
3. G. Pilloni, A. Toffoletti, G. Bandoli, B. Longato, Homoleptic Complexes of Cobalt(0) and Nickel(0,I) with 1,1'-Bis(diphenylphosphino)ferrocene (dppf): Synthesis and Characterization. *Inorg. Chem.* 45, 10321-10328 (2006).

4. J. F. Kleinsasser; E. D. Reinhart; J. Estrada; Richard F. Jordan; V. Lavallo; *Organometallics.* 2018, 37, 24, 4773-4783.
5. B. L. Nannenga, D. Shi, A. G. W. Leslie, T. Gonen, High-resolution structure determination by continuous-rotation data collection in MicroED. *Nat. Methods.* 11, 927-930 (2014).
6. W. Kabsch, Xds. *Acta Crystallogr. Sect. D Biol. Crystallogr.* 66, 125-132 (2010).
7. W. Kabsch, Integration, scaling, space-group assignment and post-refinement. *Acta Crystallogr. Sect. D Biol. Crystallogr.* 66, 133-144 (2010).
8. G. M. Sheldrick, SHELXT—Integrated space-group and crystal-structure determination. *Acta Crystallogr. Sect. A Found. Crystallogr.* 71, 3-8 (2015).
9. G. M. Sheldrick, Crystal structure refinement with SHELXL. *Acta Crystallogr. Sect. C Struct. Chem.* 71, 3-8 (2015).
10. SAINT, version 8.34A, Bruker (2012), Bruker AXS Inc., Madison, Wisconsin, USA.
11. SADABS, version 2012 January, Bruker (2012), Bruker AXS Inc., Madison, Wisconsin, USA.
12. Müller, P. *Crystallography Reviews* 2009, 15, 57-83.

Example 5

A TEM grid was placed in a vial with approximately 1 mg of progesterone as a dry crystalline powder and gently shaken to adhere the powder to the surface of the grid. The grid was then cooled under liquid nitrogen and placed in a TEM operating at 200 kV. Data was collected on multiple nanocrystals by isolating each crystal and exposing it to a direct electron beam. Reflections were recorded using continuous rotation and the data was converted to .img format for indexing and integration using XDS. Datasets from multiple crystals were merged and scaled using XSCALE to provide a greater range of reflections resulting in a high completeness data set. A solution of the merged data was then achieved using SHELXT and subsequently refined using SHELXL. After sample optimization, full analysis could be completed in less than one hour. A sample process is depicted in FIG. 1 for progesterone.

Example 6

A TEM grid was placed in a vial with approximately 10 mg of dry crystalline powder and was shaken gently to adhere powder to grid surface. Small crystals approximately 1 μm and smaller were exposed to a condensed electron beam and their reflections were collected under continuous rotation. Images were converted and processed using XDS and XSCALE software. Upon processing, two distinctly different unit cells and space groups were obtained. Structure solutions were obtained using SHELXT and exhibited the same carborane-gold complex indicating two different polymorphs of the same structure, as detailed below and depicted in FIG. 35 for space group P1 and in FIG. 36 for space group P2(1)/n.

Space Group=P1 (1)
Unit Cell:
a=9.26
b=9.80
c=14.81
α=92.155
β=94.210
γ=91.377
Space Group=P2(1)/n (14)
Unit Cell:
a=10.51
b=21.22
c=12.30
α=90.000
β=97.960
γ=90.000

Example 7

Approximately 1 mg of biotin, cinchonine, carbamazepine and brucine were placed in a vile to create a mixed powder. A TEM grid was placed in the mixture and gently shaken to adhere the mixture to the grid surface. The grid was then frozen under liquid nitrogen and placed in the TEM for analysis. Using a selected area aperture, individual crystals were isolated and exposed to a condensed electron beam and the reflections were recorded using continuous stage rotation. Each respective data set was indexed and integrated using XDS to confirm the identity of the compound based off of known unit cell parameters. Each individual crystal shot could then be identified as the corresponding molecule for each compound present in the mixture. A sample grid image and the identification of individual nanocrystals on the grid is depicted in FIG. 3.

Example 8

Figure 37:
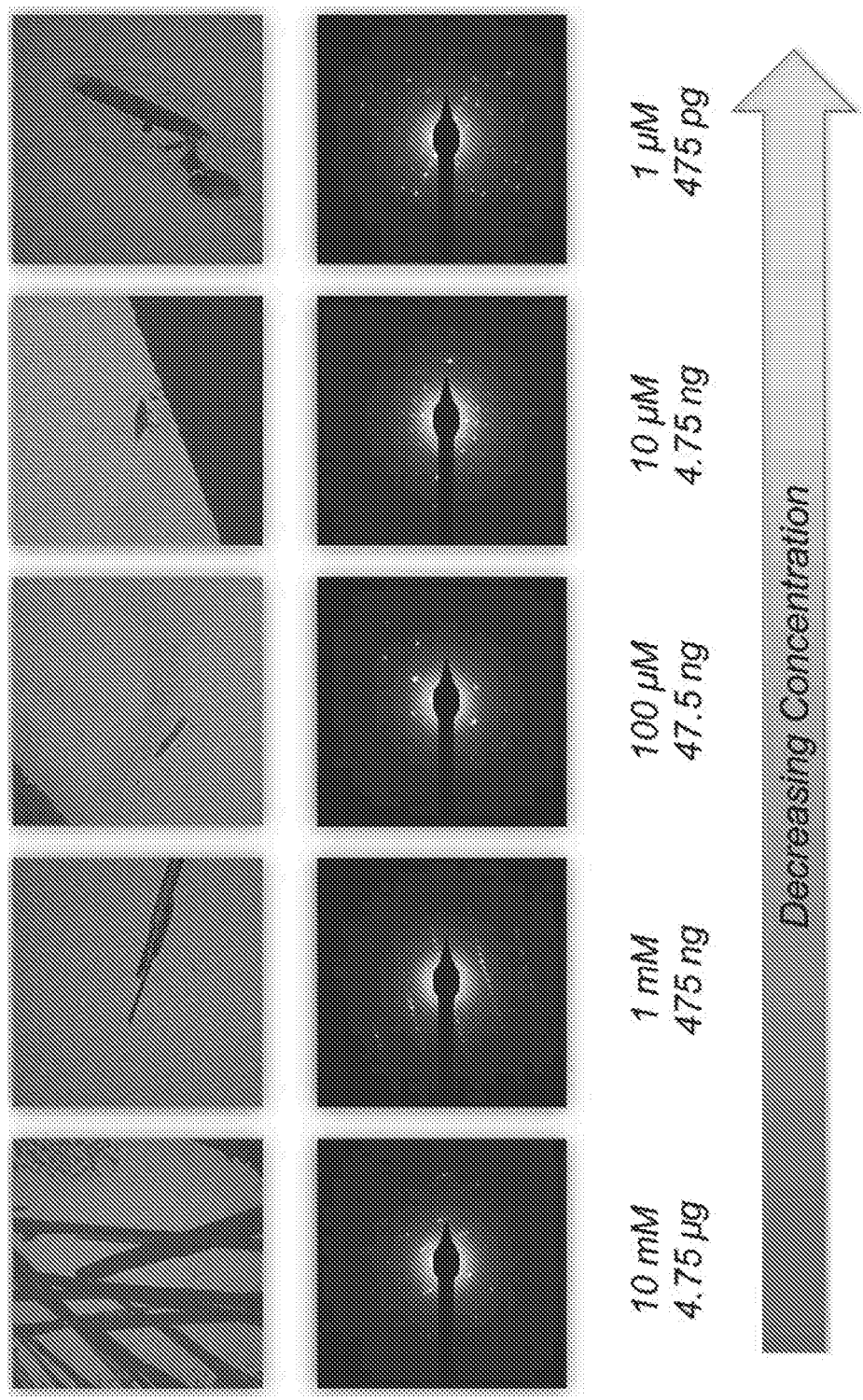
FIG. 37: An illustration depicting sample images from grids and sample electron diffraction patterns that can be collected after subsequent serial dilution of carbamazepine down to picogram scale quantities.

Carbamazepine (118 mg) was dissolved in MeOH (5 mL) to yield a 0.1M stock solution. A 1 μM solution was obtained after five serial dilutions. Using a micropipette, 2 μL of each dilution solution was carefully dispensed onto a TEM grid where the droplet evaporated upon standing. Analysis by microED provided structural information up to our 1 μM solution that equates to picogram quantities of analyte. A sample dilution series is depicted in FIG. 37.

Example 9

Figure 38:
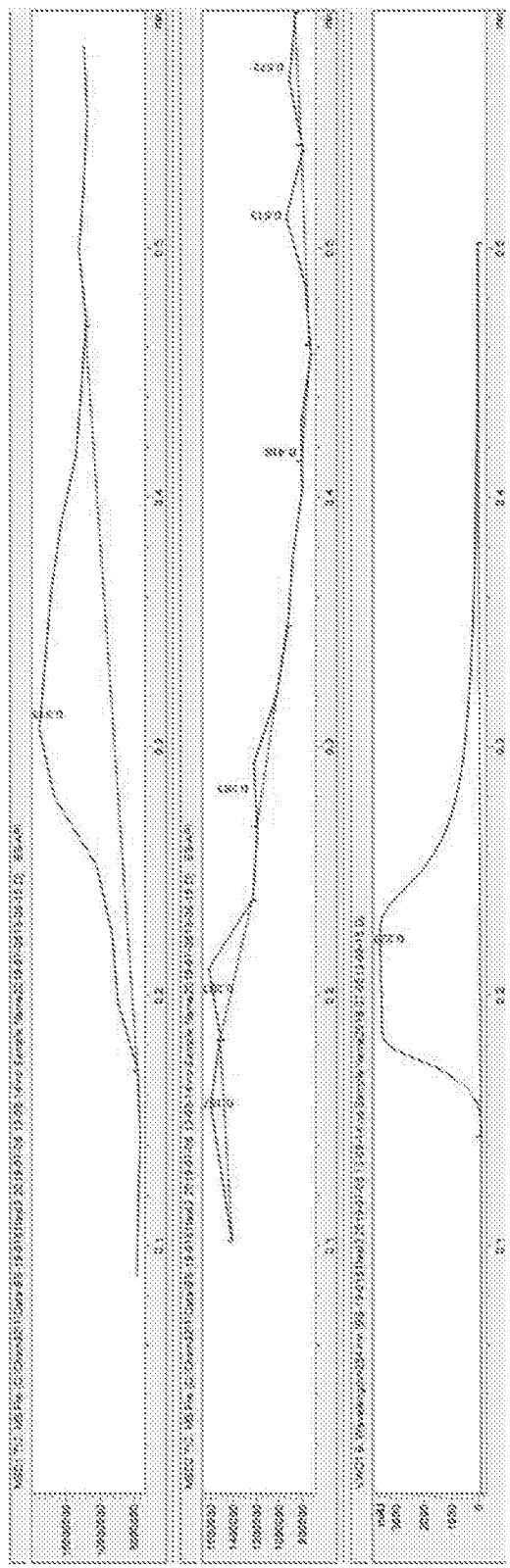
FIG. 38: A graph showing an HPLC direct inject spectrum of carbamazepine in MeCN.
Figure 39:
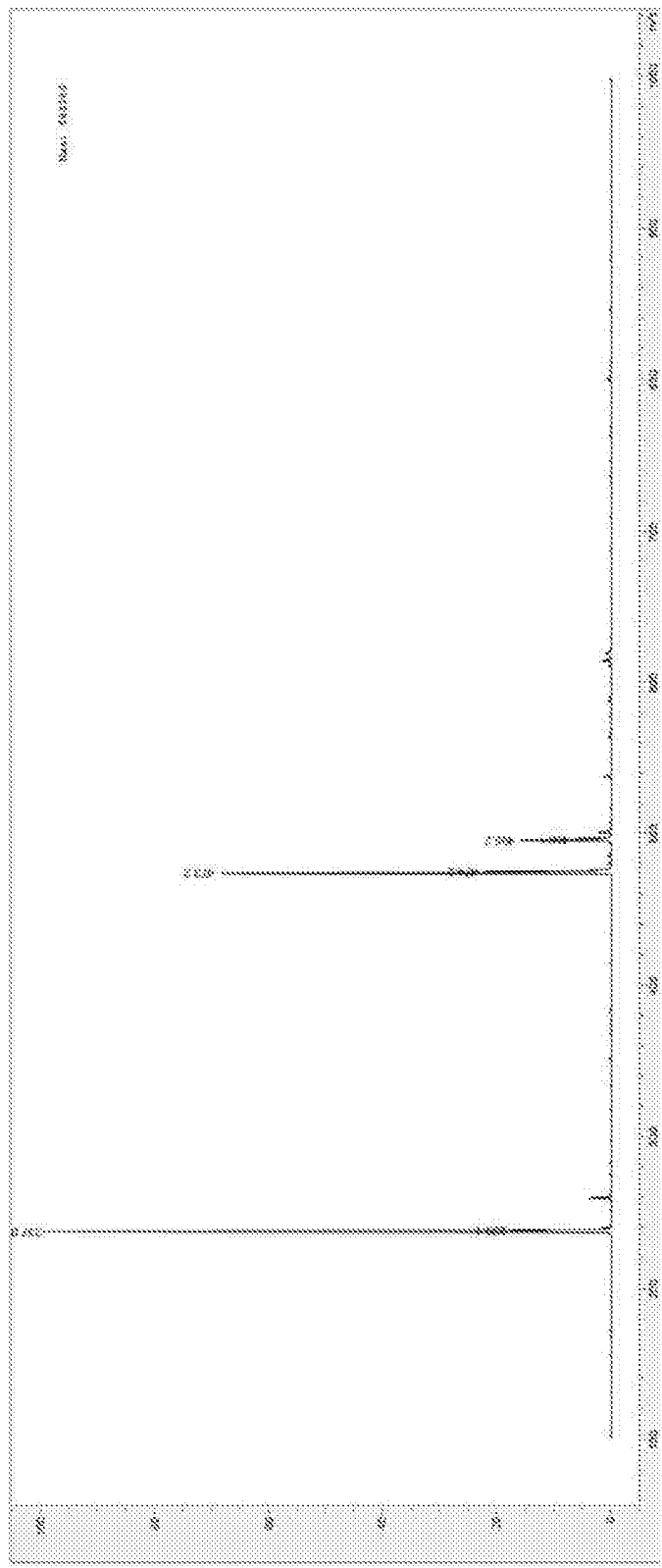
FIG. 39: A graph showing a mass spectrum depicting the desired M+1 mass of carbamazepine.
Figure 41:
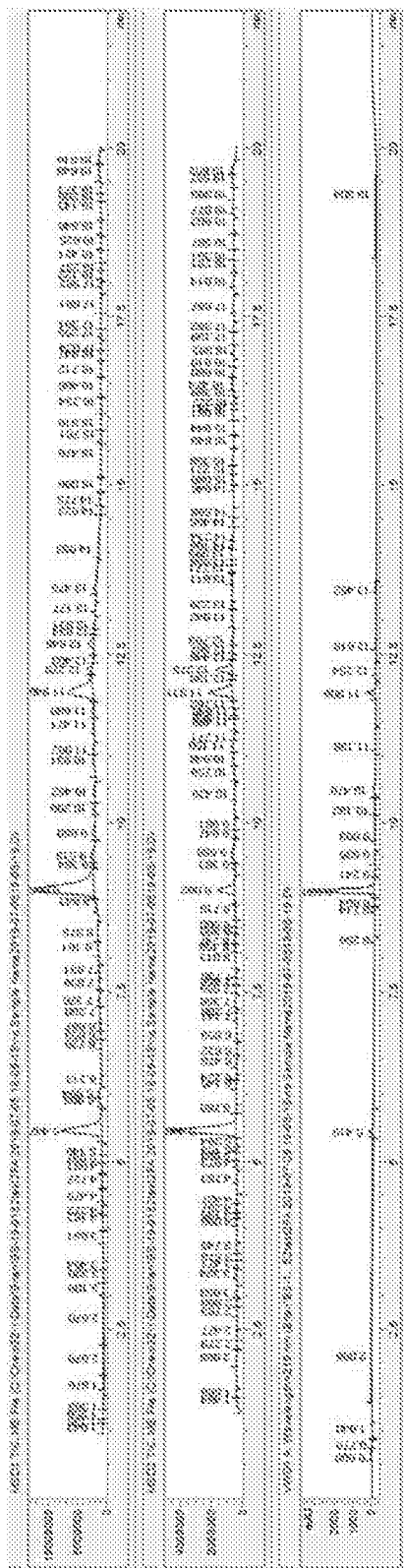
FIG. 41: A graph showing an HPLC spectrum depicting separation of carbamazepine, progesterone, and biotin by MeOH:H$_2$O.

Carbamazepine (4.6 mg) dissolved in 1 mL MeCN to yield a 19 μM solution. This sample was employed in our HPLC-microED process. The samples were injected (5 μL and 10 μL) via direct inject (MeCN mobile phase, 0.5 mL/min or MeOH mobile phase, 0.3 mL/min) and dispensed by a nebulizer placed ~13 cm above TEM grids. The grids were allowed to stand for 1 minute to allow for residual solvent droplets to evaporate. Analysis by microED provided structural information from all grids prepared as described above. Sample HPLC and Mass spectra are provided in FIGS. 38 and 39, respectively, while sample crystals and an observed diffraction pattern is shown in FIG. 40.

Example 10

Carbamazepine (7.1 mg), progesterone (5.5 mg), and biotin (3 mg) were dissolved in 1 mL of MeOH. This sample was employed in our HPLC-microED process. Using a MeOH:$H_2O$ mobile phase mixture (1 mL/min) allowed for separation of all products. Individual peaks could be dispensed onto TEM grids by a nebulizer placed ~13 cm above. The grids were allowed to stand for 1 minute to allow for residual solvent droplets to evaporate. Analysis by microED provided structural information on the individual compounds separated from the initial mixture solution. Sample HPLC spectra for the three compounds is provided in FIG.

Figure 42:
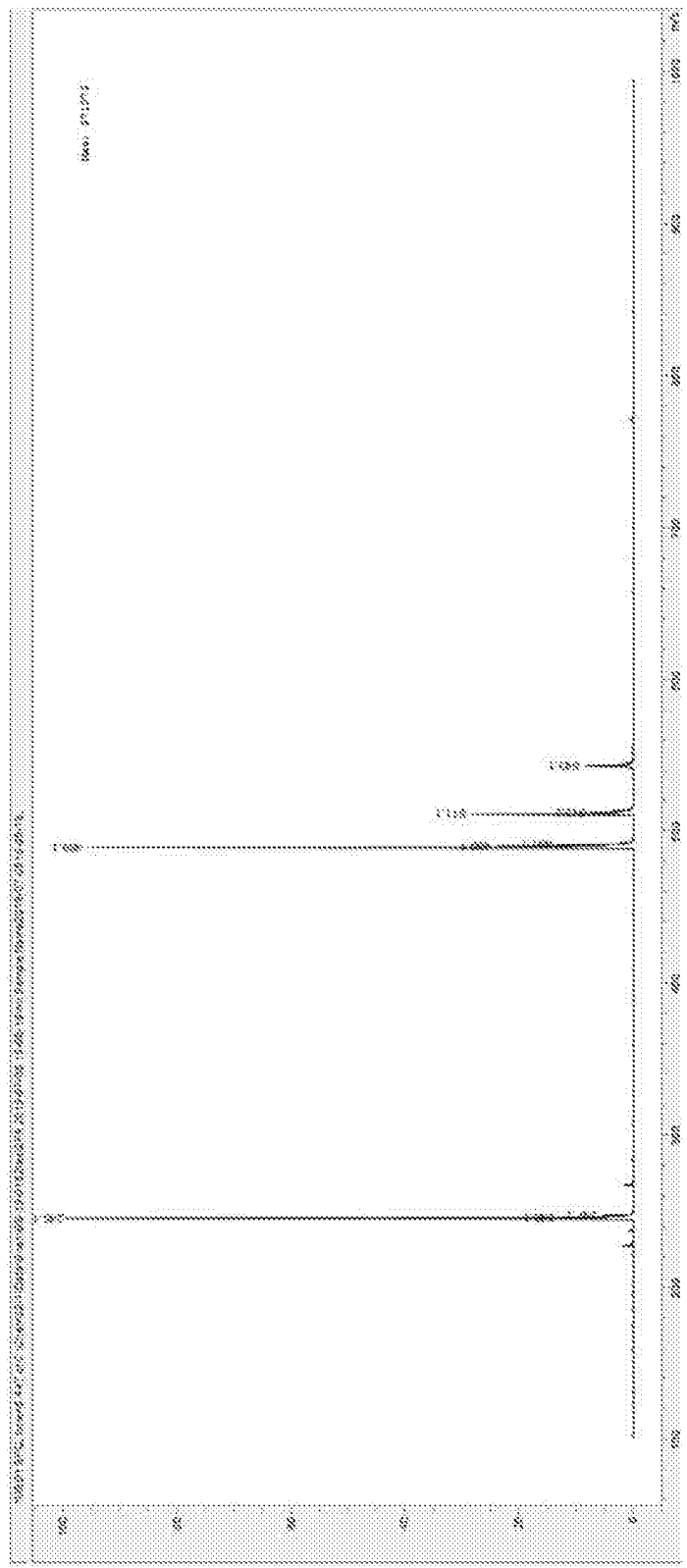
FIG. 42: A graph showing a mass spectrum depicting the desired M+1 mass of biotin at 5.4 min.
Figure 43:
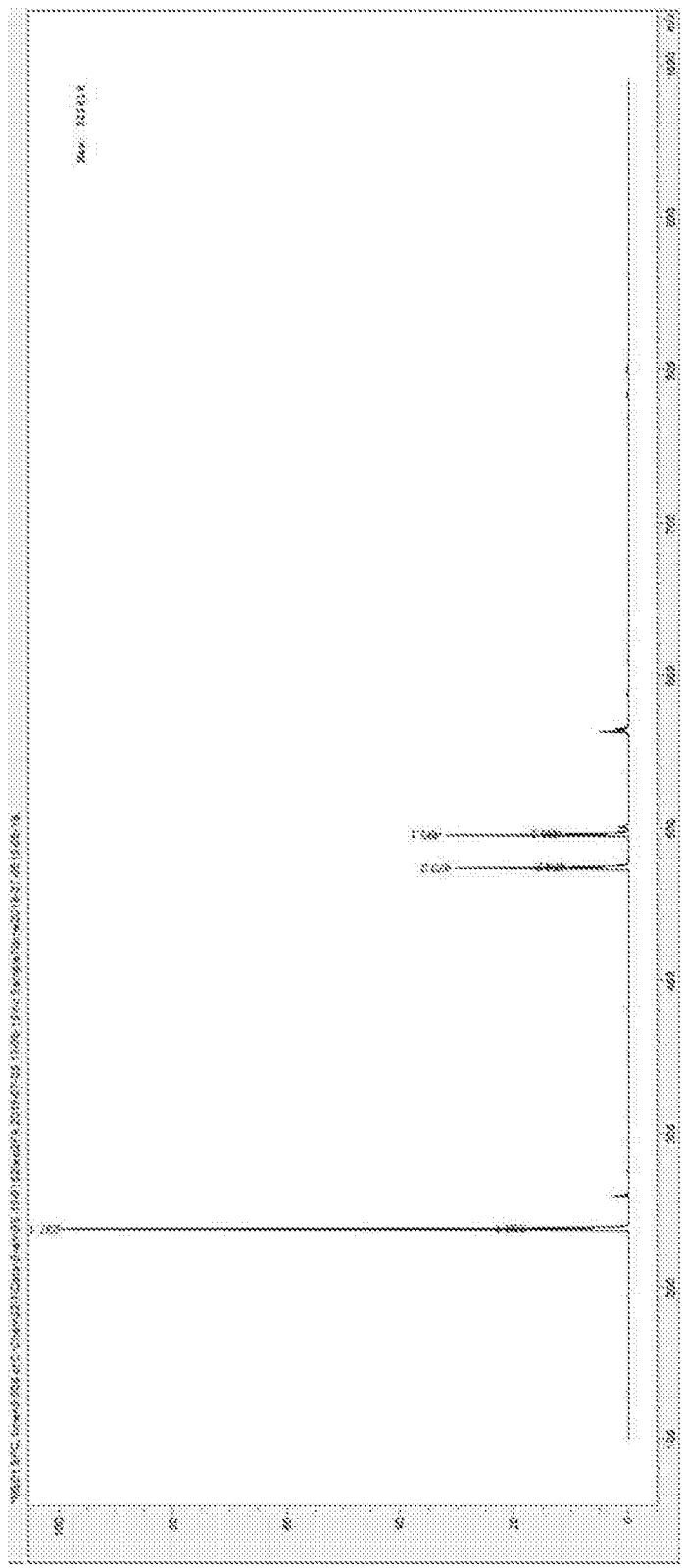
FIG. 43: A graph showing a mass spectrum depicting the desired M+1 mass of carbamazepine at 9 min
Figure 44:
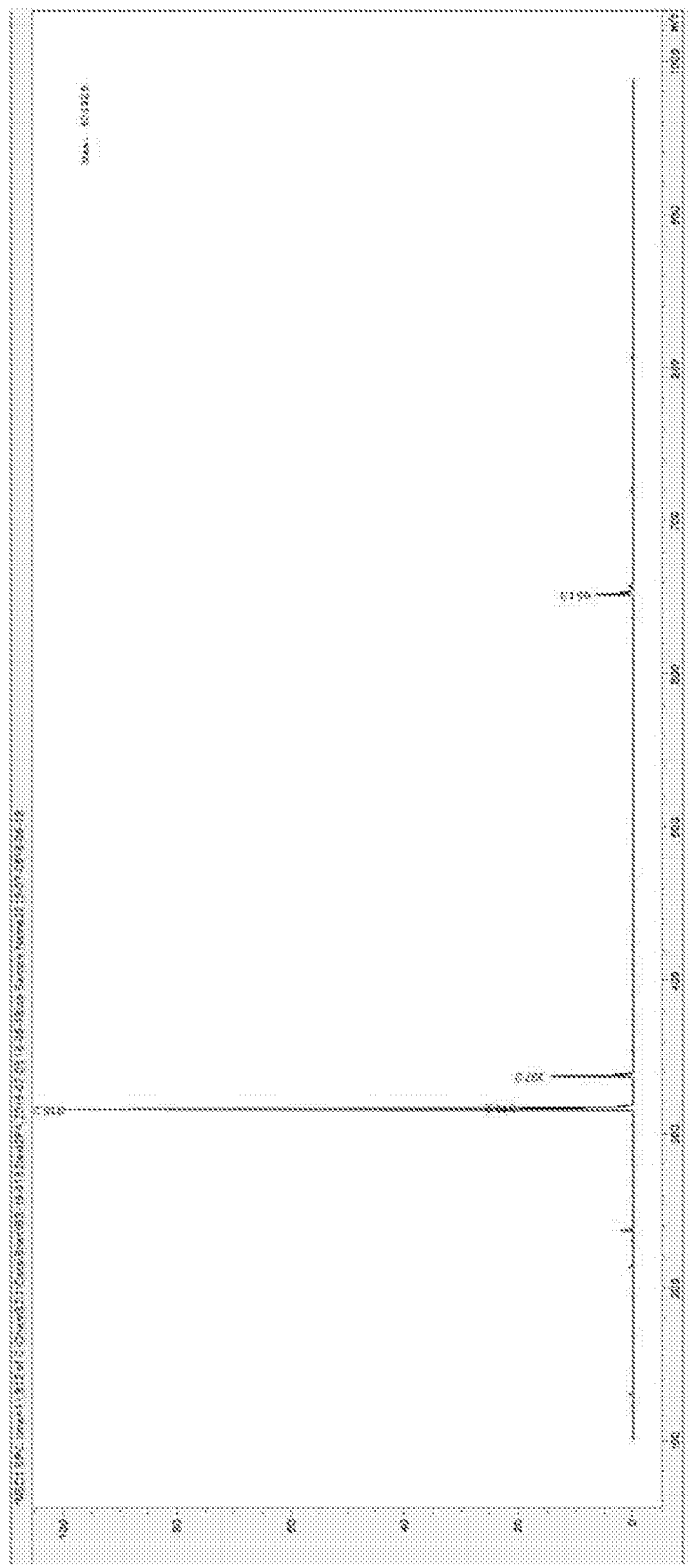
FIG. 44: A graph showing a mass spectrum depicting the desired M+1 mass of progesterone at 11.9 min.

41, while individual mass spectra for the compounds are provided in FIGS. 42, 43, and 44.

Example 11

Freshly collected leaves from *Agonis flexuosa* were ground with a mortar and pestle and then soaked in EtOAc at room temp for 15 minutes. The solution was filtered and concentrated under vacuum. The dry extract was dissolved in water and then mixed with activated carbon. The aqueous solution was filtered through celite. To the crude celite/carbon mixture, hot acetone was added and collected separately. The acetone solution was concentrated under vacuum to provide a light yellow residue. Crystallization was achieved through slow evaporation of a MeOH/Et$_2$O solution. Crystallized product from the unknown isolate was placed on a TEM grid for analysis. MicroED analysis confirmed the presence of two distinct unit cells corresponding to two separate unknown analytes crystallized from the extraction.

Example 12

Ginkgo biloba supplements were extracted by stirring in ethanol for 15 minutes. Resulting mixture was filtered and concentrated to yield a light yellow solid. The crude was dissolved in MeCN:H$_2$O (1:1, 2 mL) and passed through a micron filter (0.22 μm). This sample was employed in our HPLC-microED process. 1 μL was injected (5%-95% MeCN in H$_2$O gradient over 10 minutes) and analyte composition identified through UV/Vis and MS signals.

Example 13: Natural Product Structural Determination Using Microcrystal Electron Diffraction More than 60% of pharmaceuticals are related to natural products (NPs), chemicals produced by living organisms.[1] Hence, new methods that accelerate natural product discovery are poised to profoundly impact human health. Of the many challenges that remain in natural product discovery, none are as pervasive as structural elucidation, as determination of the molecular structure of a newly discovered natural product can take months, years, or in some cases be altogether unachievable. This challenge can be fueled by lack of sufficient material for spectroscopic analysis, or difficulties in sourcing the producing organism.[2] Even in cases where the analyte is abundant, its physical properties, including molecular topology, can prevent unambiguous structural determination.[3,4] Here we report the use of microcrystal electron diffraction (MicroED),[5] an emerging cryogenic electron microscopy (CryoEM) technique, in combination with genome mining,[6] to address these challenges. As proof-of-principle, we apply these techniques to fischerin (1), an orphan NP isolated more than 30 years ago, with potent cytotoxicity but ambiguous structural assignment.[7] We utilize genome mining methods to reconstruct its biosynthetic pathway and highlight the sensitivity of MicroED through the precise determination of the solid-state structure of 1 from sub-micron-sized crystals. This structural solution serves as a powerful demonstration of the synergy of MicroED and synthetic biology in NP discovery, technologies that when taken together will ultimately accelerate the rate at which new drugs are discovered.

Natural products (NPs) remain a treasure trove for the development of bioactive molecules. NPs in isolated form and derivatives arising from chemical modification form the basis set for new therapeutics and agrochemicals.[1] This role is becoming ever more important as resistance to existing therapeutic compounds is rapidly increasing as pathogenic organisms evolve in response to treatment.[8] Ideally, the fast evolution of pathogenic organisms would be met by an equally rapid rate of NP discovery, however, for structurally novel natural products, the rate of discovery is decreasing, and is currently lagging behind the emergence of resistance.[9,10] The recent explosion of sequenced microbial genomes has fueled a renaissance in NP discovery, where synthetic biology can be leveraged to produce novel metabolites or to rediscover compounds previously isolated, but no longer available for study.[11] While these cutting-edge methods in synthetic biology have advanced discovery efforts dramatically, the structural elucidation of the NPs remains a limiting step in NP discovery campaigns.

Such difficulties in structural elucidation can arise from i) the lack of sufficient quantities of material for traditional analytical methods (e.g. nuclear magnetic resonance (NMR) spectroscopy and X-ray crystallography); ii) intrinsic physical properties of the NP, such as poor solubility and stability in NMR solvents, etc.; and iii) limitations of NMR capabilities in determining relative stereochemistry, which is accentuated by analytes with distal stereocenters, especially when interrupted by rigid substructures bearing multiple rotatable bonds.[12] X-ray crystallography remains the gold-standard for unambiguous structural determination, including the assignment of stereochemistry. However, X-ray crystallographic analysis of newly-isolated natural products is often thwarted by insufficient quantities to provide crystals large enough for diffraction studies (~0.1 mm$^3$), or poor solid-state properties that preclude the formation of large crystals when sufficient material is available. Given these challenges, we envisioned that application of the recently reported CryoEM modality MicroED[5] could lead to vertical advances in the field of natural product discovery, as MicroED has been demonstrated to provide unambiguous structures from sub-micron-sized crystals of chemical compounds that had failed to yield large crystals suitable for X-ray analysis.[13,14]

Figure 45A:
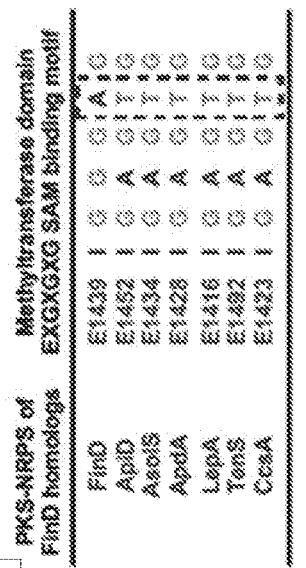
FIG. 45A to FIG. 45D. Rediscovery of fischerin. 45A, Proposed structure of fischerin (1) and related N-hydroxyapiosporamide (2). 45B, Alignment of MT domains in PKS-NRPS to identify possible fischerin PKS-NRPS. 45C, Proposed biosynthetic gene cluster of fischerin (1). 45D, Heterologous expression of the fin cluster leads to formation and isolation of 1.

As an entry into the area, we became interested in α-pyridone containing fungal metabolites. These compounds, including fischerin (1, FIG. 45A), bassianin,[15] tenellin,[16] ilicicolin H,[17] and apiosporimide (3, R=H),[18] are particularly appealing, not only because of their diverse biological activities, but because of the reported difficulties in assigning their relative stereochemistry. In fact, the relative stereochemistry of apiosporamide, tentatively assigned by the isolation chemists nearly 30 years ago, was only unambiguously assigned after a lengthy total synthesis campaign by Williams and coworkers.[19] The problem in correctly assigning the relative stereochemistry of members of this NP family is molecular topology. Here, distal, stereochemically complex ring systems are linked through freely rotating bonds to a rigid, flat α-pyridone moiety (e.g. 1, FIG. 45A). Thus, while the relative stereochemistry of the trans-decalin system of apiosporimide (2a) was apparent from 2-dimensional NMR studies, that information could not be correlated to the distal epoxydiol system.

We targeted fischerin (1) for our initial efforts in structural elucidation. First isolated more than 25 years ago from *Neosartoiya fischeri*, early studies of fischerin showed that it causes acute peritonitis in mice and has potent cytotoxicity.[7] While the connectivity of fischerin (1) has been confirmed to be a 2-pyridone bridging a decalin and a multiply-oxygenated cyclohexane, the relative stereochemistry between the two functional groups as well as the configuration of the epoxydiol unit has thus far eluded unambiguous assignment. Moreover, unlike apiosporamide (2a) and other members of the family, fischerin (1) was hypothesized to possess a rare cis-decalin moiety by the isolation chemists. While the relative stereochemistry of the this unusual decalin was initially proposed based on NMR analysis of the isolate, the proposed relative stereochemistry of the epoxydiol is based on computational methods.[20] As an additional obstacle, no other isolation of fischerin (1) had been reported, precluding further structural or biological studies of this orphan compound.

Figure 45B:
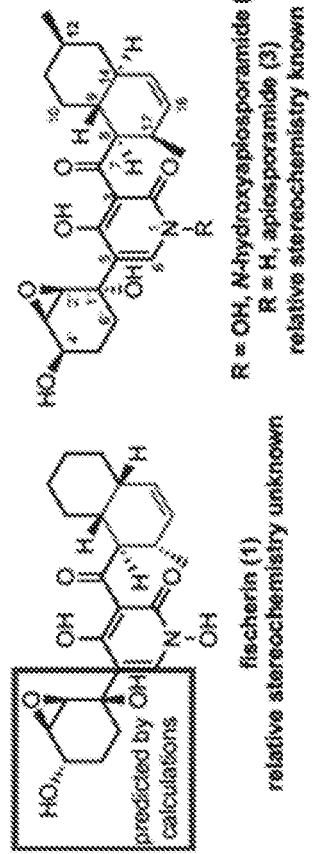
Figure 45C:
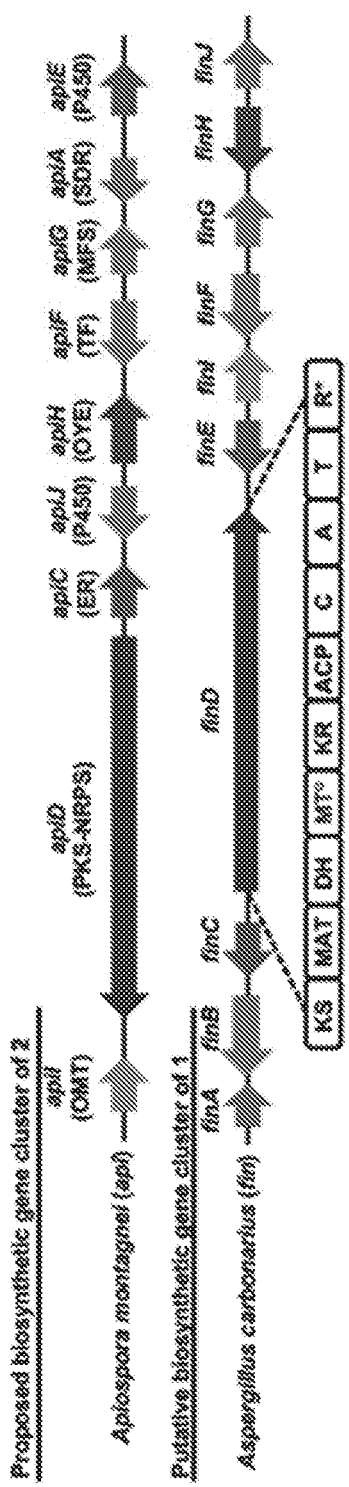

To reconstruct the biosynthesis of fischerin (1) without access to the reported strain, we used a genome mining approach to find a possible biosynthetic gene cluster (BGC) from a sequenced fungi genome database. We reasoned the fin BGC may be present in fungi other than the original producer, albeit silent and not producing fischerin (1) under culturing conditions. We hypothesized the BGC should resemble that of the related compound N-hydroxyapiosporamide (2, R=OH) (FIG. 45A), which is a trans-decalin NP with C12 methyl substitution. The BGC of N-hydroxyapiosporamide (2, R=OH) consists of a polyketide synthase-nonribosomal peptide synthetase (PKS-NRPS) pathway.[21] The lack of the C12 methyl substituent in fischerin (1) suggests that the methyltransferase (MT) domain in the corresponding PKS-NRPS should be inactive and may contain a mutated active site. To identify such a PKS-NRPS, we first categorized fungal BGCs that are homologous to api and encode the same set of accessory enzymes, such as enoylreductase (ER), P450s, ene-reductase (OYE), etc (FIG. 45A to FIG. 45D and FIG. 46). Sequence scanning of the PKS-NRPS MT domain was then performed on the candidate BGCs, especially at the conserved MT active site GXGTG motif that binds S-adenosyl-methionine (SAM).[22] Gratifyingly, we were able to identify one such PKS-NRPS, from a cluster in *Aspergillus carbonarius* (renamed fin), to contain a MT domain with a mutated and presumably inactivating GXGAG motif (FIG. 45B). This PKS-NRPS is therefore expected to be devoid of MT activity (the MT domain is designated as MT°) and could be involved in biosynthesis of 1.

Figure 45D:
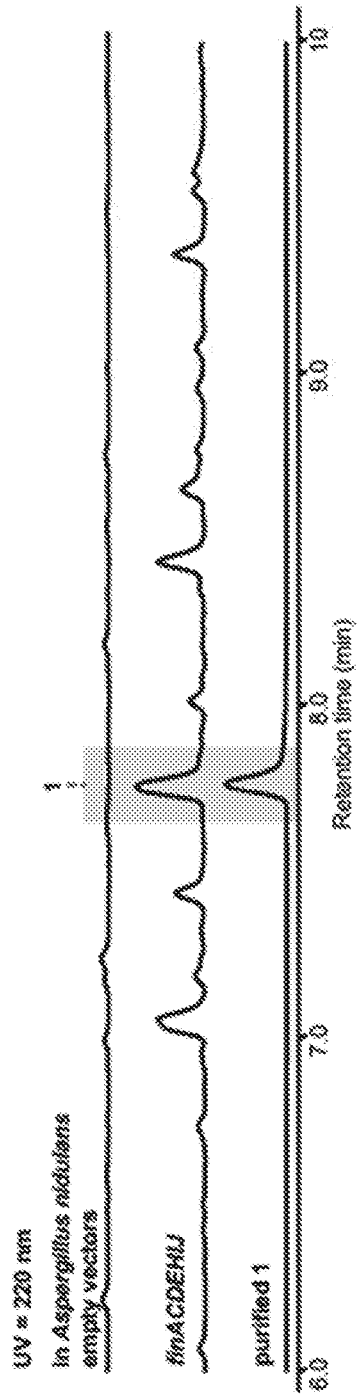
Figure 46:
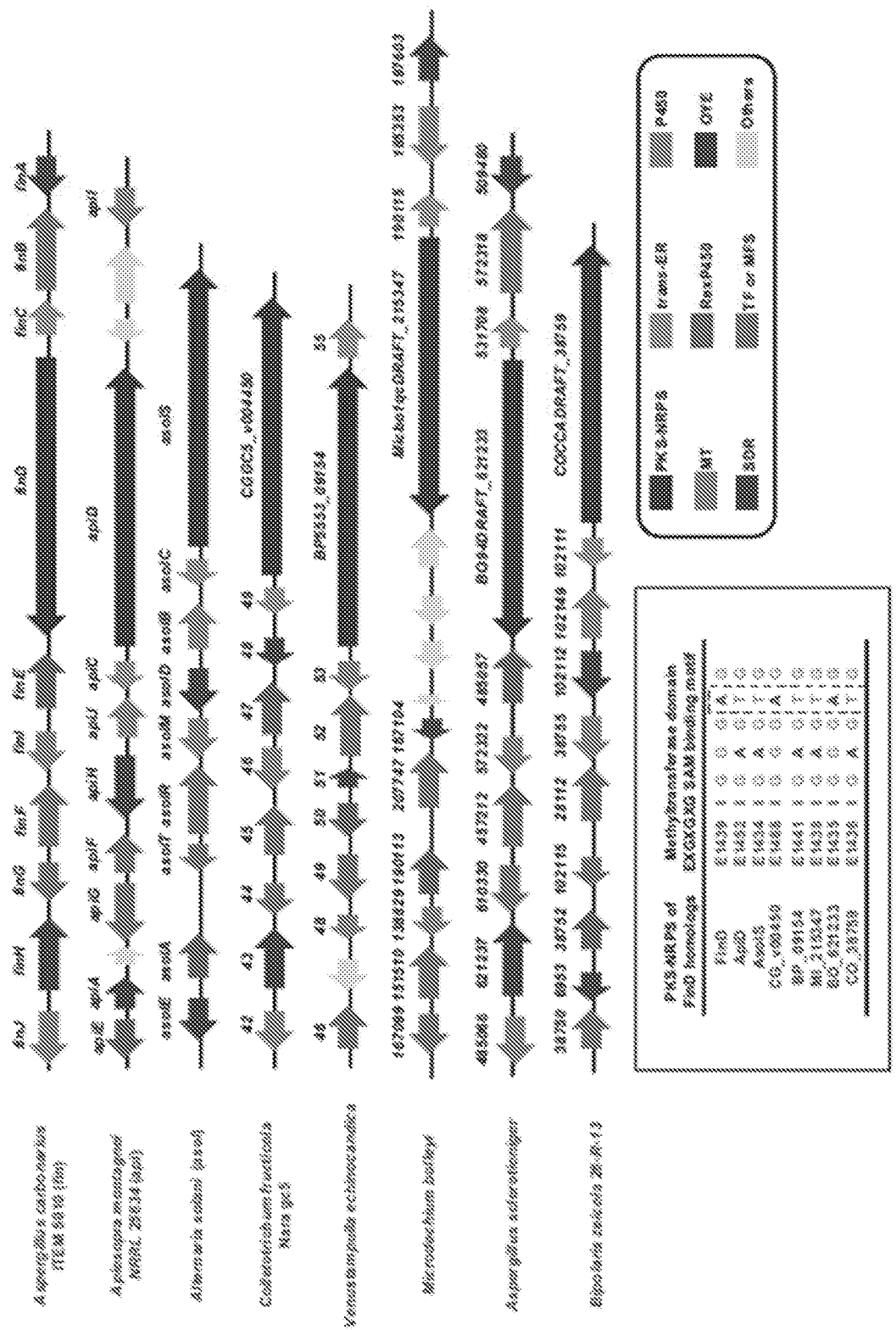
FIG. 46. Biosynthetic gene clusters that are homologous to those of fischerin (1) and N-hydroxyapiosporamide (2); and multiple sequence alignment of SAM-binding motif of cis-MT domain in PKS-NRPSs. Shown here are the putative biosynthetic gene clusters of 1 and 2 and their homologous biosynthetic gene clusters found in NCBI database. SAM binding motif is shown in an alignment with those from FinD and ApiD homologs. Previous study reported that active cis-MT domains contain conserved EXGXGTG sequence as a SAM binding motif.[22] Based on this, we hypothesized that the cis-MT domains in PKS-NRPSs which do not have this conserved this motif are inactive, and the biosynthetic gene clusters which contain the PKS-NRPSs could be responsible for formation of 1. For example, the cis-MT domains from FinD (*Aspergillus carbonarius*), CG_v00450 (*Colletotrichum fructicola* Nara gc5), and BO_621233 (*Aspergillus sclerotioniger*) do not contain this conserved EXGXGTG motif as the threonine residues are mutated to alanines.
Figure 47:
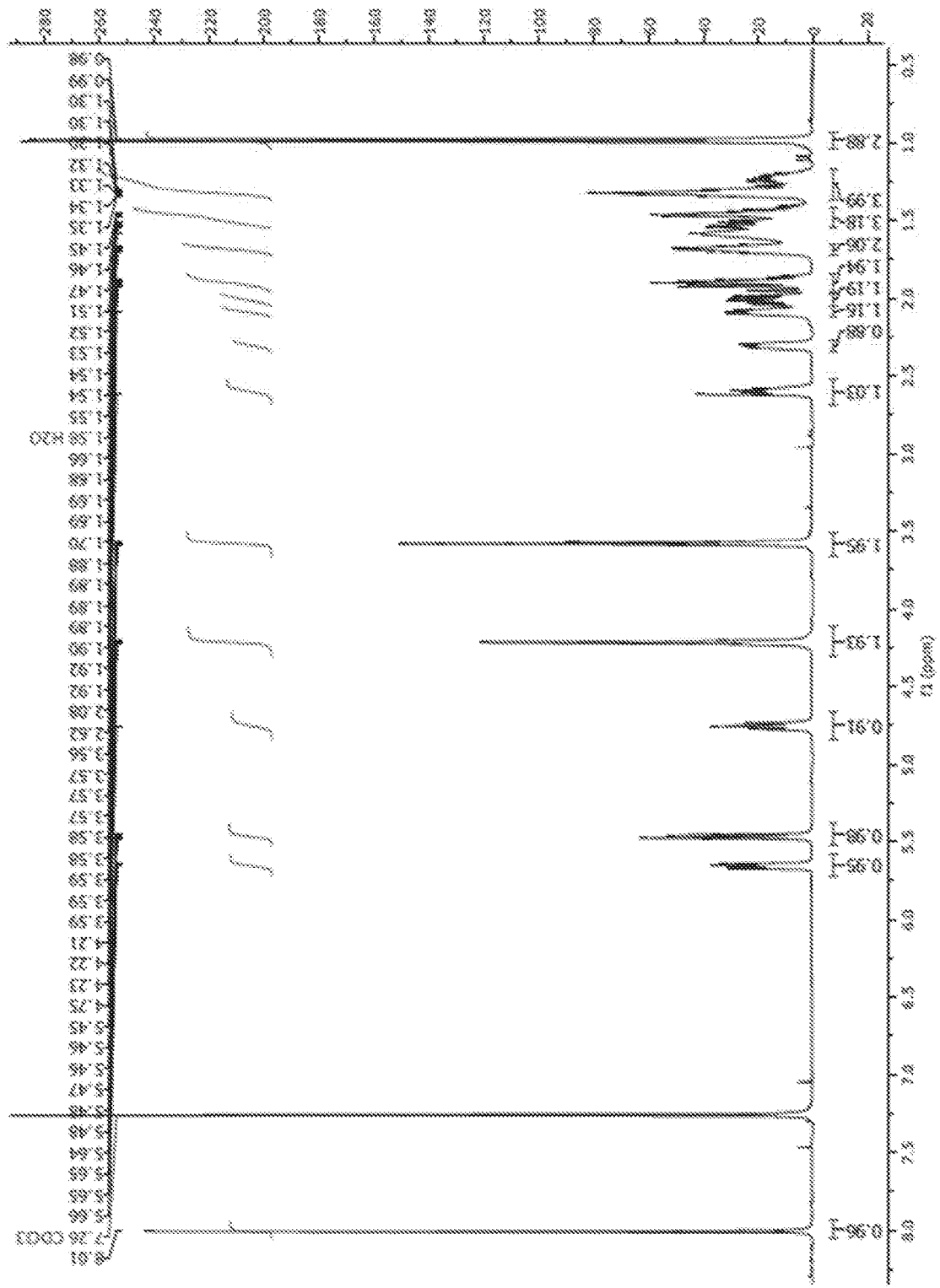
FIG. 47. $^1$H NMR spectra of 1 in CDCl$_3$, 500 MHz.
Figure 48:
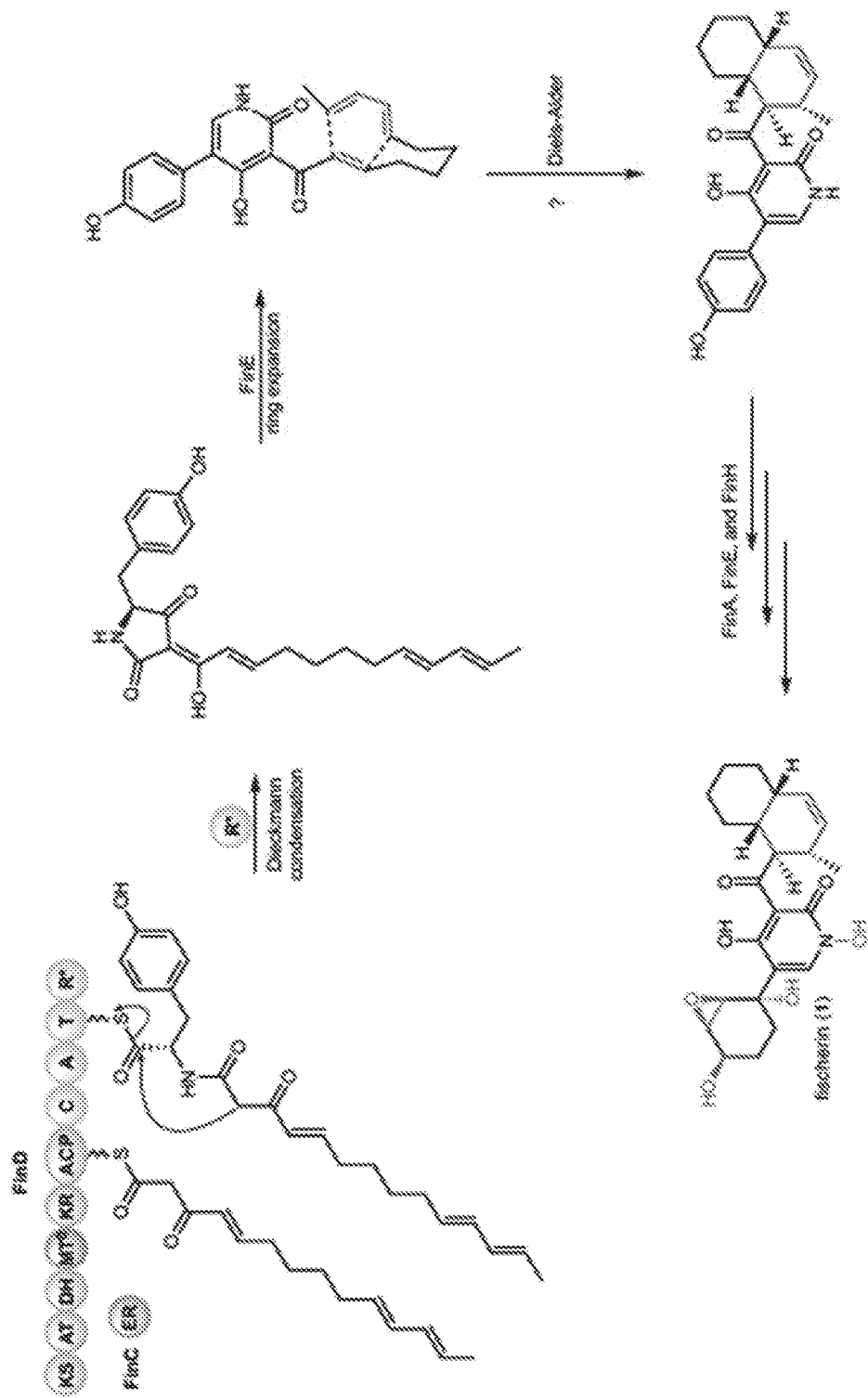
FIG. 48. Proposed biosynthetic pathway of 1. Based on the reported proposed biosynthetic pathway of other 2-pyridone alkaloids such as leporins and ilicicolin H, we proposed the biosynthetic pathway of 1. FinD (PKS-NRPS) and the partnering FinC (ER) form the tetramic acid intermediate. A P450 FinE catalyzes the oxidative ring-expansion reaction of the tetramic acid to the 2-pyridone compound. Then, a Diels-Alderase likely catalyze the Diels-Alder reaction to form the energetically disfavored cis-decalin ring, since the previous study (ref 7) showed that nonenzymatic Diels-Alder reaction of the analog of 2-pyridone compound in water only led to formation of the trans-decalin compound. Further redox modification by FinA, FinE, and FinH forms 1.

The fin BGC was then completely refactored and expressed in the heterologous host *A. nidulans* A1145 ΔEMΔST[23] for metabolite production. As shown in FIG. 45D, compared to the control strain transformed with vectors only, the coexpression of finACDEHIJ produced a new metabolite with the same expected m/z=431 as fischerin (1) with a titer of 5 mg/L. The culture was scaled up to allow purification of the sample with multiple chromatographic steps. The purified compound was judged to be >98% pure by both LC-MS (FIG. 45D) and NMR analyses (FIG. 47 and see Supplementary Information). Comparison of NMR peaks to those of the published data in the same solvent showed complete match of both proton and carbon signals. The purified sample also showed the same negative optical rotation with fischerin ($[\alpha]^{20}_D$–28° (c=0.10, CHCl$_3$)). Therefore, we are confident that we have correctly identified the fin cluster and rediscovered fischerin (1) (FIG. 48).

Analagous to the initial isolation study, our attempts to unambiguously establish the relative stereochemistry of fischerin (1) using 2D NMR or X-ray crystallography were unsuccessful.[7] We then turned to electron crystallography. While crystallization from various solvents did not yield large single crystals, electron micrographs of pale-yellow particles precipitated from a mixture of acetonitrile and water revealed microcrystals with a distinct morphology. These thin triangular plates were (~0.5-3 μm longest dimension) prone to stacking, thereby hindering the growth of larger crystalline domains and leading to complex intractable diffraction patterns in initial diffraction studies (FIG. 49A). Even in cases where we could isolate uniform crystalline domains in selected area diffraction mode, the resolution and completeness of the acquired data were too poor for ab initio structural determination (60% complete and 1.3-1.5 Å). Attempts to merge multiple data sets did not lead to an increase in completeness or resolution, as crystal morphology biased uniform positioning on the grid. In MicroED studies, where stage rotation is limited, this situation can prevent structural solution.[24] To address this challenge, we looked towards optimizing sample preparation. Re-evaluation of hundreds of crystallization trials revealed that slow evaporation from a mixture of tetrahydrofuran and water allowed for the formation of higher quality microcrystals, less prone to aggregation, but still possessing a similarly flat morphology. After exploration of various vitrification conditions,[25,26] we ultimately found that a thicker layer of vitreous ice promoted trapping of microcrystals in different orientations,[27] increasing the completeness of the acquired data sets.

Figure 50:
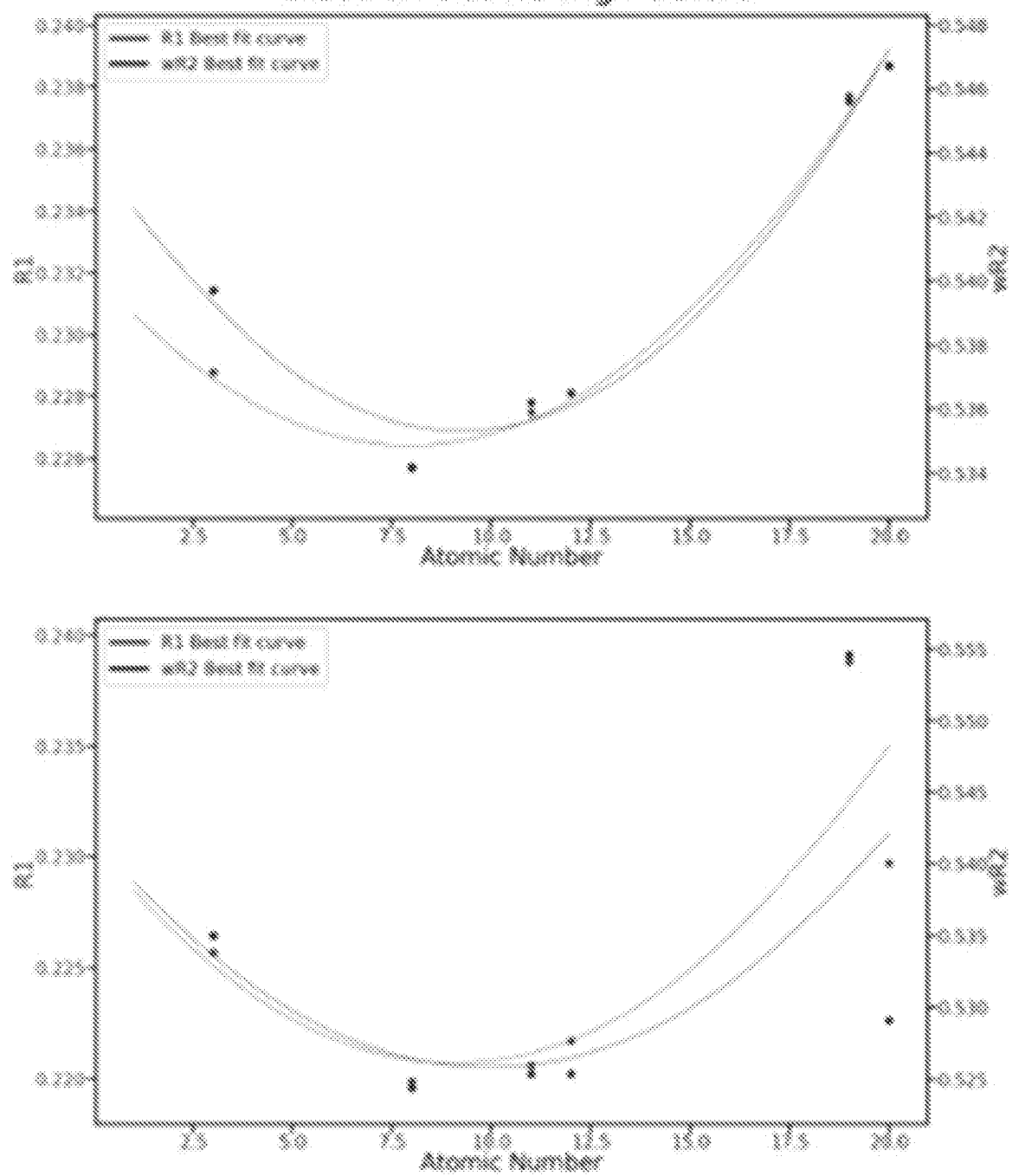
FIG. 50. Atom substitution test for fischerin with (top) and without (bottom) electron scattering factors.

Of over 200 movies collected, four were merged to provide a 1.05 Å ab initio solution ($R_1$=13.8%, refined anisotropically) (FIG. 49B and Data Table 1). The asymmetric unit revealed six unique fischerin (1) residues, each with varying degrees of rotation about the carbon-carbon bond connecting the epoxydiol ring system to the pyridone moiety (C1'-C5, FIG. 49C). The lack of symmetry and the large size of the unit cell further explain the difficulties in obtaining high quality data and assigning relative stereochemistry with NOE studies (FIG. 49B).[7] Interestingly, the fischerin (1) molecules are arranged into a trimer around a common central atom (O1 and O2, FIG. 49B). The identity of the central atom of this trimer was not apparent from initial refinement approach described by Kato and coworkers to attempt to assign this atom.[28] Minimization of $R_1$ and $wR_2$ values when screening various atomic numbers (with appropriate electron scattering factors) against an electron potential map generated from the initial SHELXD output allowed for convergence of residual values for an oxygen atom, suggesting that these central atoms are disordered water molecules (FIG. 50).

From the refined crystal structure, we were able to unambiguously assign the relative stereochemistry of the substituents on the highly-oxygenated cyclohexyl ring, bearing trans hydroxyl groups with the epoxy moiety trans to the tertiary C1'-OH group (e.g. 1, FIG. 49C). We were also able to validate for the first time the predicted stereochemistry of the rare cis-decalin system (FIG. 49C). Importantly, the relative stereochemistry of these two stereochemically complex functionalities was apparent in initial structural solutions. It is also worthy to note that the stereochemistry determined in our MicroED study differs from that of Amini's calculated structure based on reported NMR chemical shifts,[20] demonstrating the challenges of using NMR shift calculations to predict stereochemistry on fluxional groups and also highlighting the importance of experimental validation of computed structures. This is the first solid-state structure of the orphan NP fischerin (1) and, to the best of our knowledge, the first published example of a structurally-complex, non-peptidyl NP elucidated via MicroED, demonstrating this technique's potential in NP science and its synergy with other methods such as NMR.

Figure 51:
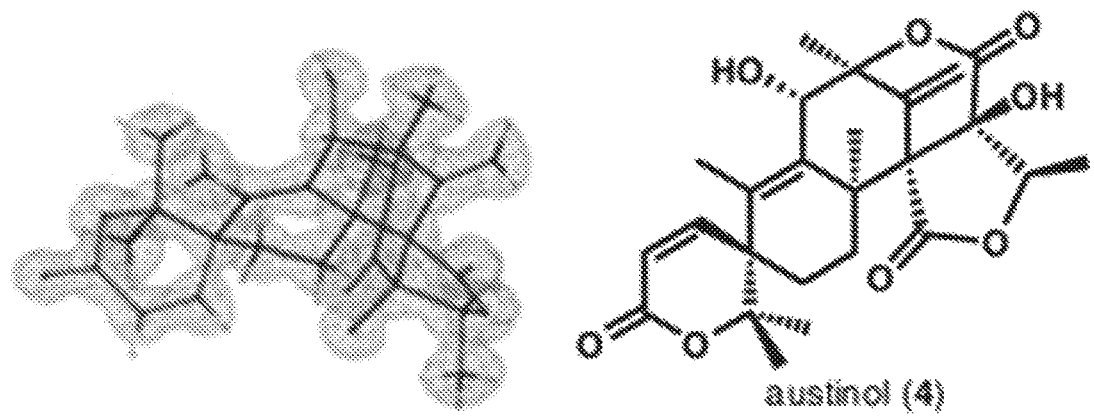
FIG. 51. Structural determination of minor impurity austinol.
Figure 52:
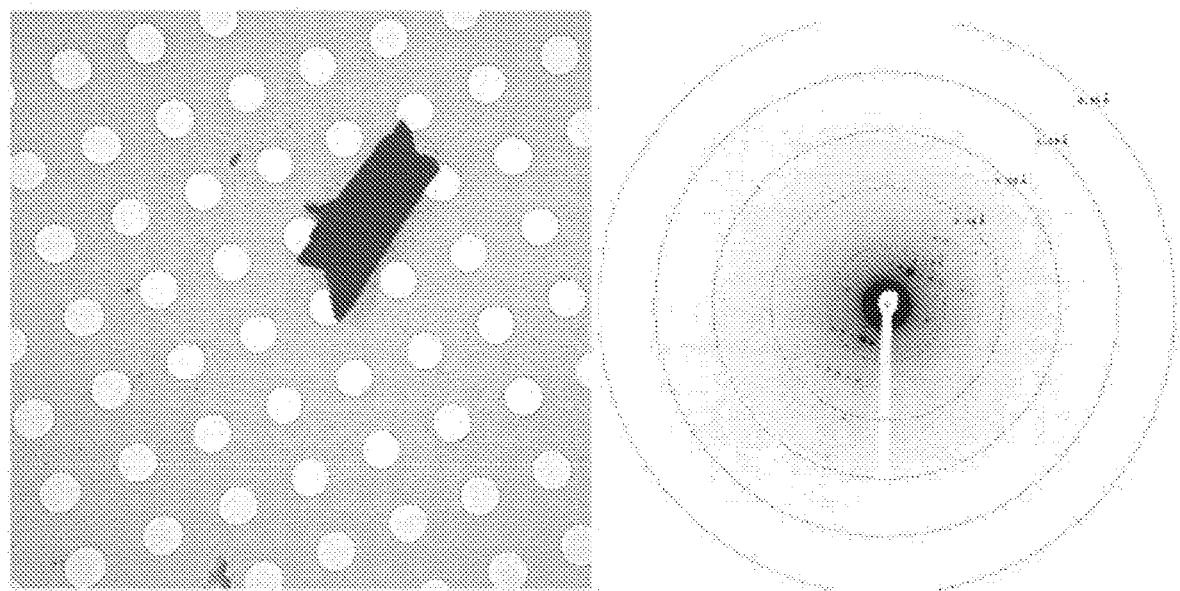
FIG. 52. Electron microgram of austinol crystal and its diffraction pattern from 3 ng of sample. Holes are 1 μm wide in diameter.

During our crystallographic studies of fischerin, we noticed small amounts of a highly crystalline impurity, present in sufficient quantities to be detectable by electron microscopy but insufficiently abundant in solution to be detectable by $^1$H NMR (FIG. 47). From two such microcrystals, we were able to collect a high-completeness data set with reflections beyond 1.00 A ($R_1$ value of 14.7%, see Data Table 1), leading to an ab initio structure of the complex polycyclic natural product austinol (4) (FIG. 51), an endogenous A. nidulans meroterpenoid NP that is copurified with 1 in trace amounts.[29] Intrigued by the ability to obtain structural information from a trace impurity, we proceeded to determine the limit of detection for austinol (4) in MicroED experiments. To our delight, we observed that deposition of a 1.5 ng/μL solution of austinol (4) in acetonitrile and water on a TEM grid followed by slow evaporation led to formation of microcrystals (FIG. 52) of sufficient quality to obtain a high resolution structure, demonstrating the impressive sensitivity of electron crystallography as well as the ability to crystallize small quantities on analytes directly on a TEM grid. Moreover, the ability to identify NPs from a mixture further highlights the applicability of MicroED in NP discovery and characterization, particularly for compounds produced in scarce amounts that may be overlooked by other techniques. These results showcase the exciting possibility of serendipitous discoveries in the field of NP isolation, where biological extracts could often contain minor NP impurities that may not be detectable using other established analytical methods.

In summary, we report the rediscovery of fischerin (1) biosynthesis using genome mining approach and the isolation of this orphan compound for the first time since its discovery in 1993. We report the first crystal structure of this orphan NP that has eluded full structural characterization for decades, confirming the isolation chemists' proposal of a cis-decalin ring and N-hydroxy pyridone core, establishing for the first time the relative stereochemistry of the epoxydiol moiety and the stereochemical relationship of these functionalities. Importantly, this structure corrects a previously proposed structure that was based on computational analyses. We also report the structure of a co-metabolite impurity, austinol (4), that was present in amounts below the detection limit in our initial $^1$H NMR experiments, and we demonstrate the exquisite sensitivity of MicroED by obtaining structural information from merely 3 ng of material. These results demonstrate the synergy of synthetic biology advances and MicroED in NP discovery and highlight the importance of developing novel characterization techniques that can complement and overcome limitations of the current state-of-the-art. Taken together, our findings provide a powerful approach towards discovery and structural determination of novel and elusive NPs.

Example 14: Methods for Example 13

Material, Fungal Strains and Culture Conditions

Aspergillus carbonarius NRRL346 was obtained from Agricultural Research Service Culture Collection (NRRL). A. carbonarius was maintained on PDA (potato dextrose agar, BD) for 3 days for sporulation or in liquid PDB medium (PDA medium without agar) for isolation of genomic DNA. A. nidulans was maintained on Czapek-Dox (CD) agar for sporulation or on CD-ST agar for gene overexpression, compound production and RNA extraction (World Wide Web at fgsc.net/).

General DNA Manipulation Technique

All DNA manipulation technique was performed as described previously.[30] E. coli TOP10 was used for cloning, following standard recombinant DNA techniques as described. DNA restriction enzymes were used as recommended by the manufacturer (New England Biolabs, NEB). PCR was performed using Phusion High-Fidelity DNA Polymerase (NEB). The gene-specific primers are listed in Supplementary Information. PCR products were confirmed by DNA sequencing. In vivo homologous recombination using Saccharomyces cerevisiae was used for the construction of the A. nidulans overexpression plasmids.

Heterologous Expression in A. Nidulans

A. nidulans A1145ΔEMΔST[31] was initially grown on oatmeal agar plates containing 10 mM uracil, 0.5 μg/mL pyridoxine HCl and 2.5 μg/mL riboflavin at 30° C. for 5 days. Fresh spores of A. nidulans were inoculated into 45 mL liquid CD media (1 L: 10 g glucose, 50 mL 20× nitrate salts, 1 mL trace elements, pH 6.5) in 125 mL Erlenmeyer flask and germinated at 30° C. and 250 rpm for approximately 16 h. For the preparation of 20× Nitrate salts, 120 g $NaNO_3$, 10.4 g KCl, 10.4 g $MgSO_4 \cdot 7H_2O$, 30.4 g $KH_2PO_4$ were dissolved in 1 L double distilled water. The 100 mL trace elements with pH 6.5 contains 2.20 g $ZnSO_4 \cdot 7H_2O$, 1.10 g $H_3BO_3$, 0.50 g, $MnCl_2 \cdot 4H_2O$, 0.16 g $FeSO_4 \cdot 7H_2O$, 0.16 g $CoCl_2 \cdot 5H_2O$, 0.16 g $CuSO_4 \cdot 5H_2O$, and 0.11 g $(NH_4)_6Mo_7O_{24} \cdot 4H_2O$. Mycelia were harvested by centrifugation at 4000 g for 10 min, and washed with 10 mL Osmotic buffer (1.2 M $MgSO_4$, 10 mM sodium phosphate, pH 5.8). Then the mycelia were transferred into 10 mL of Osmotic buffer containing 100 mg lysing enzymes from Trichoderma and 60 mg Yatalase in a 125 mL flask. The flask was kept in shaker at 80 rpm for 4 h at 30° C. Cells were collected in a 30 mL Corex tube and overlaid gently by 10 mL of Trapping buffer (0.6 M sorbitol, 0.1 M Tris-HCl, pH 7.0). After centrifugation at 3,500 rpm for 15 min at 4° C., protoplasts were collected in the interface of the two buffers. The protoplasts were then transferred to a sterile 50 mL falcon tube and washed by 10 mL STC buffer (1.2 M sorbitol, 10 mM $CaCl_2$, 10 mM Tris-HCl, pH 7.5). The protoplasts were resuspended in 1 mL STC buffer for transformation. Then, the plasmids were added to 60 μL protoplast suspension and the mixture incubated 60 min on ice. Then 600 μL of PEG solution at pH 7.5 (60% PEG, 50 mM $CaCl_2$ and 50 mM Tris-HCl) was added to the protoplast mixture, and the mixture was incubated at room temperature for additional 20 min. The mixture was spread on the regeneration dropout solid medium (CD solid medium with 1.2 M sorbitol and appropriate supplements) and incubated at 30° C. for 2 to 3 days. The transformants were grown on CD-ST (1 L: 20 g starch, 20 g casamino acids, 50 mL 20× nitrate salts, 1 mL trace elements, 15 g agar) agar for 3 to 4 days before extraction.

Analysis of Metabolites and Isolation of Fischerin (1)

For small scale analysis, the transformants of A. nidulans were grown for 3 to 4 days on 25 mL CD-ST agar. Then, a chunk of agar with fungal mycelia was scraped and vortexed with 500 μL of acetone for 30 minutes. The organic phase was dried by speed vacuum and dissolved in methanol for analysis. LC-MS analyses were performed on a Shimadzu 2020 EV LC-MS (Kinetex 1.7 μm C18 100 Å, LC Column 100×2.1 mm) using positive- and negative-mode electrospray ionization with a linear gradient of 5-95% acetonitrile MeCN—$H_2O$ with 0.5% formic acid in 15 min followed by 95% MeCN for 3 min with a flow rate of 0.3 ml/min.

For isolation of compounds, transformants of A. nidulans were grown for 96 h on 4 L CD-ST agar and then solid culture was cut into small pieces and was extracted with acetone. The organic layer was evaporated and the remaining water phase was extracted with 2×1 L ethyl acetate. After evaporation of the organic phase, the crude extracts were separated by silica gel chromatography. Fractions containing fischerin (1) were combined and used for further purification by HPLC with a COSMOSIL column (Nacalai Tesque Inc., C18 MS-II, 5 μm, 10×250 mm, flowrate 4 mL/min). For elucidation of 1, 1D and 2D NMR spectra were obtained on Bruker AV500 spectrometer at the UCLA Molecular Instrumentation Center. High resolution mass spectra were obtained from an Agilent Technologies 6545 Accurate Mass QTOF LC/MS at the UCLA Molecular Instrumentation Center.

Recrystallization

Dried, purified fischerin (1) sample was suspended in tetrahydrofuran (THF), and $H_2O$ was added until the solution became clear and homogeneous, changing color to light yellow. Crystals were grown at room temperature by slow evaporation in a dram vial.

Sample containing austinol (4) was dissolved in 1:1 mixture of MeCN and $H_2O$, then precipitated at ambient temperature under a stream of air.

Serial Dilution 0.4 mg of vacuum-dried sample containing austinol (4) was redissolved in a 2:1 MeCN/$H_2O$ solution at 333 μM concentration. The sample was then diluted every 100-fold in $H_2O$, vortexed, and centrifuged before the subsequent dilution.

Electron Diffraction Data Acquisition and Processing

Fischerin (1) microcrystals were diluted to optimize crystal density and deposited onto a Quantifoil holey-carbon EM grid as a 2 μL drop before blotting and plunge freezing in liquid ethane using Vitrobot Mark IV (FEI). The vitrified grid was then transferred to the transmission electron microscope (TEM) on Gatan 626 cryo-holder, maintaining cryogenic temperature (100 K) throughout data acquisition.

2 μL of austinol (4) sample was aliquoted from the top of the solution to account for crystal density before deposition onto a continuous carbon EM grid. 2 μL of serial dilution sample was obtained from the bottom of the solution and deposited onto a Quantifoil holey-carbon EM grid. In both cases, solvent was wicked away manually, and the dried grid was transferred to the TEM for ambient temperature data acquisition on a single-tilt sample holder.

All diffraction data was collected on FEI Tecnai F200C electron microscope with an operating voltage of 200 keV, corresponding to a wavelength of 0.025 Å. During data acquisition, the crystal of interest was isolated using a selected area aperture and continuously rotated at a rate of −0.3° $s^{-1}$ over a tilt range of 50-100°. Continuous rotation diffraction data was recorded using rolling shutter mode with a Ceta-D CMOS 4 k×4 k camera, integrating at a rate of 3 s per frame and binning by 2 to produce final images of 2 k×2 k.[32]

Diffraction movies saved as SER files were converted to SMV format using ser2smv software as described previously.[33] Frames were indexed and integrated in XDS.[34] Data from four and two crystals were scaled and merged together using XSCALE[35] to produce the final data sets for 1 and 4, respectively (Data Table 1). Finally, intensities were converted to SHELX format using XDSCONV.[35]

Structure Determination and Refinement

Structures of 1 and 4 were solved ab initio using direct methods in SHELXD[36] and SHELXT,[37] respectively, and refined with SHELXL[38] in ShelXle.[39] All non-hydrogen atoms were refined anisotropically, and hydrogen atoms were placed using the riding model. Residual density corresponding to solvent molecules was observed during refinement; however, solvent disorder hindered unambiguous identification, and oxygen atoms were placed in lieu of water molecules. Overall data quality and refinement statistics are reported in Data Table 1. Structure overlays were illustrated using Pymol.[40]

Data Availability

Crystallographic information files (CIF) for compounds 1 and 4 containing atomic coordinates and structure factors have been deposited at the Cambridge Crystallographic Data Center (Deposit number: 2020516 and 2020510, respectively).

Data Table 1. MicroED data collection and refinement statistics (ab initio)

|  | Fischerin (1) | Austinol (4) |
| --- | --- | --- |
| Stoichiometric Formula | $C_{23}H_{29}NO_7$ | $C_{25}H_{30}O_8$ |
| Data Collection |  |  |
| Temperature (K) | −100 | −293 |
| Space group | C2 | $P2_12_12_1$ |
| Cell dimensions |  |  |
| a, b, c (Å) | 36.59(2), 20.800(9), 18.9(2) | 7.910(6), 11.110(8), 23.89(1) |
| α, β, γ (°) | 90.00, 96.3(2), 90.00 | 90.00, 90.00, 90.00 |
| Resolution (Å) | 1.05 (1.10-1.05) | 1.00 (1.05-1.00) |
| $R_{obs}$ (%) | 19.0 (94.6) | 16.0 (71.8) |
| $R_{meas}$ (%) | 20.1 (111.2) | 18.3 (80.4) |
| I/σI | 5.87 (1.19) | 5.20 (1.74) |
| $CC_{1/2}$ (%) | 98.9 (64.9) | 98.8 (67.4) |
| Completeness (%) | 86.5 (72.5) | 99.3 (100.0) |
| Refinement |  |  |
| Resolution (Å) | 1.05 | 1.00 |
| Observed reflections (#) | 52478 (2220) | 6179 (856) |
| Unique reflections (#) | 5789 (621) | 1315 (173) |
| $R_1$ (%) | 13.78 | 14.69 |
| $wR_2$ (%) | 32.23 | 33.56 |
| GooF | 1.432 | 1.401 |

*Highest resolution shell is shown in parenthesis.

References for Examples 13 and 14

[1] Newman, D. J. & Cragg, G. M. Natural products as sources of new drugs over the nearly four decades from January 1981 to September 2019. *J. Nat. Prod.* 83, 770-803 (2020).

[2] Fisch, K. M. et aL Rational domain swaps decipher programming in fungal highly reducing polyketide synthases and resurrect an extinct metabolite. *J. Am. Chem. Soc.* 133, 16635-16641 (2011).

[3] Nicolaou, K. C. & Snyder, S. A. Chasing molecules that were never there: Misassigned natural products and the role of chemical synthesis in modern structure elucidation. *Angew. Chem. Int. Ed.* 44, 1012-1044 (2005).

[4] Maier, M. E. Structural revisions of natural products by total synthesis. *Nat. Prod. Rep.* 26, 1105-1124 (2009).

[5] Jones, C. G., et al. The CryoEM method MicroED as a powerful tool for small molecule structure determination. *ACS Cent. Sci.* 4, 1587-1592 (2018).

[6] Ziemert, N., Alanjary, M. & Weber, T. The evolution of genome mining in microbes—a review. *Nat. Prod. Rep.* 33, 988-1005 (2016).

[7] Fujimoto, H., Ikeda, M., Yamamoto, K. & Yamazaki, M. Structure of fischerin, a new toxic metabolite from an ascomycete, *Neosartorya fischeri* var. *fischeri*. *J. Nat. Prod.* 56, 1268-1275 (1993).

[5] Perfect, J. R. The antifungal pipeline: a reality check. *Nat. Rev. Drug Discov.* 16, 603-616 (2017).

[9] Fair, R. J. & Tor, Y. Antibiotics and Bacterial Resistance in the 21st Century: Perspectives in Medicinal Chemistry (2014) doi:10.4137/PMC.S14459.

[10] Pye, C. R., Bertin, M. J., Lokey, R. S., Gerwick, W. H. & Linington, R. G. Retrospective analysis of natural products provides insights for future discovery trends. Proc. NatL Acad. Sci. USA 114, 56015606 (2017).

[11] Fisch, K. M. et aL Rational domain swaps decipher programming in fungal highly reducing polyketide synthases and resurrect an extinct metabolite. J. Am. Chem. Soc. 133, 16635-16641 (2011).

[12] Bifulco, G., Dambruoso, P., Gomez-Paloma, L. & Riccio, R. Determination of relative configuration in organic compounds by NMR spectroscopy and computational methods. Chem. Rev. 107, 3744-3779 (2007).

[13] Rodriguez, J. A., et aL Structure of the toxic core of a-synuclein from invisible crystals. Nature 525, 486-490 (2015).

[14] Jones, C. J., et aL Characterization of reactive organometallic species via MicroED. ACS Cent. Sci. 5, 1507-1513 (2019).

[15] Wat, C.-K., Mcinnes, A. G., Smith, D. G., Wright, J. L. C. & Vining, L. C. The yellow pigments of Beauveria species. Structures of tenellin and bassianin. Can. J. Chem. 55, 4090-4098 (1977).

[16] Ando, K. et aL Funiculosin, a new antibiotic. J. Antibiot. 31, 533-538 (1978).

[17] Hayakawa, S., Minato, H. & Katagiri, K. The Ilicicolins, antibiotics from Cylindrocladium ilicicola. J. Antibiot. 24, 653-654 (1971).

[18] Alfatafta, A. A., Gloer, J. B., Scott, J. A. & Malloch, D. Apiosporamide, a new antifungal agent from the Coprophilous fungus Apiospora montagnei. J. Nat. Prod. 57, 1696-1702 (1994).

[19] Williams, D. R., Kammler, D. C., Donnell, A. F. & Goundry, W. R. F. Total synthesis of (+)-apiosporamide: Assignment of relative and absolute configuration. Angew. Chem. Int. Ed. 44, 67156718 (2005).

[20] Amini, S. K. Assignment of the absolute configuration of fischerin by computed nmr chemical shifts. J. Struct. Chem. 56, 1334-1341 (2015).

[21] Ugai, T., Minami, A., Gomi, K. & Oikawa, H. Genome mining approach for harnessing the cryptic gene cluster in Alternaria solani: production of PKS-NRPS hybrid metabolite, didymellamide B. Tetrahedron Letters 57, 2793-2796 (2016).

[22] Skiba, M. A. et aL Domain organization and active site architecture of a polyketide synthase C-methyltransferase. ACS Chem. Biol. 11, 3319-3327 (2016).

[23] Liu, N. et al. Identification and Heterologous production of a benzoyl-primed tricarboxylic acid polyketide intermediate from the zaragozic acid A biosynthetic pathway. Org. Lett. 19, 3560-3563 (2017).

[24] Nannenga, B. L. MicroED methodology and development. Struct. Dyn. 7, 014304 Online at doi.org/10.1063/1.5128226 (2020).

[25] de la Cruz, M. J., et aL Atomic-resolution structures from fragmented protein crystals with the cryoEM method MicroED. Nat. Methods 14, 399-402 (2017).

[26] Dubochet, J., et al. Cryo-electron microscopy of vitrified specimens. Q. Rev. Biophys. 21, 129-228 (1988).

[27] Natesh, R. in Structural Bioinformatics: Applications in Preclinical Drug Discovery Process (ed Mohan, C. G.) 375-400 (Springer Nature Switzerland AG, 2019).

[28] Kato, K., et aL A vault ribonucleoprotein particle exhibiting 39-fold dihedral symmetry. Acta Cryst. D64, 525-531 (2008).

[29] Matsuda, Y. & Abe, Ikuro. Biosynthesis of fungal meroterpenoids. Nat. Prod. Rep. 33, 26-53 (2016).

[30] Ohashi, M. et aL SAM-dependent enzyme-catalysed pericyclic reactions in natural product biosynthesis. Nature 549, 502 (2017).

[31] Liu, N. et al. Identification and Heterologous production of a benzoyl-primed tricarboxylic acid polyketide intermediate from the zaragozic acid A biosynthetic pathway. Org. Lett. 19, 3560-3563 (2017).

[32] Nannenga, B. L., Shi, D., Leslie, A. G. W. & Gonen, T. High-resolution structure determination by continuous-rotation data collection in MicroED. Nat. Methods. 11, 927-930 (2014).

[33] Hattne, J., et aL MicroED data collection and processing. Acta Cryst. A71, 353-360 (2015).

[34] Kabsch, W. Xds. Acta Cryst. D66, 125-132 (2010).

[35] Kabsch, W. Integration, scaling, space-group assignment and post-refinement. Acta Cryst. D66, 133144 (2010).

[36] Sheldrick, G. M. A short history of SHELX. Acta Cryst. A64, 112-122 (2008).

[37] Sheldrick, G. M. SHELXT—Integrated space-group and crystal-structure determination. Acta Cryst. A71, 3-8 (2015).

[38] Sheldrick, G. M. Crystal structure refinement with SHELXL. Acta Cryst. C71, 3-8 (2015).

[39] Hiibschle, C. B., Sheldrick, G. M. & Dittrich, B. ShelX1e: A Qt graphical user interface for SHELXL. J. Appl. Cryst. 44, 1281-1284 (2011).

[40] Delano, W. The PyMOL Molecular Graphics System (Schrodinger LLC). World Wide Web at pymol.org.

INCORPORATION BY REFERENCE

Each publication and patent mentioned herein is hereby incorporated by reference in its entirety. In case of conflict, the present application, including any definitions herein, will control.

EQUIVALENTS

While specific embodiments of the subject invention have been discussed, the above specification is illustrative and not restrictive. Many variations of the invention will become apparent to those skilled in the art upon review of this specification and the following claims. The full scope of the invention should be determined by reference to the claims, along with their full scope of equivalents, and the specification, along with such variations.

What is claimed is:

1. A method of collecting electron diffraction patterns for obtaining a three-dimensional structural model of a compound, the method comprising applying a sample comprising the compound to an electron microscopy grid;

positioning the grid in an electron microscope to place a nanocrystal of the compound in a path of accelerated electrons, wherein the nanocrystal comprises a three-dimensional ordered array of molecules of the compound; and recording a plurality of electron diffraction patterns from the nanocrystal by orienting the grid in the electron microscope to place the nanocrystal in varied orientations with respect to the path of the accelerated electrons;

wherein:
   the compound has a molecular mass greater than 100 Daltons and less than 2000 Daltons; or
   the method further comprises determining reflection parameters including Miller indices and reflection intensities for a set of spots on the plurality of electron diffraction patterns and determining unit-cell parameters and a space group for the nanocrystal based on the reflection parameters.

2. The method of claim 1, further comprising surrounding the grid with a cryogenic fluid to maintain the nanocrystal within a cryogenic temperature range when recording the plurality of electron diffraction patterns.

3. The method of claim 1, wherein the nanocrystal comprises a dimension that is greater than 20 nanometers and less than 800 nanometers.

4. The method of claim 1, wherein the compound has a molecular mass greater than 100 Daltons and less than 2000 Daltons.

5. The method of claim 1, wherein the electron microscope is operated at an accelerating voltage greater than 80 kV and less than 400 kV.

6. The method of claim 1, wherein the electron microscope is operated in diffraction mode to screen the grid for the nanocrystal when positioning the grid in the electron microscope to place the nanocrystal in the path of accelerated electrons.

7. The method of claim 1, wherein the recording of the plurality of diffraction patterns comprises using a film, an image plate, an indirect charge-coupled device detector, an indirect complementary metal-oxide-semiconductor detector, or a direct monolithic active pixel sensor.

8. The method of claim 1, wherein the recording of the plurality of diffraction patterns comprises using a monolithic complementary metal-oxide-semiconductor detector.

9. The method of claim 1, further comprising positioning additional grids in the electron microscope to screen the additional grids for another nanocrystal.

10. The method of claim 1, wherein the electron microscope is set to transmit a total dose greater than 0.2 accelerated electrons per square angstroms and less than 8.0 accelerated electrons per square angstroms to the nanocrystal when recording the plurality of electron diffraction patterns.

11. The method of claim 1, wherein orienting the grid in the electron microscope comprises tilting the grid sequentially along a series of tilt angles having a range of at least 45 degrees.

12. The method of claim 1, further comprising
   determining reflection parameters including Miller indices and reflection intensities for a set of spots on the plurality of electron diffraction patterns; and
   determining unit-cell parameters and a space group for the nanocrystal based on the reflection parameters.

13. The method of claim 12, further comprising merging the reflection parameters from the nanocrystal with additional reflection parameters obtained from another nanocrystal of the compound in the sample.

14. The method of claim 12, further comprising
   determining estimated phases for at least two spots among the set of spots using a method selected from Patterson methods, direct methods relying on three-phase invariance relationship, direct methods relying on random trials, dual-space recycling methods, molecular replacement methods, and a combination thereof; and
   determining an estimated three-dimensional electrostatic potential map based on the reflection parameters and estimated phases.

15. The method of claim 14, further comprising determining an estimated three-dimensional structural model for the compound based on the estimated three-dimensional electrostatic potential map.

16. The method of claim 15, further comprising determining a refined three-dimensional structural model for the compound by using an iterative procedure that determines improved phases by relying on the estimated three-dimensional structural model.

17. The method of claim 16, wherein the refined three-dimensional structural model for the molecule is determined in less than an hour after applying the sample comprising the compound to the electron microscopy grid.

18. The method of claim 16, wherein the refined three-dimensional structural model for the molecule is obtained from a set of electron diffraction patterns that are derived solely from the plurality of electron diffraction patterns of the nanocrystal.

19. The method of claim 1, wherein the sample comprises a powder.

20. The method of claim 1, further comprising obtaining the sample from a material by evaporating a liquid from the material or by precipitating the sample from the material.

21. The method of claim 1, wherein the compound is a natural product, an organometallic compound, a reactive intermediate of an organometallic compound, or a transition metal coordination complex.

* * * * *